(12) United States Patent
McKay et al.

(10) Patent No.: US 9,138,786 B2
(45) Date of Patent: Sep. 22, 2015

(54) HIGH POWER LASER PIPELINE TOOL AND METHODS OF USE

(75) Inventors: Ryan P. McKay, Littleton, CO (US); Charles C. Rinzler, Denver, CO (US); Joel F. Moxley, Denver, CO (US); Paul D. Deutch, Houston, TX (US); Mark S. Zediker, Castle Rock, CO (US); Ronald A. DeWitt, Katy, TX (US); Brian O. Faircloth, Evergreen, CO (US)

(73) Assignee: FORO ENERGY, INC., Littleton, CO (US)

( * ) Notice: Subject to any disclaimer, the term of this patent is extended or adjusted under 35 U.S.C. 154(b) by 304 days.

(21) Appl. No.: 13/366,882

(22) Filed: Feb. 6, 2012

(65) Prior Publication Data

US 2012/0255933 A1  Oct. 11, 2012

Related U.S. Application Data

(63) Continuation-in-part of application No. 12/706,576, filed on Feb. 16, 2010, which is a continuation-in-part of application No. 12/544,136, filed on Aug. 19, 2009, now Pat. No. 8,511,401, application No. 13/366,882, which is a continuation-in-part of application No.

(Continued)

(51) Int. Cl.
  *G02B 6/44* (2006.01)
  *B23K 26/00* (2014.01)
  *B08B 9/02* (2006.01)
  *B08B 7/00* (2006.01)
  *B08B 9/055* (2006.01)
  *G02B 6/50* (2006.01)

(52) U.S. Cl.
  CPC .............. *B08B 9/02* (2013.01); *B08B 7/0042* (2013.01); *B08B 9/055* (2013.01); *G02B 6/502* (2013.01)

(58) Field of Classification Search
  None
  See application file for complete search history.

(56) References Cited

U.S. PATENT DOCUMENTS

| 914,636 | A | 3/1909 | Case |
|---|---|---|---|
| 2,548,463 | A | 4/1951 | Blood |
| 2,742,555 | A | 4/1956 | Murray |
| 3,122,212 | A | 2/1964 | Karlovitz |
| 3,383,491 | A | 5/1968 | Muncheryan |
| 3,461,964 | A | 8/1969 | Venghiattis |
| 3,493,060 | A | 2/1970 | Van Dyk |
| 3,503,804 | A | 3/1970 | Schneider et al. |
| 3,539,221 | A | 11/1970 | Gladstone |

(Continued)

FOREIGN PATENT DOCUMENTS

| EP | 0 295 045 A2 | 12/1988 |
|---|---|---|
| EP | 0 515 983 A1 | 12/1992 |

(Continued)

OTHER PUBLICATIONS

U.S. Appl. No. 12/543,986, filed Aug. 19, 2013, Moxley et al.

(Continued)

*Primary Examiner* — Tina Wong
(74) *Attorney, Agent, or Firm* — Glen P. Belvis; Steptoe & Johnson

(57) ABSTRACT

There is provided a high power laser tool system for transmitting and delivering high power laser energy within the interior of pipes, which includes a high power laser-pig and long distance high power optical tether. The high power laser system performs high power laser pigging operations and other operations, such as, cleaning, assembling, maintaining and monitoring of pipelines.

15 Claims, 7 Drawing Sheets

Related U.S. Application Data

12/840,978, filed on Jul. 21, 2010, now Pat. No. 8,571,368, and a continuation-in-part of application No. 12/543,986, filed on Aug. 19, 2009, now Pat. No. 8,826,973, which is a continuation-in-part of application No. 12/544,136, filed on Aug. 19, 2009, now Pat. No. 8,511,401, application No. 13/366,882, which is a continuation-in-part of application No. 13/210,581, filed on Aug. 16, 2011, now Pat. No. 8,662,160.

(60) Provisional application No. 61/439,970, filed on Feb. 7, 2011, provisional application No. 61/446,312, filed on Feb. 24, 2011, provisional application No. 61/153,271, filed on Feb. 17, 2009, provisional application No. 61/295,562, filed on Jan. 15, 2010, provisional application No. 61/106,472, filed on Oct. 17, 2008, provisional application No. 61/374,594, filed on Aug. 17, 2010, provisional application No. 61/493,174, filed on Jun. 3, 2011.

(56) References Cited

U.S. PATENT DOCUMENTS

| | | | |
|---|---|---|---|
| 3,544,165 | A | 12/1970 | Snedden |
| 3,556,600 | A | 1/1971 | Shoupp et al. |
| 3,574,357 | A | 4/1971 | Alexandru et al. |
| 3,586,413 | A | 6/1971 | Adams |
| 3,652,447 | A | 3/1972 | Yant |
| 3,693,718 | A | 9/1972 | Stout |
| 3,699,649 | A | 10/1972 | McWilliams |
| 3,802,203 | A | 4/1974 | Ichise et al. |
| 3,820,605 | A | 6/1974 | Barber et al. |
| 3,821,510 | A | 6/1974 | Muncheryan |
| 3,823,788 | A | 7/1974 | Garrison et al. |
| 3,871,485 | A | 3/1975 | Keenan, Jr. |
| 3,882,945 | A | 5/1975 | Keenan, Jr. |
| 3,938,599 | A | 2/1976 | Horn |
| 3,960,448 | A | 6/1976 | Schmidt et al. |
| 3,977,478 | A | 8/1976 | Shuck |
| 3,992,095 | A | 11/1976 | Jacoby et al. |
| 3,998,281 | A | 12/1976 | Salisbury et al. |
| 4,019,331 | A | 4/1977 | Rom et al. |
| 4,025,091 | A | 5/1977 | Zeile, Jr. |
| 4,026,356 | A | 5/1977 | Shuck |
| 4,047,580 | A | 9/1977 | Yahiro et al. |
| 4,057,118 | A | 11/1977 | Ford |
| 4,061,190 | A | 12/1977 | Bloomfield |
| 4,066,138 | A | 1/1978 | Salisbury et al. |
| 4,090,572 | A | 5/1978 | Welch |
| 4,113,036 | A | 9/1978 | Stout |
| 4,125,757 | A | 11/1978 | Ross |
| 4,151,393 | A | 4/1979 | Fenneman et al. |
| 4,162,400 | A | 7/1979 | Pitts, Jr. |
| 4,189,705 | A | 2/1980 | Pitts, Jr. |
| 4,194,536 | A | 3/1980 | Stine et al. |
| 4,199,034 | A | 4/1980 | Salisbury et al. |
| 4,227,582 | A | 10/1980 | Price |
| 4,228,856 | A | 10/1980 | Reale |
| 4,243,298 | A | 1/1981 | Kao et al. |
| 4,249,925 | A | 2/1981 | Kawashima et al. |
| 4,252,015 | A | 2/1981 | Harbon et al. |
| 4,256,146 | A | 3/1981 | Genini et al. |
| 4,266,609 | A | 5/1981 | Rom et al. |
| 4,280,535 | A | 7/1981 | Willis |
| 4,281,891 | A | 8/1981 | Shinohara et al. |
| 4,282,940 | A | 8/1981 | Salisbury et al. |
| 4,332,401 | A | 6/1982 | Stephenson et al. |
| 4,336,415 | A | 6/1982 | Walling |
| 4,340,245 | A | 7/1982 | Stalder |
| 4,367,917 | A | 1/1983 | Gray |
| 4,370,886 | A | 2/1983 | Smith, Jr. et al. |
| 4,374,530 | A | 2/1983 | Walling |
| 4,375,164 | A | 3/1983 | Dodge et al. |
| 4,389,645 | A | 6/1983 | Wharton |
| 4,415,184 | A | 11/1983 | Stephenson et al. |
| 4,417,603 | A | 11/1983 | Argy |
| 4,436,177 | A | 3/1984 | Elliston |
| 4,444,420 | A | 4/1984 | McStravick et al. |
| 4,453,570 | A | 6/1984 | Hutchison |
| 4,459,731 | A | 7/1984 | Hutchison |
| 4,477,106 | A | 10/1984 | Hutchison |
| 4,504,112 | A | 3/1985 | Gould et al. |
| 4,522,464 | A | 6/1985 | Thompson et al. |
| 4,531,552 | A | 7/1985 | Kim |
| 4,565,351 | A | 1/1986 | Conti et al. |
| 4,662,437 | A | 5/1987 | Renfro |
| 4,694,865 | A | 9/1987 | Tauschmann |
| 4,725,116 | A | 2/1988 | Spencer et al. |
| 4,741,405 | A | 5/1988 | Moeny et al. |
| 4,744,420 | A | 5/1988 | Patterson et al. |
| 4,770,493 | A | 9/1988 | Ara et al. |
| 4,793,383 | A | 12/1988 | Gyory et al. |
| 4,830,113 | A | 5/1989 | Geyer |
| 4,860,654 | A | 8/1989 | Chawla et al. |
| 4,860,655 | A | 8/1989 | Chawla |
| 4,872,520 | A | 10/1989 | Nelson |
| 4,924,870 | A | 5/1990 | Wlodarczyk et al. |
| 4,952,771 | A | 8/1990 | Wrobel |
| 4,989,236 | A | 1/1991 | Myllymäki |
| 4,997,250 | A | 3/1991 | Ortiz, Jr. |
| 5,003,144 | A | 3/1991 | Lindroth et al. |
| 5,004,166 | A | 4/1991 | Sellar |
| 5,033,545 | A | 7/1991 | Sudol |
| 5,049,738 | A | 9/1991 | Gergely et al. |
| 5,084,617 | A | 1/1992 | Gergely |
| 5,086,842 | A | 2/1992 | Cholet |
| 5,107,936 | A | 4/1992 | Foppe |
| 5,121,872 | A | 6/1992 | Legget |
| 5,125,061 | A | 6/1992 | Marlier et al. |
| 5,125,063 | A | 6/1992 | Panuska et al. |
| 5,128,882 | A | 7/1992 | Cooper et al. |
| 5,140,664 | A | 8/1992 | Bosisio et al. |
| 5,163,321 | A | 11/1992 | Perales |
| 5,168,940 | A | 12/1992 | Foppe |
| 5,172,112 | A | 12/1992 | Jennings |
| 5,212,755 | A | 5/1993 | Holmberg |
| 5,269,377 | A | 12/1993 | Martin |
| 5,285,204 | A | 2/1994 | Sas-Jaworsky |
| 5,348,097 | A | 9/1994 | Giannesini et al. |
| 5,351,533 | A | 10/1994 | Macadam et al. |
| 5,353,875 | A | 10/1994 | Schultz et al. |
| 5,355,967 | A | 10/1994 | Mueller et al. |
| 5,356,081 | A | 10/1994 | Sellar |
| 5,396,805 | A | 3/1995 | Surjaatmadja |
| 5,411,081 | A | 5/1995 | Moore et al. |
| 5,411,085 | A | 5/1995 | Moore et al. |
| 5,411,105 | A | 5/1995 | Gray |
| 5,413,045 | A | 5/1995 | Miszewski |
| 5,413,170 | A | 5/1995 | Moore |
| 5,419,188 | A | 5/1995 | Rademaker et al. |
| 5,423,383 | A | 6/1995 | Pringle |
| 5,425,420 | A | 6/1995 | Pringle |
| 5,435,351 | A | 7/1995 | Head |
| 5,435,395 | A | 7/1995 | Connell |
| 5,463,711 | A | 10/1995 | Chu |
| 5,465,793 | A | 11/1995 | Pringle |
| 5,469,878 | A | 11/1995 | Pringle |
| 5,479,860 | A | 1/1996 | Ellis |
| 5,483,988 | A | 1/1996 | Pringle |
| 5,488,992 | A | 2/1996 | Pringle |
| 5,500,768 | A | 3/1996 | Doggett et al. |
| 5,503,014 | A | 4/1996 | Griffith |
| 5,503,370 | A | 4/1996 | Newman et al. |
| 5,505,259 | A | 4/1996 | Wittrisch et al. |
| 5,515,926 | A | 5/1996 | Boychuk |
| 5,526,887 | A | 6/1996 | Vestavik |
| 5,561,516 | A | 10/1996 | Noble et al. |
| 5,566,764 | A | 10/1996 | Elliston |
| 5,573,225 | A | 11/1996 | Boyle et al. |
| 5,577,560 | A | 11/1996 | Coronado et al. |
| 5,586,609 | A | 12/1996 | Schuh |
| 5,599,004 | A | 2/1997 | Newman et al. |
| 5,615,052 | A | 3/1997 | Doggett |

(56) References Cited

U.S. PATENT DOCUMENTS

| | | |
|---|---|---|
| 5,638,904 A | 6/1997 | Misselbrook et al. |
| 5,655,745 A | 8/1997 | Morrill |
| 5,694,408 A | 12/1997 | Bott et al. |
| 5,707,939 A | 1/1998 | Patel |
| 5,757,484 A | 5/1998 | Miles et al. |
| 5,759,859 A | 6/1998 | Sausa |
| 5,771,984 A | 6/1998 | Potter et al. |
| 5,773,791 A | 6/1998 | Kuykendal |
| 5,794,703 A | 8/1998 | Newman et al. |
| 5,813,465 A | 9/1998 | Terrell et al. |
| 5,828,003 A | 10/1998 | Thomeer et al. |
| 5,832,006 A | 11/1998 | Rice et al. |
| 5,833,003 A | 11/1998 | Longbottom et al. |
| 5,847,825 A | 12/1998 | Alexander |
| 5,862,273 A | 1/1999 | Pelletier |
| 5,862,862 A | 1/1999 | Terrell |
| 5,896,482 A | 4/1999 | Blee et al. |
| 5,896,938 A | 4/1999 | Moeny et al. |
| 5,902,499 A | 5/1999 | Richerzhagen |
| 5,909,306 A | 6/1999 | Goldberg et al. |
| 5,913,337 A | 6/1999 | Williams et al. |
| 5,924,489 A | 7/1999 | Hatcher |
| 5,929,986 A | 7/1999 | Slater et al. |
| 5,933,945 A | 8/1999 | Thomeer et al. |
| 5,938,954 A | 8/1999 | Onuma et al. |
| 5,973,783 A | 10/1999 | Goldner et al. |
| 5,986,756 A | 11/1999 | Slater et al. |
| RE36,525 E | 1/2000 | Pringle |
| 6,015,015 A | 1/2000 | Luft et al. |
| 6,038,363 A | 3/2000 | Slater et al. |
| 6,059,037 A | 5/2000 | Longbottom et al. |
| 6,060,662 A | 5/2000 | Rafie et al. |
| 6,065,540 A | 5/2000 | Thomeer et al. |
| RE36,723 E | 6/2000 | Moore et al. |
| 6,076,602 A | 6/2000 | Gano et al. |
| 6,092,601 A | 7/2000 | Gano et al. |
| 6,104,022 A | 8/2000 | Young et al. |
| RE36,880 E | 9/2000 | Pringle |
| 6,116,344 A | 9/2000 | Longbottom et al. |
| 6,135,206 A | 10/2000 | Gano et al. |
| 6,147,754 A | 11/2000 | Theriault et al. |
| 6,157,893 A | 12/2000 | Berger et al. |
| 6,166,546 A | 12/2000 | Scheihing et al. |
| 6,215,734 B1 | 4/2001 | Moeny et al. |
| 6,227,300 B1 | 5/2001 | Cunningham et al. |
| 6,250,391 B1 | 6/2001 | Proudfoot |
| 6,273,193 B1 | 8/2001 | Hermann et al. |
| 6,275,645 B1 | 8/2001 | Vereecken et al. |
| 6,281,489 B1 | 8/2001 | Tubel et al. |
| 6,301,423 B1 | 10/2001 | Olson |
| 6,309,195 B1 | 10/2001 | Bottos et al. |
| 6,321,839 B1 | 11/2001 | Vereecken et al. |
| 6,352,114 B1 | 3/2002 | Toalson et al. |
| 6,355,928 B1 | 3/2002 | Skinner et al. |
| 6,356,683 B1 | 3/2002 | Hu et al. |
| 6,377,591 B1 | 4/2002 | Hollister et al. |
| 6,384,738 B1 | 5/2002 | Carstensen et al. |
| 6,386,300 B1 | 5/2002 | Curlett et al. |
| 6,401,825 B1 | 6/2002 | Woodrow |
| 6,426,479 B1 | 7/2002 | Bischof |
| 6,437,326 B1 | 8/2002 | Yamate et al. |
| 6,450,257 B1 | 9/2002 | Douglas |
| 6,494,259 B2 | 12/2002 | Surjaatmadja |
| 6,497,290 B1 | 12/2002 | Misselbrook et al. |
| 6,557,249 B1 | 5/2003 | Pruett et al. |
| 6,561,289 B2 | 5/2003 | Portman et al. |
| 6,564,046 B1 | 5/2003 | Chateau |
| 6,591,046 B2 | 7/2003 | Stottlemyer |
| 6,615,922 B2 | 9/2003 | Deul et al. |
| 6,626,249 B2 | 9/2003 | Rosa |
| 6,644,848 B1 | 11/2003 | Clayton et al. |
| 6,661,815 B1 | 12/2003 | Kozlovsky et al. |
| 6,710,720 B2 | 3/2004 | Carstensen et al. |
| 6,712,150 B1 | 3/2004 | Misselbrook et al. |
| 6,725,924 B2 | 4/2004 | Davidson et al. |
| 6,747,743 B2 | 6/2004 | Skinner et al. |
| 6,755,262 B2 | 6/2004 | Parker |
| 6,808,023 B2 | 10/2004 | Smith et al. |
| 6,832,654 B2 | 12/2004 | Ravensbergen et al. |
| 6,847,034 B2 | 1/2005 | Shah et al. |
| 6,851,488 B2 | 2/2005 | Batarseh |
| 6,867,858 B2 | 3/2005 | Owen et al. |
| 6,870,128 B2 | 3/2005 | Kobayashi et al. |
| 6,874,361 B1 | 4/2005 | Meltz et al. |
| 6,880,646 B2 | 4/2005 | Batarseh |
| 6,885,784 B2 | 4/2005 | Bohnert |
| 6,888,097 B2 | 5/2005 | Batarseh |
| 6,888,127 B2 | 5/2005 | Jones et al. |
| 6,912,898 B2 | 7/2005 | Jones et al. |
| 6,913,079 B2 | 7/2005 | Tubel |
| 6,920,395 B2 | 7/2005 | Brown |
| 6,920,946 B2 | 7/2005 | Oglesby |
| 6,923,273 B2 | 8/2005 | Terry et al. |
| 6,957,576 B2 | 10/2005 | Skinner et al. |
| 6,967,322 B2 | 11/2005 | Jones et al. |
| 6,977,367 B2 | 12/2005 | Tubel et al. |
| 6,978,832 B2 | 12/2005 | Gardner et al. |
| 6,981,561 B2 | 1/2006 | Krueger et al. |
| 6,994,162 B2 | 2/2006 | Robison |
| 7,040,746 B2 | 5/2006 | McCain et al. |
| 7,055,604 B2 | 6/2006 | Jee et al. |
| 7,055,629 B2 | 6/2006 | Oglesby |
| 7,072,044 B2 | 7/2006 | Kringlebotn et al. |
| 7,072,588 B2 | 7/2006 | Skinner |
| 7,086,484 B2 | 8/2006 | Smith, Jr. |
| 7,087,865 B2 | 8/2006 | Lerner |
| 7,088,437 B2 | 8/2006 | Blomster et al. |
| 7,126,332 B2 | 10/2006 | Blanz et al. |
| 7,134,488 B2 | 11/2006 | Tudor et al. |
| 7,134,514 B2 | 11/2006 | Riel et al. |
| 7,140,435 B2 | 11/2006 | Defretin et al. |
| 7,147,064 B2 | 12/2006 | Batarseh et al. |
| 7,152,700 B2 | 12/2006 | Church et al. |
| 7,163,875 B2 | 1/2007 | Richerzhagen |
| 7,172,026 B2 | 2/2007 | Misselbrook |
| 7,172,038 B2 | 2/2007 | Terry et al. |
| 7,174,067 B2 | 2/2007 | Murshid et al. |
| 7,188,687 B2 | 3/2007 | Rudd et al. |
| 7,195,731 B2 | 3/2007 | Jones |
| 7,196,786 B2 | 3/2007 | DiFoggio |
| 7,199,869 B2 | 4/2007 | MacDougall |
| 7,201,222 B2 | 4/2007 | Kanady et al. |
| 7,210,343 B2 | 5/2007 | Shammai et al. |
| 7,212,283 B2 | 5/2007 | Hother et al. |
| 7,249,633 B2 | 7/2007 | Ravensbergen et al. |
| 7,264,057 B2 | 9/2007 | Rytlewski et al. |
| 7,270,195 B2 | 9/2007 | MacGregor et al. |
| 7,273,108 B2 | 9/2007 | Misselbrook |
| 7,334,637 B2 | 2/2008 | Smith, Jr. |
| 7,337,660 B2 | 3/2008 | Ibrahim et al. |
| 7,362,422 B2 | 4/2008 | DiFoggio et al. |
| 7,372,230 B2 | 5/2008 | McKay |
| 7,394,064 B2 | 7/2008 | Marsh |
| 7,395,696 B2 | 7/2008 | Bissonnette et al. |
| 7,416,032 B2 | 8/2008 | Moeny et al. |
| 7,416,258 B2 | 8/2008 | Reed et al. |
| 7,424,190 B2 | 9/2008 | Dowd et al. |
| 7,471,831 B2 | 12/2008 | Bearman et al. |
| 7,487,834 B2 | 2/2009 | Reed et al. |
| 7,490,664 B2 | 2/2009 | Skinner et al. |
| 7,503,404 B2 | 3/2009 | McDaniel et al. |
| 7,515,782 B2 | 4/2009 | Zhang et al. |
| 7,516,802 B2 | 4/2009 | Smith, Jr. |
| 7,518,722 B2 | 4/2009 | Julian et al. |
| 7,527,108 B2 | 5/2009 | Moeny |
| 7,530,406 B2 | 5/2009 | Moeny et al. |
| 7,559,378 B2 | 7/2009 | Moeny |
| 7,587,111 B2 | 9/2009 | de Montmorillon et al. |
| 7,600,564 B2 | 10/2009 | Shampine et al. |
| 7,603,011 B2 | 10/2009 | Varkey et al. |
| 7,617,873 B2 | 11/2009 | Lovell et al. |
| 7,624,743 B2 | 12/2009 | Sarkar et al. |
| 7,628,227 B2 | 12/2009 | Marsh |
| 7,646,953 B2 | 1/2010 | Dowd et al. |

(56) References Cited

U.S. PATENT DOCUMENTS

| | | |
|---|---|---|
| 7,647,948 B2 | 1/2010 | Quigley et al. |
| 7,671,983 B2 | 3/2010 | Shammai et al. |
| 7,715,664 B1 | 5/2010 | Shou et al. |
| 7,720,323 B2 | 5/2010 | Yamate et al. |
| 7,769,260 B2 | 8/2010 | Hansen et al. |
| 7,802,384 B2 | 9/2010 | Kobayashi et al. |
| 7,834,777 B2 | 11/2010 | Gold |
| 7,848,368 B2 | 12/2010 | Gapontsev et al. |
| 7,900,699 B2 | 3/2011 | Ramos et al. |
| 7,938,175 B2 | 5/2011 | Skinner et al. |
| 8,011,454 B2 | 9/2011 | Castillo |
| 8,074,332 B2 | 12/2011 | Keatch et al. |
| 8,082,996 B2 | 12/2011 | Kocis et al. |
| 8,091,638 B2 | 1/2012 | Dusterhoft et al. |
| 8,109,345 B2 | 2/2012 | Jeffryes |
| 8,175,433 B2 | 5/2012 | Caldwell et al. |
| 8,424,617 B2 * | 4/2013 | Faircloth et al. ........ 175/16 |
| 8,511,401 B2 * | 8/2013 | Zediker et al. ........ 175/57 |
| 8,522,869 B2 * | 9/2013 | Noya et al. ........ 166/254.2 |
| 2002/0007945 A1 | 1/2002 | Neuroth et al. |
| 2002/0039465 A1 | 4/2002 | Skinner |
| 2002/0189806 A1 | 12/2002 | Davidson et al. |
| 2003/0000741 A1 | 1/2003 | Rosa |
| 2003/0053783 A1 | 3/2003 | Shirasaki |
| 2003/0056990 A1 | 3/2003 | Oglesby |
| 2003/0085040 A1 | 5/2003 | Hemphill et al. |
| 2003/0094281 A1 | 5/2003 | Tubel |
| 2003/0132029 A1 | 7/2003 | Parker |
| 2003/0145991 A1 | 8/2003 | Olsen |
| 2003/0159283 A1 | 8/2003 | White |
| 2003/0160164 A1 | 8/2003 | Jones et al. |
| 2003/0226826 A1 | 12/2003 | Kobayashi et al. |
| 2004/0006429 A1 | 1/2004 | Brown |
| 2004/0016295 A1 | 1/2004 | Skinner et al. |
| 2004/0020643 A1 | 2/2004 | Thomeer et al. |
| 2004/0026382 A1 | 2/2004 | Richerzhagen |
| 2004/0033017 A1 | 2/2004 | Kringlebotn et al. |
| 2004/0074979 A1 | 4/2004 | McGuire |
| 2004/0093950 A1 | 5/2004 | Bohnert |
| 2004/0112642 A1 | 6/2004 | Krueger et al. |
| 2004/0119471 A1 | 6/2004 | Blanz et al. |
| 2004/0129418 A1 | 7/2004 | Jee et al. |
| 2004/0195003 A1 | 10/2004 | Batarseh |
| 2004/0206505 A1 | 10/2004 | Batarseh |
| 2004/0207731 A1 | 10/2004 | Bearman et al. |
| 2004/0211894 A1 | 10/2004 | Hother et al. |
| 2004/0218176 A1 | 11/2004 | Shammai et al. |
| 2004/0244970 A1 | 12/2004 | Smith, Jr. |
| 2004/0252748 A1 | 12/2004 | Gleitman |
| 2004/0256103 A1 | 12/2004 | Batarseh |
| 2005/0007583 A1 | 1/2005 | DiFoggio |
| 2005/0012244 A1 | 1/2005 | Jones |
| 2005/0016730 A1 * | 1/2005 | McMechan et al. ........ 166/305.1 |
| 2005/0034857 A1 | 2/2005 | Defretin et al. |
| 2005/0094129 A1 | 5/2005 | MacDougall |
| 2005/0099618 A1 | 5/2005 | DiFoggio et al. |
| 2005/0115741 A1 | 6/2005 | Terry et al. |
| 2005/0121235 A1 | 6/2005 | Larsen et al. |
| 2005/0189146 A1 | 9/2005 | Oglesby |
| 2005/0201652 A1 | 9/2005 | Ellwood, Jr. |
| 2005/0230107 A1 | 10/2005 | McDaniel et al. |
| 2005/0252286 A1 | 11/2005 | Ibrahim et al. |
| 2005/0263281 A1 | 12/2005 | Lovell et al. |
| 2005/0268704 A1 | 12/2005 | Bissonnette et al. |
| 2005/0269132 A1 | 12/2005 | Batarseh et al. |
| 2005/0272512 A1 | 12/2005 | Bissonnette et al. |
| 2005/0272513 A1 | 12/2005 | Bissonnette et al. |
| 2005/0272514 A1 | 12/2005 | Bissonnette et al. |
| 2005/0282645 A1 | 12/2005 | Bissonnette et al. |
| 2006/0038997 A1 | 2/2006 | Julian et al. |
| 2006/0049345 A1 | 3/2006 | Rao et al. |
| 2006/0065815 A1 | 3/2006 | Jurca |
| 2006/0070770 A1 | 4/2006 | Marsh |
| 2006/0102343 A1 | 5/2006 | Skinner et al. |
| 2006/0118303 A1 | 6/2006 | Schultz et al. |
| 2006/0137875 A1 | 6/2006 | Dusterhoft et al. |
| 2006/0185843 A1 | 8/2006 | Smith, Jr. |
| 2006/0191684 A1 | 8/2006 | Smith, Jr. |
| 2006/0204188 A1 | 9/2006 | Clarkson et al. |
| 2006/0207799 A1 | 9/2006 | Yu |
| 2006/0231257 A1 | 10/2006 | Reed et al. |
| 2006/0237233 A1 | 10/2006 | Reed et al. |
| 2006/0257150 A1 * | 11/2006 | Tsuchiya et al. ........ 398/79 |
| 2006/0260832 A1 | 11/2006 | McKay |
| 2006/0266522 A1 | 11/2006 | Eoff et al. |
| 2006/0283592 A1 | 12/2006 | Sierra et al. |
| 2006/0289724 A1 | 12/2006 | Skinner et al. |
| 2007/0034409 A1 | 2/2007 | Dale et al. |
| 2007/0081157 A1 | 4/2007 | Csutak et al. |
| 2007/0125163 A1 | 6/2007 | Dria et al. |
| 2007/0193990 A1 | 8/2007 | Richerzhagen et al. |
| 2007/0217736 A1 | 9/2007 | Zhang et al. |
| 2007/0227741 A1 | 10/2007 | Lovell et al. |
| 2007/0242265 A1 | 10/2007 | Vessereau et al. |
| 2007/0247701 A1 | 10/2007 | Akasaka et al. |
| 2007/0267220 A1 | 11/2007 | Magiawala et al. |
| 2007/0278195 A1 | 12/2007 | Richerzhagen et al. |
| 2007/0280615 A1 | 12/2007 | de Montmorillon et al. |
| 2008/0023202 A1 | 1/2008 | Keatch et al. |
| 2008/0053702 A1 | 3/2008 | Smith, Jr. |
| 2008/0073077 A1 | 3/2008 | Tunc et al. |
| 2008/0093125 A1 | 4/2008 | Potter et al. |
| 2008/0112760 A1 | 5/2008 | Curlett |
| 2008/0128123 A1 | 6/2008 | Gold |
| 2008/0138022 A1 | 6/2008 | Tassone |
| 2008/0165356 A1 | 7/2008 | DiFoggio et al. |
| 2008/0166132 A1 | 7/2008 | Lynde et al. |
| 2008/0180787 A1 | 7/2008 | DiGiovanni et al. |
| 2008/0245568 A1 | 10/2008 | Jeffryes |
| 2008/0273852 A1 | 11/2008 | Parker et al. |
| 2009/0020333 A1 | 1/2009 | Marsh |
| 2009/0031870 A1 | 2/2009 | O'Connor |
| 2009/0033176 A1 | 2/2009 | Huang et al. |
| 2009/0049345 A1 | 2/2009 | Mock et al. |
| 2009/0050371 A1 | 2/2009 | Moeny |
| 2009/0078467 A1 | 3/2009 | Castillo |
| 2009/0105955 A1 | 4/2009 | Castillo et al. |
| 2009/0126235 A1 | 5/2009 | Kobayashi et al. |
| 2009/0133871 A1 | 5/2009 | Skinner et al. |
| 2009/0133929 A1 | 5/2009 | Rodland |
| 2009/0139768 A1 | 6/2009 | Castillo |
| 2009/0166042 A1 | 7/2009 | Skinner |
| 2009/0190887 A1 | 7/2009 | Freeland et al. |
| 2009/0194292 A1 | 8/2009 | Oglesby |
| 2009/0205675 A1 | 8/2009 | Sarkar et al. |
| 2009/0260834 A1 | 10/2009 | Henson et al. |
| 2009/0266552 A1 | 10/2009 | Barra et al. |
| 2009/0266562 A1 | 10/2009 | Greenaway |
| 2009/0272424 A1 | 11/2009 | Ortabasi |
| 2009/0272547 A1 | 11/2009 | Dale et al. |
| 2009/0279835 A1 | 11/2009 | de Montmorillon et al. |
| 2009/0294050 A1 | 12/2009 | Traggis et al. |
| 2009/0308852 A1 | 12/2009 | Alpay et al. |
| 2009/0324183 A1 | 12/2009 | Bringuier et al. |
| 2010/0000790 A1 | 1/2010 | Moeny |
| 2010/0001179 A1 | 1/2010 | Kobayashi et al. |
| 2010/0008631 A1 | 1/2010 | Herbst |
| 2010/0013663 A1 | 1/2010 | Cavender et al. |
| 2010/0018703 A1 | 1/2010 | Lovell et al. |
| 2010/0025032 A1 | 2/2010 | Smith et al. |
| 2010/0032207 A1 | 2/2010 | Potter et al. |
| 2010/0044102 A1 | 2/2010 | Rinzler |
| 2010/0044103 A1 | 2/2010 | Moxley |
| 2010/0044104 A1 | 2/2010 | Zediker |
| 2010/0044105 A1 | 2/2010 | Faircloth |
| 2010/0044106 A1 | 2/2010 | Zediker |
| 2010/0071794 A1 | 3/2010 | Homan |
| 2010/0078414 A1 | 4/2010 | Perry et al. |
| 2010/0084132 A1 * | 4/2010 | Noya et al. ........ 166/254.2 |
| 2010/0089571 A1 | 4/2010 | Revellat et al. |
| 2010/0089574 A1 | 4/2010 | Wideman et al. |
| 2010/0089576 A1 | 4/2010 | Wideman et al. |
| 2010/0089577 A1 | 4/2010 | Wideman et al. |
| 2010/0155059 A1 | 6/2010 | Ullah |

(56) References Cited

U.S. PATENT DOCUMENTS

| | | |
|---|---|---|
| 2010/0170672 A1 | 7/2010 | Schwoebel et al. |
| 2010/0170680 A1 | 7/2010 | McGregor et al. |
| 2010/0187010 A1 | 7/2010 | Abbasi et al. |
| 2010/0197116 A1 | 8/2010 | Shah et al. |
| 2010/0215326 A1 | 8/2010 | Zediker |
| 2010/0218993 A1 | 9/2010 | Wideman et al. |
| 2010/0224408 A1 | 9/2010 | Kocis et al. |
| 2010/0226135 A1 | 9/2010 | Chen |
| 2010/0236785 A1 | 9/2010 | Collis et al. |
| 2010/0326659 A1 | 12/2010 | Schultz et al. |
| 2010/0326665 A1 | 12/2010 | Redlinger et al. |
| 2011/0030957 A1 | 2/2011 | Constantz et al. |
| 2011/0035154 A1 | 2/2011 | Kendall et al. |
| 2011/0048743 A1 | 3/2011 | Stafford et al. |
| 2011/0061869 A1 | 3/2011 | Abass et al. |
| 2011/0079437 A1 | 4/2011 | Hopkins et al. |
| 2011/0127028 A1 | 6/2011 | Strickland |
| 2011/0139450 A1 | 6/2011 | Vasques et al. |
| 2011/0147013 A1 | 6/2011 | Kilgore |
| 2011/0162854 A1 | 7/2011 | Bailey et al. |
| 2011/0168443 A1 | 7/2011 | Smolka |
| 2011/0174537 A1 | 7/2011 | Potter et al. |
| 2011/0186298 A1 | 8/2011 | Clark et al. |
| 2011/0198075 A1 | 8/2011 | Okada et al. |
| 2011/0205652 A1 | 8/2011 | Abbasi et al. |
| 2011/0220409 A1 | 9/2011 | Foppe |
| 2011/0240314 A1 | 10/2011 | Greenaway |
| 2011/0266062 A1 | 11/2011 | Shuman, V et al. |
| 2011/0278070 A1 | 11/2011 | Hopkins et al. |
| 2011/0290563 A1 | 12/2011 | Kocis et al. |
| 2011/0303460 A1 | 12/2011 | Rudolf Von Rohr et al. |
| 2012/0000646 A1 | 1/2012 | Liotta et al. |
| 2012/0012392 A1 | 1/2012 | Kumar |
| 2012/0012393 A1 | 1/2012 | Kumar |
| 2012/0020631 A1 | 1/2012 | Rinzler |
| 2012/0048550 A1 | 3/2012 | Dusterhoft et al. |
| 2012/0048568 A1 | 3/2012 | Li et al. |
| 2012/0061091 A1 | 3/2012 | Radi |
| 2012/0067643 A1 | 3/2012 | DeWitt |
| 2012/0068086 A1 | 3/2012 | DeWitt |
| 2012/0068523 A1 | 3/2012 | Bowles |
| 2012/0074110 A1 | 3/2012 | Zediker |
| 2012/0103693 A1 | 5/2012 | Jeffryes |
| 2012/0111578 A1 | 5/2012 | Tverlid |
| 2012/0118568 A1 | 5/2012 | Kleefisch et al. |
| 2012/0118578 A1 | 5/2012 | Skinner |
| 2012/0217015 A1 | 8/2012 | Zediker |
| 2012/0217017 A1 | 8/2012 | Zediker |
| 2012/0217018 A1 | 8/2012 | Zediker |
| 2012/0217019 A1 | 8/2012 | Zediker |
| 2012/0239013 A1 | 9/2012 | Islam |
| 2012/0248078 A1 | 10/2012 | Zediker |
| 2012/0255774 A1 | 10/2012 | Grubb et al. |
| 2012/0255933 A1 | 10/2012 | McKay et al. |
| 2012/0259013 A1 * | 10/2012 | Motwani et al. ............... 514/557 |
| 2012/0261188 A1 | 10/2012 | Zediker |
| 2012/0266803 A1 | 10/2012 | Zediker |
| 2012/0267168 A1 | 10/2012 | Grubb et al. |
| 2012/0273269 A1 | 11/2012 | Rinzler |
| 2012/0273470 A1 | 11/2012 | Zediker |
| 2012/0275159 A1 | 11/2012 | Fraze |
| 2013/0011102 A1 | 1/2013 | Rinzler |
| 2013/0175090 A1 | 7/2013 | Zediker |
| 2013/0192893 A1 | 8/2013 | Zediker |
| 2013/0192894 A1 | 8/2013 | Zediker |
| 2013/0220626 A1 | 8/2013 | Zediker |
| 2013/0228372 A1 | 9/2013 | Linyaev |
| 2013/0228557 A1 | 9/2013 | Zediker |
| 2013/0266031 A1 | 10/2013 | Norton |
| 2013/0319984 A1 | 12/2013 | Linyaev |
| 2014/0000902 A1 | 1/2014 | Wolfe |
| 2014/0060802 A1 | 3/2014 | Zediker |
| 2014/0060930 A1 | 3/2014 | Zediker |
| 2014/0069896 A1 | 3/2014 | Deutch |
| 2014/0090846 A1 | 4/2014 | Deutch |
| 2014/0190949 A1 | 7/2014 | Zediker |
| 2014/0231085 A1 | 8/2014 | Zediker |
| 2014/0231398 A1 | 8/2014 | Land |
| 2014/0248025 A1 | 9/2014 | Rinzler |
| 2014/0345872 A1 | 11/2014 | Zediker |

FOREIGN PATENT DOCUMENTS

| | | |
|---|---|---|
| EP | 0 565 287 A1 | 10/1993 |
| EP | 0 950 170 B1 | 9/2002 |
| FR | 2 716 924 A1 | 9/1995 |
| GB | 1 284 454 | 8/1972 |
| GB | 2420358 B | 5/2006 |
| JP | 09072738 A | 3/1997 |
| JP | 09-242453 A | 9/1997 |
| JP | 2000-334590 A | 12/2000 |
| JP | 2004-108132 A | 4/2004 |
| JP | 2006-307481 A | 11/2006 |
| JP | 2007-120048 A | 5/2007 |
| WO | WO 95/32834 A1 | 12/1995 |
| WO | WO 97/49893 A1 | 12/1997 |
| WO | WO 98/50673 A1 | 11/1998 |
| WO | WO 98/56534 A1 | 12/1998 |
| WO | WO 02/057805 A2 | 7/2002 |
| WO | WO 03/027433 A1 | 4/2003 |
| WO | WO 03/060286 A1 | 7/2003 |
| WO | WO 2004/009958 A1 | 1/2004 |
| WO | WO 2004/094786 A1 | 11/2004 |
| WO | WO 2005/001232 A2 | 1/2005 |
| WO | WO 2005/001239 A1 | 1/2005 |
| WO | WO 2006/008155 A1 | 1/2006 |
| WO | WO 2006/041565 A1 | 4/2006 |
| WO | WO 2006/054079 A1 | 5/2006 |
| WO | WO 2007/002064 A1 | 1/2007 |
| WO | WO 2007/112387 A2 | 10/2007 |
| WO | WO 2007/136485 A2 | 11/2007 |
| WO | WO 2008/016852 A1 | 2/2008 |
| WO | WO 2008/070509 A2 | 6/2008 |
| WO | WO 2008/085675 A1 | 7/2008 |
| WO | WO 2009/042774 A1 | 4/2009 |
| WO | WO 2009/042781 A2 | 4/2009 |
| WO | WO 2009/042785 A2 | 4/2009 |
| WO | WO 2009/131584 A1 | 10/2009 |
| WO | WO 2010/036318 A1 | 4/2010 |
| WO | WO 2010/060177 A1 | 6/2010 |
| WO | WO 2010/087944 A1 | 8/2010 |
| WO | WO 2011/008544 A2 | 1/2011 |
| WO | WO 2011/032083 A1 | 3/2011 |
| WO | WO 2011/041390 A2 | 4/2011 |
| WO | WO 2011/075247 A2 | 6/2011 |
| WO | WO 2011/106078 A2 | 9/2011 |
| WO | WO 2012/003146 A2 | 1/2012 |
| WO | WO 2012/012006 A1 | 1/2012 |
| WO | WO 2012/027699 A1 | 3/2012 |
| WO | WO 2012/064356 A1 | 5/2012 |
| WO | WO 2012/116189 A2 | 8/2012 |

OTHER PUBLICATIONS

U.S. Appl. No. 12/544,094, filed Aug. 19, 2009, Faircloth et al.
U.S. Appl. No. 12/543,968, filed Aug. 19, 2009, Rinzler et al.
U.S. Appl. No. 12/544,136, filed Aug. 19, 2009, Zediker et al.
U.S. Appl. No. 12/544,038, filed Aug. 19, 2009, Zediker et al.
U.S. Appl. No. 12/706,576, filed Feb. 16, 2010, Zediker et al.
U.S. Appl. No. 12/840,978, filed Jul. 21, 2010, Rinzler et al.
U.S. Appl. No. 12/896,021, filed Oct. 1, 2010, Underwood et al.
U.S. Appl. No. 13/034,017, filed Feb. 24, 2011, Zediker et al.
U.S. Appl. No. 13/034,037, filed Feb. 24, 2011, Zediker et al.
U.S. Appl. No. 13/034,175, filed Feb. 24, 2011, Zediker et al.
U.S. Appl. No. 13/034,183, filed Feb. 24, 2011, Zediker et al.
U.S. Appl. No. 13/210,581, filed Aug. 16, 2011, DeWitt et al.
U.S. Appl. No. 13/211,729, filed Aug. 17, 2011, DeWitt et al.
U.S. Appl. No. 13/222,931, filed Aug. 31, 2011, Zediker et al.
U.S. Appl. No. 13/347,445, filed Jan. 10, 2012, Zediker et al.
U.S. Appl. No. 13/403,132, filed Feb. 23, 2012, Zediker et al.
U.S. Appl. No. 13/403,287, filed Feb. 23, 2012, Grubb et al.
U.S. Appl. No. 13/403,615, filed Feb. 23, 2012, Grubb et al.

(56) References Cited

OTHER PUBLICATIONS

U.S. Appl. No. 13/403,692, filed Feb. 23, 2012, Zediker et al.
U.S. Appl. No. 13/403,723, filed Feb. 23, 2012, Rinzler et al.
U.S. Appl. No. 13/403,509, filed Feb. 23, 2012, Fraze et al.
U.S. Appl. No. 13/403,741, filed Feb. 23, 2012, Zediker et al.
U.S. Appl. No. 13/486,795, filed Feb. 23, 2012, Rinzler et al.
U.S. Appl. No. 13/565,345, filed Feb. 23, 2012, Zediker et al.
U.S. Appl. No. 13/768,149, filed Feb. 15, 2013, Zediker et al.
U.S. Appl. No. 13/777,650, filed Feb. 26, 2013, Zediker et al.
U.S. Appl. No. 13/782,869, filed Mar. 1, 2013, Schroit et al.
U.S. Appl. No. 13/782,942, filed Mar. 1, 2013, Norton et al.
U.S. Appl. No. 13/800,559, filed Mar. 13, 2013, Zediker et al.
U.S. Appl. No. 13/800,820, filed Mar. 13, 2013, Zediker et al.
U.S. Appl. No. 13/800,879, filed Mar. 13, 2013, Zediker et al.
U.S. Appl. No. 13/800,933, filed Mar. 13, 2013, Zediker et al.
U.S. Appl. No. 13/849,831, filed Mar. 25, 2013, Zediker et al.
International Search Report and Written Opinion for PCT App. No. PCT/US10/24368, dated Nov. 2, 2010, 16 pgs.
International Search Report for PCT Application No. PCT/US09/54295, dated Apr. 26, 2010, 16 pgs.
International Search Report for PCT Application No. PCT/US2011/044548, dated Jan. 24, 2012, 17 pgs.
International Search Report for PCT Application No. PCT/US2011/047902, dated Jan. 17, 2012, 9 pgs.
International Search Report for PCT Application No. PCT/US2011/050044 dated Feb. 1, 2012, 26 pgs.
International Search Report for PCT Application No. PCT/US2012/026277, dated May 30, 2012, 11 pgs.
International Search Report for PCT Application No. PCT/US2012/026265, dated May 30, 2012, 14 pgs.
International Search Report for PCT Application No. PCT/US2012/026280, dated May 30, 2012, 12 pgs.
International Search Report for PCT Application No. PCT/US2012/026337, dated Jun. 7, 2012, 21 pgs.
International Search Report for PCT Application No. PCT/US2012/026471, dated May 30, 2012, 13 pgs.
International Search Report for PCT Application No. PCT/US2012/026525, dated May 31, 2012, 8 pgs.
International Search Report for PCT Application No. PCT/US2012/026526, dated May 31, 2012, 10 pgs.
International Search Report for PCT Application No. PCT/US2012/026494, dated May 31, 2012, 12 pgs.
International Search Report for PCT Application No. PCT/US2012/020789, dated Jun. 29, 2012, 9 pgs.
International Search Report for PCT Application No. PCT/US2012/040490, dated Oct. 22, 2012, 14 pgs.
International Search Report for PCT Application No. PCT/US2012/049338, dated Jan. 22, 2013, 14 pgs.
Abdulagatova, Z. et al., "Effect of Temperature and Pressure on the Thermal Conductivity of Sandstone", *International Journal of Rock Mechanics & Mining Sciences*, vol. 46, 2009, pp. 1055-1071.
Abousleiman, Y. et al., "Poroelastic Solution of an Inclined Borehole in a Transversely Isotropic Medium", *Rock Mechanics*, Daemen & Schultz (eds), 1995, pp. 313-318.
Ackay, H. et al., Paper titled "Orthonormal Basis Functions for Continuous-Time Systems and Lp Convergence", date unknown but prior to Aug. 19, 2009, pp. 1-12.
Acosta, A. et al., paper from X Brazilian MRS meeting titled "Drilling Granite With Laser Light", X Encontro da SBPMat Granado-RS, Sep. 2011, 4 pages including pp. 56 and 59.
Agrawal Dinesh et al., "Microstructural by TEM of WC/Co composites Prepared by Conventional and Microwave Processes", Materials Research Lab, The Pennsylvania State University, *15th International Plansee Seminar*, vol. 2, , 2001, pp. 677-684.
Agrawal Dinesh et al., Report on "Development of Advanced Drill Components for BHA Using Mircowave Technology Incorporating Carbide Diamond Composites and Functionally Graded Materials", Microwave Processing and Engineering Center, Material Research Institute, The Pennsylvania State University, 2003, 10 pgs.

Agrawal Dinesh et al., Report on "Graded Steele-Tungsten Cardide/Cobalt-Diamond Systems Using Microwave Heating", Material Research Institute, Penn State University, *Proceedings of the 2002 International Conference on Functionally Graded Materials*, 2002, pp. 50-58.
Agrawal, Govind P., "Nonlinear Fiber Optics", Chap. 9, Fourth Edition, Academic Press copyright 2007, pp. 334-337.
Ahmadi, M. et al., "The Effect of Interaction Time and Saturation of Rock on Specific Energy in ND:YAG Laser Perforating", *Optics and Laser Technology*, vol. 43, 2011, pp. 226-231.
Ai, H.A. et al., "Simulation of dynamic response of granite: A numerical approach of shock-induced damage beneath impact craters", *International Journal of Impact Engineering*, vol. 33, 2006, pp. 1-10.
Akhatov, I. et al., "Collapse and Rebound of a Laser-Induced Cavitation Bubble", *Physics of Fluids*, vol. 13, No. 10, Oct. 2001, pp. 2805-2819.
Albertson, M. L. et al., "Diffusion of Submerged Jets", a paper for the *American Society of Civil Engineers*, Nov. 5, 1852, pp. 1571-1596.
Al-Harthi, A. A. et al., "The Porosity and Engineering Properties of Vesicular Basalt in Saudi Arabia", *Engineering Geology*, vol. 54, 1999, pp. 313-320.
Anand, U. et al., "Prevention of Nozzle Wear in Abrasive Water Suspension Jets (AWSJ) Using PoroLubricated Nozzles", *Transactions of the ASME*, vol. 125, Jan. 2003, pp. 168-181.
Andersson, J. C. et al., "The Aspo Pillar Stability Experiment: Part II—Rock Mass Response to Coupled Excavation-Induced and Thermal-Induced Stresses", *International Journal of Rock Mechanics & Mining Sciences*, vol. 46, 2009, pp. 879-895.
Anovitz, L. M. et al., "A New Approach to Quantification of Metamorphism Using Ultra-Small and Small Angle Neutron Scattering", *Geochimica et Cosmochimica Acta*, vol. 73, 2009, pp. 7303-7324.
Anton, Richard J. et al., "Dynamic Vickers indentation of brittle materials", *Wear*, vol. 239, 2000, pp. 27-35.
Antonucci, V. et al., "Numerical and Experimental Study of a Concentrated Indentation Force on Polymer Matrix Composites", an excerpt from the *Proceedings of the COMSOL Conference*, 2009, 4 pages.
Aptukov, V. N., "Two Stages of Spallation", publisher unknown, while the date of the publication is unknown, it is believed to be prior to Aug. 19, 2009, 6 pages.
Ashby, M. F. et al., "The Failure of Brittle Solids Containing Small Cracks Under Compressive Stress States", *Acta Metall.*, vol. 34, No. 3, 1986, pp. 497-510.
ASTM International, "Standard Test Method for Thermal Conductivity of Solids by Means of the Guarded-Comparative-Longitudinal Heat Flow Technique", Standard under the fixed Designation E1225-09, 2009, pp. 1-9.
Atkinson, B. K., "Introduction to Fracture Mechanics and Its Geophysical Applications", *Fracture Mechanics of Rock*, 1987, pp. 1-26.
Aubertin, M. et al., "A Multiaxial Stress Criterion for Short- and Long-Term Strength of Isotropic Rock Media", *International Journal of Rock Mechanics & Mining Sciences*, vol. 37, 2000, pp. 1169-1193.
Author unknown, by RIO Technical Services, "Sub-Task 1: Current Capabilities of Hydraulic Motors, Air/Nitrogen Motors, and Electric Downhole Motors", a final report for Department of Energy National Petroleum Technology Office for the Contract Task 03NT30429, Jan. 30, 2004, 26 pages.
Aver, B. B. et al., "Porosity Dependence of the Elastic Modulof Lithophysae-rich Tuff: Numerical and Experimental Investigations", International Journal of Rock Mechanics & Mining Sciences, vol. 40, 2003, pp. 919-928.
Aydin, A. et al., "The Schmidt hammer in rock material characterization", *Engineering Geology*, vol. 81, 2005, pp. 1-14.
Backers, T. et al., "Tensile Fracture Propagation and Acoustic Emission Activity in Sandstone: The Effect of Loading Rate", *International Journal of Rock Mechanics & Mining Sciences*, vol. 42, 2005, pp. 1094-1101.
Baek, S.Y. et al., "Simulation of the Coupled Thermal/Optical Effects for Liquid Immersion Micro-/Nanolithography", source unknown, believed to be publically available prior to 2012, 13 pages.

(56) References Cited

OTHER PUBLICATIONS

Baflon, Jean-Paul et al., "On the Relationship Between the Parameters of Paris' Law for Fatigue Crack Growth in Aluminium Alloys", *Scripta Metallurgica*, vol. 11, No. 12, 1977, pp. 1101-1106.
Bagatur, T. et al., "Air-entrainment Characteristics in a Plunging Water Jet System Using Rectangular Nozzles with Rounded Ends", *Water SA*, vol. 29, No. 1, Jan. 2003, pp. 35-38.
Bailo, El Tahir et al., "Spectral signatures and optic coefficients of surface and reservoir shales and limestones at COIL, $CO_2$ and Nd:YAG laser wavelengths", *Petroleum Engineering Department, Colorado School of Mines*, 2004, 13 pgs.
Baird, J. A. "GEODYN: A Geological Formation/Drillstring Dynamics Computer Program", *Society of Petroleum Engineers of AIME*, 1964, 9 pgs.
Baird, J. A. et al., "Analyzing the Dynamic Behavior of Downhole Equipment During Drilling", government Sandia Report, SAND-84-0758C, DE84 008840, 7 pages.
Baird, Jerold et al., Phase 1 Theoretical Description, A Geological Formation Drill String Dynamic Interaction Finite Element Program (GEODYN), *Sandia National Laboratories*, Report No. Sand-84-7101, 1984, 196 pgs.
Batarseh, S. I. et al, "Innovation in Wellbore Perforation Using High-Power Laser", *International Petroleum Technology Conference*, IPTC No. 10981, Nov. 2005, 7 pages.
Batarseh, S. et al. "Well Perforation Using High-Power Lasers", *Society of Petroleum Engineers*, SPE 84418, 2003, pp. 1-10.
Batarseh, S. et al., "Well Perforation Using High-Power Lasers", a paper prepared for presentation at the SPE (Society of Petroleum Engineers) Annual Technical Conference and Exhibition, SPE No. 84418, Oct. 2003, 10 pages.
Baykasoglu, A. et al., "Prediction of Compressive and Tensile Strength of Limestone via Genetic Programming", *Expert Systems with Applications*, vol. 35, 2008, pp. 111-123.
BDM Corporation, Geothermal Completion Technology Life-Cycle Cost Model (GEOCOM), *Sandia National Laboratories*, for the U.S. Dept. of Energy, vols. 1 and 2, 1982, 222 pgs.
Bechtel SAIC Company LLC, "Heat Capacity Analysis", a report prepared for Department of Energy, Nov. 2004, 100 pages.
Belushi, F. et al., "Demonstration of the Power of Inter-Disciplinary Integration to Beat Field Development Challenges in Complex Brown Field-South Oman", *Society of Petroleum Engineers*, a paper prepared for presentation at the Abu Dhabi International Petroleum Exhibition & Conference, SPE No. 137154, Nov. 2010, 18 pages.
Belyaev, V. V., "Spall Damage Modelling and Dynamic Fracture Specificities of Ceramics", *Journal of Materials Processing Technology*, vol. 32, 1992, pp. 135-144.
Benavente, D. et al., "The Combined Influence of Mineralogical, Hygric and Thermal Properties on the Durability of PoroBuilding Stones", *Eur. J. Mineral*, vol. 20, Aug. 2008, pp. 673-685.
Beste, U. et al., "Micro-scratch evaluation of rock types—a means to comprehend rock drill wear", *Tribology International*, vol. 37, 2004, pp. 203-210.
Bieniawski, Z. T., "Mechanism of Brittle Fracture of Rock: Part I—Theory of the Fracture Process", *Int. J. Rock Mech. Min. Sci.*, vol. 4, 1967, pp. 395-406.
Bilotsky, Y. et al., "Modelling Multilayers Systems with Time-Depended Heaviside and New Transition Functions", excerpt from the Proceedings of the 2006 Nordic COMSOL Conference, 2006, 4 pages.
Birkholzer, J. T. et al., "The Impact of Fracture—Matrix Interaction on Thermal—Hydrological Conditions in Heated Fractured Rock", an origial research paper published online http://vzy.scijournals.org/cgi/content/full/5/2/657, May 26, 2006, 27 pages.
Blackwell, B. F., "Temperature Profile in Semi-infinite Body With Exponential Source and Convective Boundary Condition", *Journal of Heat Transfer, Transactions of the ASME*, vol. 112, 1990, pp. 567-571.
Blackwell, D. D. et al., "Geothermal Resources in Sedimentary Basins", a presentation for the Geothermal Energy Generation in Oil and Gas Settings, Mar. 13, 2006, 28 pages.

Blair, S. C. et al., "Analysis of Compressive Fracture in Rock Using Statistical Techniques: Part I. A Non-linear Rule-based Model", *Int. J. Rock Mech. Min. Sci.*, vol. 35 No. 7, 1998, pp. 837-848.
Blomqvist, M. et al., "All-in-Quartz Optics for Low Focal Shifts", *SPIE Photonics West Conference in San Francisco*, Jan. 2011, 12 pages.
Boechat, A. A. P. et al., "Bend Loss in Large Core Multimode Optical Fiber Beam Delivery Systems", *Applied Optics.*, vol. 30 No. 3, Jan. 20, 1991, pp. 321-327.
Bolme, C. A., "Ultrafast Dynamic Ellipsometry of Laser Driven Shock Waves", a dissertation for the degree of Doctor of Philosophy in Physical Chemistry at Massachusetts Institute of Technology, Sep. 2008, pp. 1-229.
Britz, Dieter, "Digital Simulation in Electrochemistry", *Lect. Notes Phys.*, vol. 666, 2005, pp. 103-117.
Brown, G., "Development, Testing and Track Record of Fiber-Optic, Wet-Mate, Connectors", *IEEE*, 2003, pp. 83-88.
Browning, J. A. et al., "Recent Advances in Flame Jet Working of Minerals", *7th Symposium on Rock Mechanics*, Pennsylvania State Univ., 1965, pp. 281-313.
Brujan, E. A. et al., "Dynamics of Laser-Induced Cavitation Bubbles Near an Elastic Boundar", *J. Fluid Mech.*, vol. 433, 2001, pp. 251-281.
Burdine, N. T., "Rock Failure Under Dynamic Loading Conditions", Society of Petroleum Engineers Journal, Mar. 1963, pp. 1-8.
Bybee, K., "Modeling Laser-Spallation Rock Drilling", *JPT*, an SPE available at www.spe.org/jpt, Feb. 2006, 2 pp. 62-63.
Bybee, Karen, highlight of "Drilling a Hole in Granite Submerged in Water by Use of CO2 Laser", an SPE available at www.spe.org/jpt, *JPT*, Feb. 2010, pp. 48, 50 and 51.
Cai, W. et al., "Strength of Glass from Hertzian Line Contact", *Optomechanics 2011: Innovations and Solutions*, 2011, 5 pages.
Capetta, I. S. et al., "Fatigue Damage Evaluation on Mechanical Components Under Multiaxial Loadings", European Comsol Conference, University of Ferrara, Oct. 16, 2009, 25 pages.
Cardenas, R., "Protected Polycrystalline Diamond Compact Bits for Hard Rock Drilling", Report No. DOE-99049-1381, *U.S. Department of Energy*, 2000, pp. 1-79.
Carstens, J. P. et al., "Rock Cutting by Laser", a paper of *Society of Petroleum Engineers of AIME*, 1971, 11 pages.
Carstens, Jeffrey et al., "Heat-Assisted Tunnel Boring Machines", *Federal Railroad Administration and Urban Mass Transportation Administration*, U.S. Dept. of Transportation, Report No. FRA-RT-71-63, 1970, 340 pgs.
Caruso, C. et al., "Dynamic Crack Propagation in Fiber Reinforced Composites", Excerpt from the Proceedings of the COMSOL Conference, 2009, 5 pages.
Chastain, T. et al., "Deepwater Drilling Riser System", *SPE Drilling Engineering*, Aug. 1986, pp. 325-328.
Chen, H. Y. et al., "Characterization of the Austin Chalk Producing Trend", *SPE*, a paper prepared for presentation at the 61st Annual Technical Conference and Exhibition of the Society of Petroleum Engineers, SPE No. 15533, Oct. 1986, pp. 1-12.
Chen, K., paper titled "Analysis of Oil Film Interferometry Implementation in Non-Ideal Conditions", source unknown, Jan. 7, 2010, pp. 1-18.
Chraplyvy, A. R., "Limitations on Lightwave Communications Imposed by Optical-Fiber Nonlinearities", *Journal of Lightwave Technology*, vol. 8 No. 10, Oct. 1990, pp. 1548-1557.
Churcher, P. L. et al., "Rock Properties of Berea Sandstone, Baker Dolomite, and Indiana Limestone", a paper prepared for presentation at the SPE International Symposium on Oilfield Chemistry), *SPE*, SPE No. 21044, Feb. 1991, pp. 431-446 and 3 additional pages.
Cimetiere, A. et al., "A Damage Model for Concrete Beams in Compression", *Mechanics Research Communications*, vol. 34, 2007, pp. 91-96.
Clegg, John et al., "Improved Optimisation of Bit Selection Using Mathematically Modelled Bit-Performance Indices", *IADC/SPE International 102287*, 2006, pp. 1-10.
Close, F. et al., "Successful Drilling of Basalt in a West of Shetland Deepwater Discovery", a paper prepared for presentation at Offshore Europe 2005 by SPE (Society of Petroleum Engineers) Program Committee, SPE No. 96575, Sep. 2005, pp. 1-10.

(56) References Cited

OTHER PUBLICATIONS

Close, F. et al., "Successful Drilling of Basalt in a West of Shetland Deepwater Discovery", *SPE International 96575*, Society of Petroleum Engineers, 2006, pp. 1-10.
Cobern, Martin E., "Downhole Vibration Monitoring & Control System Quarterly Technical Report #1", *APS Technology, Inc.*, Quarterly Technical Report #1, DVMCS, 2003, pp. 1-15.
Cogotsi, G. A. et al., "Use of Nondestructive Testing Methods in Evaluation of Thermal Damage for Ceramics Under Conditions of Nonstationary Thermal Effects", *Institute of Strength Problems, Academy of Sciences of the Ukrainian SSR*, 1985, pp. 52-56.
Cohen, J. H., "High-Power Slim-Hole Drilling System", a paper presented at the conference entitled Natural Gas RD&D Contractor's Review Meeting, Office of Scientific and Technical Information, Apr. 1995, 10 pages.
Cone, C., "Case History of the University Block 9 (Wolfcamp) Field—Gas-Water Injection Secondary Recovery Project", *Journal of Petroleum Technology*, Dec. 1970, pp. 1485-1491.
Contreras, E. et al., "Effects of Temperature and Stress on the Compressibilities, Thermal Expansivities, and Porosities of Cerro Prieto and Berea Sandstones to 9000 PSI and 208 degrees Celsius", Proceedings Eighth Workshop Geothermal Reservoir Engineering, Leland Stanford Junior University, Dec. 1982, pp. 197-203.
Cook, Troy, "Chapter 23, Calculation of Estimated Ultimate Recovery (EUR) for Wells in Continuous-Type Oil and Gas Accumulations", *U.S. Geological Survey Digital Data Series DDS-69-D*, Denver, Colorado: Version 1, 2005, pp. 1-9.
Cooper, R., "Coiled Tubing Deployed ESPs Utilizing Internally Installed Power Cable—Project Update", a paper prepared by SPE (Society of Petroleum Engineers) Program Committee for presentation at the 2nd North American Coiled Tubing Roundtable, SPE 38406, Apr. 1997, pp. 1-6.
Coray, P. S. et al., "Measurements on 5:1 Scale Abrasive Water Jet Cutting Head Models", source unknown, available prior to 2012, 15 pages.
Cruden, D. M., "The Static Fatigue of Brittle Rock Under Uniaxial Compression", *Int. J. Rock Mech. Min. Sci.& Geomech. Abstr.*, vol. 11, 1974, pp. 67-73.
da Silva, B. M. G., "Modeling of Crack Initiation, Propagation and Coalescence in Rocks", a thesis for the degree of Master of Science in Civil and Environmental Engineering at the Massachusetts Institute of Technology, Sep. 2009, pp. 1-356.
Dahl, F. et al., "Development of a New Direct Test Method for Estimating Cutter Life, Based on the Sievers' J Miniature Drill Test", *Tunnelling and Underground Space Technology*, vol. 22, 2007, pp. 106-116.
Dahl, Filip et al., "Development of a new direct test method for estimating cutter life, based on the Sievers J miniature drill test", *Tunnelling and Underground Space Technology*, vol. 22, 2007, pp. 106-116.
Damzen, M. J. et al., "Stimulated Brillion Scattering", Chapter 8—SBS in Optical Fibres, OP Publishing Ltd, Published by Institute of Physics, London, England, 2003, pp. 137-153.
Das, A. C. et al., "Acousto-ultrasonic study of thermal shock damage in castable refractory", *Journal of Materials Science Letters*, vol. 10, 1991, pp. 173-175.
de Castro Lima, J. J. et al., "Linear Thermal Expansion of Granitic Rocks: Influence of Apparent Porosity, Grain Size and Quartz Content", *Bull Eng Geol Env.*, 2004, vol. 63, pp. 215-220.
De Guire, Mark R., "Thermal Expansion Coefficient (start)", *EMSE 201—Introduction to Materials Science & Engineering*, 2003, pp. 15.1-15.15.
Degallaix, J. et al., "Simulation of Bulk-Absorption Thermal Lensing in Transmissive Optics of Gravitational Waves Detector", *Appl. Phys.*, B77, 2003, pp. 409-414.
Dey, T. N. et al., "Some Mechanisms of Microcrack Growth and Interaction in Compressive Rock Failure", *Int. J. Rock Mech. Min. Sci. & Geomech. Abstr.*, vol. 18, 1981, pp. 199-209.
Diamond-Cutter Drill Bits, by Geothermal Energy Program, Office of Geothermal and Wind Technologies, 2000, 2 pgs.

Dimotakis, P. E. et al., "Flow Structure and Optical Beam Propagation in High-Reynolds-Number Gas-Phase Shear Layers and Jets", *J. Fluid Mech.*, vol. 433, 2001, pp. 105-134.
Dinçer, Ismail et al., "Correlation between Schmidt hardness, uniaxial compressive strength and Young's modulfor andesites, basalts and tuffs", *Bull Eng Geol Env*, vol. 63, 2004, pp. 141-148.
Dole, L. et al., "Cost-Effective CementitioMaterial Compatible with Yucca Mountain Repository Geochemistry", a paper prepared by Oak Ridge National Laboratory for the Department of Energy, No. ORNL/TM-2004/296, Dec. 2004, 128 pages.
Dumans, C. F. F. et al., "PDC Bit Selection Method Through the Analysis of Past Bit Performances", a paper prepared for presentation at the *SPE* (Society of Petroleum Engineers—Latin American Petroleum Engineering Conference), Oct. 1990, pp. 1-6.
Dunn, James C., "Geothermal Technology Development at Sandia", *Geothermal Research Division, Sandia National Laboratories*, 1987, pp. 1-6.
Dutton, S. P. et al., "Evolution of Porosity and Permeability in the Lower CretaceoTravis Peak Formation, East Texas", *The American Association of Petroleum Geologists Bulletin*, vol. 76, No. 2, Feb. 1992, pp. 252-269.
Dyskin, A. V. et al., "Asymptotic Analysis of Crack Interaction with Free Boundary", *International Journal of Solids and Structure*, vol. 37, 2000, pp. 857-886.
Eckel, J. R. et al., "Nozzle Design and its Effect on Drilling Rate and Pump Operation", a paper presented at the spring meeting of the Southwestern District, Division of Production, Beaumont, Texas, Mar. 1951, pp. 28-46.
Ehrenberg, S. N. et al., "Porosity-Permeability Relationship in Interlayered Limestone-Dolostone Reservoir", *The American Association of Petroleum Geologists Bulletin*, vol. 90, No. 1, Jan. 2006, pp. 91-114.
Eichler, H.J. et al., "Stimulated Brillouin Scattering in Multimode Fibers for Optical Phase Conjugation", *Optics Communications*, vol. 208, 2002, pp. 427-431.
Eighmy, T. T. et al., "Microfracture Surface Charaterizations: Implications for In Situ Remedial Methods in Fractured Rock", *Bedrock Bioremediation Center, Final Report, National Risk Management Research Laboratory, Office of Research and Development, U.S. Environmental Protection Agency*, EPA/600/R-05/121, 2006, pp. 1-99.
Elsayed, M.A. et al., "Measurement and analysis of Chatter in a Compliant Model of a Drillstring Equipped With a PDC Bit", *Mechanical Engineering Dept., University of Southwestern Louisiana and Sandia National Laboratories*, 2000, pp. 1-10.
Ersoy, A., "Wear Characteristics of PDC Pin and Hybrid Core Bits in Rock Drilling", *Wear*, vol. 188, 1995, pp. 150-165.
Extreme Coil Drilling, by Extreme Drilling Corporation, 2009, 10 pgs.
Falcao, J. L. et al., "PDC Bit Selection Through Cost Prediction Estimates Using Crossplots and Sonic Log Data", *SPE*, a paper prepared for presentation at the 1993 SPE/IADC Drilling Conference, Feb. 1993, pp. 525-535.
Falconer, I. G. et al., "Separating Bit and Lithology Effects from Drilling Mechanics Data", *SPE*, a paper prepared for presentation at the 1988 IADC/SPE Drilling Conference, Feb./Mar. 1988, pp. 123-136.
Farra, G., "Experimental Observations of Rock Failure Due to Laser Radiation", a thesis for the degree of Master of Science at Massachusetts Institute of Technology, Jan. 1969, 128 pages.
Farrow, R. L. et al., "Peak-Power Limits on Fiber Amplifiers Imposed by Self-Focusing", *Optics Letters*, vol. 31, No. 23, Dec. 1, 2006, pp. 3423-3425.
Ferro, D. et al., "Vickers and Knoop hardness of electron beam deposited ZrC and HfC thin films on titanium", *Surface & Coatings Technology*, vol. 200, 2006, pp. 4701-4707.
Fertl, W. H. et al., "Spectral Gamma-Ray Logging in the Texas Austin Chalk Trend", *SPE of AIME*, a paper for Journal of Petroleum Technology, Mar. 1980, pp. 481-488.
Field, F. A., "A Simple Crack-Extension Criterion for Time-Dependent Spallation", *J. Mech. Phys. Solids*, vol. 19, 1971, pp. 61-70.

(56) References Cited

OTHER PUBLICATIONS

Figueroa, H. et al., "Rock removal using high power lasers for petroleum exploitation purposes", *Gas Technology Institute, Colorado School of Mines, Halliburton Energy Services, Argonne National Laboratory*, 2002, pp. 1-13.

Finger, J. T. et al., "PDC Bit Research at Sandia National Laboratories", Sandia Report No. SAND89-0079-UC-253, a report prepared for Department of Energy, Jun. 1989, 88 pages.

Finger, John T. et al., "PDC Bit Research at Sandia National Laboratories", Sandia Report, *Geothermal Research Division 6252, Sandia National Laboratories*, SAND89-0079-UC-253, 1989, pp. 1-88.

Freeman, T. T. et al., "THM Modeling for Reservoir Geomechanical Applications", presented at the COMSOL Conference, Oct. 2008, 22 pages.

Friant, J. E. et al., "Disc Cutter Technology Applied to Drill Bits", a paper prepared by Exacavation Engineering Associates, Inc. for the Department of Energy's Natural Gas Conference, Mar. 1997, pp. 1-16.

Fuerschbach, P. W. et al., "Understanding Metal Vaporization from Laser Welding", Sandia Report No. SAND-2003-3490, a report prepared for DOE, Sep. 2003, pp. 1-70.

Gahan, B. C. et al., "Analysis of Efficient High-Power Fiber Lasers for Well Perforation", *SPE*, No. 90661, a paper prepared for presentation at the SPE Annual Technical Conference and Exhibition, Sep. 2004, 9 pages.

Gahan, B. C. et al., "Effect of Downhole Pressure Conditions on High-Power Laser Perforation", *SPE*, No. 97093, a paper prepared for the 2005 SPE (Society of Petroleum Engineers) Annual Technical Conference and Exhibition, Oct. 12, 2005, 7 pages.

Gahan, B. C. et al., "Laser Drilling: Drilling with the Power of Light, Phase 1: Feasibility Study", a Topical Report by the *Gas Technology Institute*, for the Government under Cooperative Agreement No. DE-FC26-00NT40917, Sep. 30, 2001, 107 pages.

Gahan, B. C. et al., "Laser Drilling: Determination of Energy Required to Remove Rock", *Society of Petroleum Engineers International*, SPE 71466, 2001, pp. 1-11.

Gahan, B. C., et al., "Laser Drilling—Drilling with the Power of Light: High Energy Laser Perforation and Completion Techniques", Annual Technical Progress Report by the *Gas Technology Institute*, to the Department of Energy, Nov. 2006, 94 pages.

Gahan, Brian C. et al. "Analysis of Efficient High-Power Fiber Lasers for Well Perforation", *Society of Petroleum Engineers*, SPE 90661, 2004, pp. 1-9.

Gahan, Brian C. et al. "Efficient of Downhole Pressure Conditions on High-Power Laser Perforation", *Society of Petroleum Engineers*, SPE 97093, 2005, pp. 1-7.

Gahan, Brian C. et al., "Laser Drilling: Drilling with the Power of Light, Phase 1: Feasibility Study", *Topical Report*, Cooperative Agreement No. DE-FC26-00NT40917, 2000-2001, pp. 1-148.

Gale, J. F. W. et al., "Natural Fractures in the Barnett Shale and Their Importance for Hydraulic Fracture Treatments", The American Assoction of Petroleum Geologists, *AAPG Bulletin*, vol. 91, No. 4, Apr. 2007, pp. 603-622.

Gardner, R. D. et al., "Flourescent Dye Penetrants Applied to Rock Fractures", *Int. J. Rock Mech. Min. Sci.*, vol. 5, 1968, pp. 155-158 with 2 additional pages.

Gelman, A., "Multi-level (hierarchical) modeling: what it can and can't do", source unknown, Jun. 1, 2005, pp. 1-6.

Gerbaud, L. et al., "PDC Bits: All Comes From the Cutter/Rock Interaction", SPE, No. IADC/SPE 98988, a paper presented at the IADC/SPE Drilling Conference, Feb. 2006, pp. 1-9.

Glowka, David A. et al., "Program Plan for the Development of Advanced Synthetic-Diamond Drill Bits for Hard-Rock Drilling", *Sandia National Laboratories*, SAND 93-1953, 1993, pp. 1-50.

Glowka, David A. et al., "Progress in the Advanced Synthetic-Diamond Drill Bit Program", *Sandia National Laboratories*, SAND95-2617C, 1994, pp. 1-9.

Glowka, David A., "Design Considerations for a Hard-Rock PDC Drill Bit", *Geothermal Technology Development Division 6241, Sandia National Laboratories*, SAND-85-0666C, DE85 008313, 1985, pp. 1-23.

Glowka, David A., "Development of a Method for Predicting the Performance and Wear of PDC Drill Bits", *Sandia National Laboratories*, SAND86-1745-UC-66c, 1987, pp. 1-206.

Glowka, David A., "The Use of Single—Cutter Data in the Analysis of PDC Bit Designs", *61st Annual Technical Conference and Exhibition of Society of Petroleum Engineers*, 1986, pp. 1-37.

Gonthier, F. "High-power All-Fiber® components: The missing link for high power fiber fasers", source unknown, 11 pages.

Graves, R. M. et al., "Comparison of Specific Energy Between Drilling With High Power Lasers and Other Drilling Methods", *SPE*, No. SPE 77627, a paper presented at the SPE (Society of Petroleum Engineers) Annual Technical Conference and Exhibiton, Sep. 2002, pp. 1-8.

Graves, R. M. et al., "Spectral signatures and optic coeffecints of surface and reservoir rocks at COIL, CO2 and Nd:YAG laser wavelenghts", source unknown, 13 pages.

Graves, R. M. et al., "StarWars Laser Technology Applied to Drilling and Completing Gas Wells", *SPE*, No. 49259, a paper prepared for presentation at the 1998 SPE Annual Technical Conference and Exhibition, 1998, pp. 761-770.

Graves, Ramona M. et al., "Application of High Power Laser Technology to Laser/Rock Destruction: Where Have We Been? Where Are We Now?", *SW AAPG Convention*, 2002, pp. 213-224.

Graves, Ramona M. et al., "Laser Parameters That Effect Laser-Rock Interaction: Determining the Benefits of Applying Star Wars Laser Technology for Drilling and Completing Oil and Natural Gas Wells", Topical Report, *Petroleum Engineering Department, Colorado School of Mines*, 2001, pp. 1-157.

Green, D. J. et al., "Crack Arrest and Multiple Crackling in Glass Through the Use of Designed Residual Stress Profiles", *Science*, vol. 283, No. 1295, 1999, pp. 1295-1297.

Grigoryan, V., "InhomogeneoBoundary Value Problems", a lecture for Math 124B, Jan. 26, 2010, pp. 1-5.

Grigoryan, V., "Separathion of variables: Neumann Condition", a lecture for Math 124A, Dec. 1, 2009, pp. 1-3.

Gunn, D. A. et al., "Laboratory Measurement and Correction of Thermal Properties for Application to the Rock Mass", *Geotechnical and Geological Engineering*, vol. 23, 2005, pp. 773-791.

Guo, B. et al., "Chebyshev Rational Spectral and Pseudospectral Methods on a Semi-infinite Interval", *Int. J. Numer. Meth. Engng*, vol. 53, 2002, pp. 65-84.

Gurarie, V. N., "Stress Resistance Parameters of Brittle Solids Under Laser/Plasma Pulse Heating", *Materials Science and Engineering*, vol. A288, 2000, pp. 168-172.

Habib, P. et al., "The Influence of Residual Stresses on Rock Hardness", *Rock Mechanics*, vol. 6, 1974, pp. 15-24.

Hagan, P. C., "The Cuttability of Rock Using a High Pressure Water Jet", University of New South Wales, Sydney, Australia, obtained form the Internet on Sep. 7, 2010, at: http://www.mining.unsw.edu.au/Publications/publications_staff/Paper_Hagan_WASM.htm, 16 pages.

Hall, K. et al., "Rock Albedo and Monitoring of Thermal Conditions in Respect of Weathering: Some Expected and Some Unexpected Results", *Earth Surface Processes and Landforms*, vol. 30, 2005, pp. 801-811.

Hall, Kevin, "The role of thermal stress fatigue in the breakdown of rock in cold regions", *Geomorphology*, vol. 31, 1999, pp. 47-63.

Hammer, D. X. et al., "Shielding Properties of Laser-Induced Breakdown in Water for Pulse Durations from 5 ns to 125 fs", *Applied Optics*, vol. 36, No. 22, Aug. 1, 1997, pp. 5630-5640.

Han, Wei, "Computational and experimental investigations of laser drilling and welding for microelectronic packaging", *Dorchester Polytechnic Institute*, A Dissertation submitted in May 2004, 242 pgs.

Hancock, M. J., "The 1-D Heat Equation: 18.303 Linear Partial Differential Equations", source unknown, 2004, pp. 1-41.

Hareland, G. et al., "Drag—Bit Model Including Wear", *SPE*, No. 26957, a paper prepared for presentation at the Latin American/Caribbean Petroleum Engineering Conference, Apr. 1994, pp. 657-667.

(56) References Cited

OTHER PUBLICATIONS

Hareland, G. et al., "Cutting Efficiency of a Single PDC Cutter on Hard Rock", *Journal of Canadian Petroleum Technology*, vol. 48, No. 6, 2009, pp. 1-6.
Hareland, G., et al., "A Drilling Rate Model for Roller Cone Bits and Its Application", *SPE*, No. 129592, a paper prepared for presentation at the CPS/SPE International Oil and Gas Conference and Exhibition, Jun. 2010, pp. 1-7.
Harrison, C. W. III et al., "Reservoir Characterization of the Frontier Tight Gas Sand, Green River Basin, Wyoming", *SPE*, No. 21879, a paper prepared for presentation at the Rocky Mountain Regional Meeting and Low-Permeability Reservoirs Symposium, Apr. 1991, pp. 717-725.
Hashida, T. et al., "Numerical Simulation with Experimental Verification of the Fracture Behavior in Granite Under Confining Pressures based on the Tension-Softening Model", *International Journal of Fracture*, vol. 59, 1993, pp. 227-244.
Nesting, M. A. et al., "Evaluation of the Environmental Impacts of Induced Seismicity at the Naknek Geothermal Energy Project, Naknek, Alaska", a final report prepared for ASRC Energy Services Alaska Inc., May 2010, pp. 1-33.
Head, P. et al., "Electric Coiled Tubing Drilling (E-CTD) Project Update", *SPE*, No. 68441, a paper prepared for presentation at the SPE/CoTA Coiled Tubing Roundtable, Mar. 2001, pp. 1-9.
Healy, Thomas E., "Fatigue Crack Growth in Lithium Hydride", *Lawrence Livermore National Laboratory*, 1993, pp. 1-32.
Hettema, M. H. H. et al., "The Influence of Steam Pressure on Thermal Spelling of Sedimentary Rock: Theory and Experiments", *Int. J. Rock Mech. Min. Sci.*, vol. 35, No. 1, 1998, pp. 3-15.
Hibbs, Louis E. et al., "Wear Machanisms for Polycrystalline-Diamond Compacts as Utilized fro Drilling in Geothermal Environments", *Sandia National Laboratories*, for the United States Government, Report No. SAND-82-7213, 1983, 287 pgs.
Hoek, E., "Fracture of Anisotropic Rock", *Journal of the South African Institute of Mining and Metallurgy*, vol. 64, No. 10, 1964, pp. 501-523.
Hood, M., "Waterjet-Assisted Rock Cutting Systems—The Present State of the Art", *International Journal of Mining Engineering*, vol. 3, 1985, pp. 91-111.
Hoover, Ed R. et al., "Failure Mechanisms of Polycrystalline-Diamond Compact Drill Bits in Geothermal Environments", Sandia Report, *Sandia National Laboratories*, SAND81-1404, 1981, pp. 1-35.
Howard, A. D. et al., "VOLAN Interpretation and Application in the Bone Spring Formation (Leonard Series) in Southeastern New Mexico", *SPE*, No. 13397, a paper presented at the 1984 SPE Production Technology Symposium, Nov. 1984, 10 pages.
Howells, G., "Super-Water [R] Jetting Applications from 1974 to 1999", paper presented st the Proceedings of the $10^{th}$ American Waterjet Confeence in Houston, Texas, 1999, 25 pages.
Hu, H. et al., "SimultaneoVelocity and Concentration Measurements of a Turbulent Jet Mixing Flow", *Ann. N.Y. Acad. Sci.*, vol. 972, 2002, pp. 254-259.
Huang, C. et al., "A Dynamic Damage Growth Model for Uniaxial Compressive Response of Rock Aggregates", *Mechanics of Materials*, vol. 34, 2002, pp. 267-277.
Huang, H. et al., "Intrinsic Length Scales in Tool-Rock Interaction", *International Journal of Geomechanics*, Jan./Feb. 2008, pp. 39-44.
Huenges, E. et al., "The Stimulation of a Sedimentary Geothermal Reservoir in the North German Basin: Case Study Grob Schonebeck", *Proceedings, Twenty-Ninth Workshop on Geothermal Reservoir Engineering*, Stanford University, Stanford, California, Jan. 26-28, 2004, 4 pages.
Huff, C. F. et al., "Recent Developments in Polycrystalline Diamond-Drill-Bit Design", *Drilling Technology Division—4741, Sandia National Laboratories*, 1980, pp. 1-29.
Hutchinson, J. W., "Mixed Mode Cracking in Layered Materials", *Advances in Applied Mechanics*, vol. 29, 1992, pp. 63-191.
IADC Dull Grading System for Fixed Cutter Bits, by Hughes Christensen, 1996, 14 pgs.
Imbt, W. C. et al., "Porosity in Limestone and Dolomite Petroleum Reservoirs", paper presented at the Mid Continent District, Division of Production, Oklahoma City, Oklahoma, Jun. 1946, pp. 364-372.
Jackson, M. K. et al., "Nozzle Design for Coherent Water Jet Production", source unknown, believed to be published prior to 2012, pp. 53-89.
Jadoun, R. S., "Study on Rock-Drilling Using PDC Bits for the Prediction of Torque and Rate of Penetration", *Int. J. Manufacturing Technology and Management*, vol. 17, No. 4, 2009, pp. 408-418.
Jain, R. K. et al., "Development of Underwater Laser Cutting Technique for Steel and Zircaloy for Nuclear Applications", *Journal of Physics for Indian Academy of Sciences*, vol. 75 No. 6, Dec. 2010, pp. 1253-1258.
Jen, C. K. et al., "Leaky Modes in Weakly Guiding Fiber Acoustic Waveguides", *IEEE Transactions on Ultrasonic Ferroelectrics and Frequency Control*, vol. UFFC-33 No. 6, Nov. 1986, pp. 634-643.
Jimeno, Carlos Lopez et al., Drilling and Blasting of Rocks, a. a. *Balkema* Publishers, 1995, 30 pgs.
Judzis, A. et al., "Investigation of Smaller Footprint Drilling System; Ultra-High Rotary Speed Diamond Drilling Has Potential for Reduced Energy Requirements", IADC/SPE No. 99020, 33 pages.
Jurewicz, B. R., "Rock Excavation with Laser Assistance", *Int. J. Rock Mech. Min. Sci. & Geomech. Abstr.*, vol. 13, 1976, pp. 207-219.
Kahraman, S. et al., "Dominant rock properties affecting the penetration rate of percussive drills", *International Journal of Rock Mechanics and Mining Sciences*, 2003, vol. 40, pp. 711-723.
Karakas, M., "Semianalytical Productivity Models for Perforated Completions", *SPE*, No. 18247, a paper for SPE (Society of Petroleum Engineers) Production Engineering, Feb. 1991, pp. 73-82.
Karasawa, H. et al., "Development of PDC Bits for Downhole Motors", *Proceedings 17th NZ Geothermal Workshop*, 1995, pp. 145-150.
Kelsey, James R., "Drilling Technology/GDO", *Sandia National Laboratories*, SAND-85-1866c, DE85 017231, 1985, pp. 1-7.
Kemeny, J. M., "A Model for Non-linear Rock Deformation Under Compression Due to Sub-critical Crack Growth", *Int. J. Rock Mech. Min. Sci. & Geomech. Abstr.*, vol. 28 No. 6, 1991, pp. 459-467.
Kerr, Callin Joe, "PDC Drill Bit Design and Field Application Evolution", *Journal of Petroleum Technology*, 1988, pp. 327-332.
Ketata, C. et al., "Knowledge Selection for Laser Drilling in the Oil and Gas Industry", *Computer Society*, 2005, pp. 1-6.
Khan, Ovais U. et al., "Laser heating of sheet metal and thermal stress development", *Journal of Materials Processing Technology*, vol. 155-156, 2004, pp. 2045-2050.
Khandelwal, M., "Prediction of Thermal Conductivity of Rocks by Soft Computing", *Int. J. Earth Sci. (Geol. Rundsch)*, May 11, 2010, 7 pages.
Kim, C. B. et al., "Measurement of the Refractive Index of Liquids at 1.3 and 1.5 Micron Using a Fibre Optic Fresnel Ratio Meter", *Meas. Sci. Technol.*, vol. 5, 2004, pp. 1683-1686.
Kim, K. R. et al., "$CO_2$ laser-plume interaction in materials processing", *Journal of Applied Physics*, vol. 89, No. 1, 2001, pp. 681-688.
Kiwata, T. et al., "Flow Visualization and Characteristics of a Coaxial Jet with a Tabbed Annular Nozzle", *JSME International Journal Series B*, vol. 49, No. 4, 2006, pp. 906-913.
Klotz, K. et al., "Coatings with intrinsic stress profile: Refined creep analysis of (Ti,A1)N and cracking due to cyclic laser heating", *Thin Solid Films*, vol. 496, 2006, pp. 469-474.
Kobayashi, T. et al., "Drilling a 2-inch in Diameter Hole in Granites Submerged in Water by CO2 Lasers", *SPE*, No. 119914, a paper prepared for presentation at the SPE/IADC Drilling Conference and Exhibition, Mar. 2009, 6 pages.
Kobayashi, Toshio et al., "Drilling a 2-inch in Diameter Hole in Granites Submerged in Water by $CO_2$ Lasers", *SPE International, IADC 119914 Drilling Conference and Exhibition*, 2009, pp. 1-11.
Kobyakov, A. et al., "Design Concept for Optical Fibers with Enhanced SBS Threshold", *Optics Express*, vol. 13, No. 14, Jul. 11, 2005, pp. 5338-5346.
Kolari, K., "Damage Mechanics Model for Brittle Failure of Transversely Isotropic Solids (Finite Element Implementation)", *VTT Publications 628*, 2007, 210 pages.

(56) References Cited

OTHER PUBLICATIONS

Kollé, J. J., "A Comparison of Water Jet, Abrasive Jet and Rotary Diamond Drilling in Hard Rock", *Tempress Technologies Inc.*, 1999, pp. 1-8.
Kolle, J. J., "HydroPulse Drilling", a Final Report for Department of Energy under Cooperative Development Agreement No. DE-FC26-FT34367, Apr. 2004, 28 pages.
Kovalev, V. I. et al., "Observation of Hole Burning in Spectrum in SBS in Optical Fibres Under CW Monochromatic Laser Excitation", IEEE, Jun. 3, 2010, pp. 56-57.
Koyamada, Y. et al., "Simulating and Designing Brillouin Gain Spectrum in Single-Mode Fibers", *Journal of Lightwave Technology*, vol. 22, No. 2, Feb. 2004, pp. 631-639.
Krajcinovic, D. et al., "A Micromechanical Damage Model for Concrete", *Engineering Fracture Mechanics*, vol. 25, No. 5/6, 1986, pp. 585-596.
Kranz, R. L., "Microcracks in Rocks: A Review", *Tectonophysics*, vol. 100, 1983, pp. 449-480.
Kubacki, Emily et al., "Optics for Fiber Laser Applications", *CVI Laser, LLC*, Technical Reference Document #20050415, 2005, 5 pgs.
Kujawski, Daniel, "A fatigue crack driving force parameter with load ratio effects", International Journal of Fatigue, vol. 23, 2001, pp. S239-S246.
Labuz, J. F. et al., "Experiments with Rock: Remarks on Strength and Stability Issues", *International Journal of Rock Mechanics & Mining Science*, vol. 44, 2007, pp. 525-537.
Labuz, J. F. et al., "Size Effects in Fracture of Rock", *Rock Mechanics for Industry*, Amadei, Kranz, Scott & Smeallie (eds), 1999, pp. 1137-1143.
Labuz, J. F. et al., "Microrack-dependent fracture of damaged rock", *International Journal of Fracture*, vol. 51, 1991, pp. 231-240.
Lacy, Lewis L., "Dynamic Rock Mechanics Testing for Optimized Fracture Designs", *Society of Petroleum Engineers International, Annual Technical Conference and Exhibition*, 1997, pp. 23-36.
Lally, Evan M., "A Narrow-Linewidth Laser at 1550 nm Using the Pound-Drever-Hall Stabilization Technique", *Thesis*, submitted to Virginia Polytechnic Institute and State University, Blacksburg, Virginia, 2006, 92 pgs.
Langeveld, C. J., "PDC Bit Dynamics", a paper prepared for presentation at the 1992 IADC/SPE Drilling Conference, Feb. 1992, pp. 227-241.
Lau, John H., "Thermal Fatigue Life Prediction of Flip Chip Solder Joints by Fracture Mechanics Method", *Engineering Fracture Mechanics*, vol. 45, No. 5, 1993, pp. 643-654.
Lee, S. H. et al., "Themo-Poroelastic Analysis of Injection-Induced Rock Deformation and Damage Evolution", *Proceedings Thirty-Fifth Workshop on Geothermal Reservoir Engineering*, Feb. 2010, 9 pages.
Lee, Y. W. et al., "High-Power Yb3+ Doped Phosphate Fiber Amplifier", *IEEE Journal of Selected Topics in Quantum Electronics*, vol. 15, No. 1, Jan./Feb. 2009, pp. 93-102.
Legarth, B. et al., "Hydraulic Fracturing in a Sedimentary Geothermal Reservoir: Results and Implications", *International Journal of Rock Mechanics & Mining Sciences*, vol. 42, 2005, pp. 1028-1041.
Lehnhoff, T. F. et al., "The Influence of Temperature Dependent Properties on Thermal Rock Fragmentation", *Int. J. Rock Mech. Min. Sci. & Geomech. Abstr.*, vol. 12, 1975, pp. 255-260.
Leong, K. H. et al., "Lasers and Beam Delivery for Rock Drilling", *Argonne National Laboratory*, ANL/TD/TM03-01, 2003, pp. 1-35.
Leong, K. H., "Modeling Laser Beam-Rock Interaction", a report prepared for Department of Energy (http://www.doe.gov/bridge), 8 pages.
Leung, M. et al., "Theoretical study of heat transfer with moving phase-change interface in thawing of frozen food", *Journal of Physics D: Applied Physics*, vol. 38, 2005, pp. 477-482.
Li, Q. et al., "Experimental Research on Crack Propagation and Failure in Rock-type Materials under Compression", *EJGE*, vol. 13, Bund. D, 2008, p. 1-13.

Li, X. B. et al., "Experimental Investigation in the Breakage of Hard Rock by the PDC Cutters with Combined Action Modes", *Tunnelling and Underground Space Technology*, vol. 16., 2001, pp. 107-114.
Liddle, D. et al., "Cross Sector Decommissioning Workshop", presentation, Mar. 23, 2011, 14 pages.
Lima, R. S. et al., "Elastic ModulMeasurements via Laser-Ultrasonic and Knoop Indentation Techniques in Thermally Sprayed Coatings", *Journal of Thermal Spray Technology*, vol. 14(1), 2005, pp. 52-60.
Lin, Y. T., "The Impact of Bit Performance on Geothermal-Well Cost", *Sandia National Laboratories*, Sand-81-1470C, 1981, pp. 1-6.
Lindholm, U. S. et al., "The Dynamic Strength and Fracture Properties of Dresser Basalt", *Int. J. Rock Mech. Min. Sci. & Geomech. Abstr.*, vol. 11, 1974, pp. 181-191.
Loland, K. E., "ContinuoDamage Model for Load-Response Estimation of Concrete", *Cement and Concrete Research*, vol. 10, 1980, pp. 395-402.
Lomov, I. N. et al., "Explosion in the Granite Field: Hardening and Softening Behavior in Rocks", *U.S. Department of Energy, Lawrence Livermore National Laboratory*, 2001, pp. 1-7.
Long, S. G. et al., "Thermal fatigue of particle reinforced metal-matrix composite induced by laser heating and mechanical load", *Composites Science and Technology*, vol. 65, 2005, pp. 1391-1400.
Lorenzana, H. E. et al., "Metastability of Molecular Phases of Nitrogen: Implications to the Phase Diagram", a manuscript submitted to the European Hight Pressure Research Group 39 Conference, *Advances on High Pressure*, Sep. 21, 2001, 18 pages.
Lubarda, V. A. et al., "Damage Model for Brittle Elastic Solids with Unequal Tensile and Compressive Strengths", *Engineering Fracture Mechanics*, vol. 29, No. 5, 1994, pp. 681-692.
Lucia, F. J. et al., "Characterization of Diagenetically Altered Carbonate Reservoirs, South Cowden Grayburg Reservoir, West Texas", a paper prepared for presentation at the 1996 SPE Annual Technical Conference and Exhibition, Oct. 1996, pp. 883-893.
Luffel, D. L. et al., "Travis Peak Core Permeability and Porosity Relationships at Reservoir Stress", *SPE Formation Evaluation*, Sep. 1991, pp. 310-318.
Luft, H. B. et al., "Development and Operation of a New Insulated Concentric Coiled Tubing String for ContinuoSteam Injection in Heavy Oil Production", Conference Paper published by Society of Petroleum Engineers on the Internet at: (http://www.onepetro.org/mslib/servlet/onepetropreview?id=00030322), on Aug. 8, 2012, 1 page.
Lund, M. et al., "Specific Ion Binding to Macromolecules: Effect of Hydrophobicity and Ion Pairing", *Langmuir*, 2008 vol. 24, 2008, pp. 3387-3391.
Lyons, K. David et al., "NETL Extreme Drilling Laboratory Studies High Pressure High Temperature Drilling Phenomena", *U.S. Department of Energy, National Energy Technology Laboratory*, 2007, pp. 1-6.
Manrique, E. J. et al., "EOR Field Experiences in Carbonate Reservoirs in the United States", *SPE Reservoir Evaluation & Engineering*, Dec. 2007, pp. 667-686.
Maqsood, A. et al., "Thermophysical Properties of PoroSandstones: Measurement and Comparative Study of Some Representative Thermal Conductivity Models", *International Journal of Thermophysics*, vol. 26, No. 5, Sep. 2005, pp. 1617-1632.
Marcuse, D., "Curvature Loss Formula for Optical Fibers", *J. Opt. Soc. Am.*, vol. 66, No. 3, 1976, pp. 216-220.
Marshall, David B. et al., "Indentation of Brittle Materials", *Microindentation Techniques in Materials Science and Engineering, ASTM STP 889; American Society for Testing and Materials*, 1986, pp. 26-46.
Martin, C. D., "Seventeenth Canadian Geotechnical Colloquium: The Effect of Cohesion Loss and Stress Path on Brittle Rock Strength", *Canadian Geotechnical Journal*, vol. 34, 1997, pp. 698-725.
Martins, A. et al., "Modeling of Bend Losses in Single-Mode Optical Fibers", Institutu de Telecomunicacoes, Portugal, 3 pages.
Maurer, W. C. et al., "Laboratory Testing of High-Pressure, High-Speed PDC Bits", a paper prepared for presentation at the 61st Annual Technical Conference and Exhibition of the Society of Petroleum Engineers, Oct. 1986, pp. 1-8.

(56) References Cited

OTHER PUBLICATIONS

Maurer, William C., "Advanced Drilling Techniques", published by Petroleum Publishing Co., copyright 1980, 26 pgs.

Maurer, William C., "Novel Drilling Techniques", published by Pergamon Press, UK, copyright 1968, pp. 1-64.

Mazerov, Katie, "Bigger coil sizes, hybrid rigs, rotary steerable advances push coiled tubing drilling to next level", *Drilling Contractor*, 2008, pp. 54-60.

McElhenny, John E. et al., "Unique Characteristic Features of Stimulated Brillouin Scattering in Small-Core Photonic Crystal Fibers", *J. Opt. Soc. Am. B*, vol. 25, No. 4, 2008, pp. 582-593.

McKenna, T. E. et al., "Thermal Conductivity of Wilcox and Frio Sandstones in South Texas (Gulf of Mexico Basin)", *AAPG Bulletin*, vol. 80, No. 8, Aug. 1996, pp. 1203-1215.

Medvedev, I. F. et al., "Optimum Force Characteristics of Rotary-Percussive Machines for Drilling Blast Holes", Moscow, Translated from *Fiziko-Tekhnicheskie Problemy Razrabotki Poleznykh Iskopaemykh*, No. 1, 1967, pp. 77-80.

Meister, S. et al., "Glass Fibers for Stimulated Brillouin Scattering and Phase Conjugation", *Laser and Particle Beams*, vol. 25, 2007, pp. 15-21.

Mejia-Rodriguez, G. et al., "Multi-Scale Material Modeling of Fracture and Crack Propagation", Final Project Report in Multi-Scale Methods in Applied Mathematics, while the date of the publication is unknown, it is believed to be prior to Aug. 19, 2009, pp. 1-9.

Mensa-Wilmot, G. et al., "New PDC Bit Technology, Improved Drillability Analysis, and Operational Practices Improve Drilling Performance in Hard and Highly HeterogeneoApplications", a paper prepared for the 2004 SPE (Society of Petroleum Engineers) Eastern Regional Meeting, Sep. 2004, pp. 1-14.

Mensa-Wilmot, Graham et al., "Advanced Cutting Structure Improves PDC Bit Performance in Hard and Abrasive Drilling Environments", *Society of Petroleum Engineers International*, 2003, pp. 1-13.

Messaoud, Louafi, "Influence of Fluids on the Essential Parameters of Rotary Percussive Drilling", *Laboratoire d'Environnement (Tébessa)*, vol. 14, 2009, pp. 1-8.

Messica, A. et al., "Theory of Fiber-Optic Evanescent-Wave Spectroscopy and Sensor", *Applied Optics*, vol. 35, No. 13, May 1, 1996, pp. 2274-2284.

Mills, W. R. et al., "Pulsed Neutron Porosity Logging", SPWLA Twenty-Ninth Annual Logging Symposium, Jun. 1988, pp. 1-21.

Mirkovich, V. V., "Experimental Study Relating Thermal Conductivity to Thermal Piercing of Rocks", *Int. J. Rock Mech. Min. Sci.*, vol. 5, 1968, pp. 205-218.

Mittelstaedt, E. et al., "A Noninvasive Method for Measuring the Velocity of Diffuse Hydrothermal Flow by Tracking Moving Refractive Index Anomalies", *Geochemistry Geophysics Geosystems*, vol. 11, No. 10, Oct. 8, 2010, pp. 1-18.

Moavenzadeh, F. et al., "Thin Disk Technique for Analyzing Fock Fractures Induced by Laser Irradiation", a report prepared for the Department of Transportation under Contract C-85-65, May 1968, 91 pages.

Mocofanescu, A. et al., "SBS threshold for single mode and multimode GRIN fibers in an all fiber configuration", *Optics Express*, vol. 13, No. 6, 2005, pp. 2019-2024.

Montross, C. S. et al., "Laser-Induced Shock Wave Generation and Shock Wave Enhancement in Basalt", *International Journal of Rock Mechanics and Mining Sciences*, 1999, pp. 849-855.

Moradian, Z. A. et al., "Predicting the Uniaxial Compressive Strength and Static Young's Modulof Intact Sedimentary Rocks Using the Ultrasonic Test", *International Journal of Geomechanics*, vol. 9, No. 1, 2009, pp. 14-19.

Morozumi, Y. et al., "Growth and Structures of Surface Disturbances of a Round Liquid Jet in a Coaxial Airflow", *Fluid Dynamics Research*, vol. 34, 2004, pp. 217-231.

Morse, J. W. et al., "Experimental and Analytic Studies to Model Reaction Kinetics and Mass Transport of Carbon Dioxide Sequestration in Depleted Carbonate Reservoirs", a Final Scientific/Technical Report for DOE, while the date of the publication is unknown, it is believed to be prior to Aug. 19, 2009, 158 pages.

Moshier, S. O., "Microporosity in Micritic Limestones: A Review", *Sedimentary Geology*, vol. 63, 1989, pp. 191-213.

Mostafa, M. S. et al., "Investigation of Thermal Properties of Some Basalt Samples in Egypt", *Journal of Thermal Analysis and Calorimetry*, vol. 75, 2004, pp. 178-188.

Mukhin, I. B. et al., "Experimental Study of Kilowatt-Average-Power Faraday Isolators", OSA/ASSP, 2007, 3 pages.

Multari, R. A. et al., "Effect of Sampling Geometry on Elemental Emissions in Laser-Induced Breaakdown Spectroscopy", *Applied Spectroscopy*, vol. 50, No. 12, 1996, pp. 1483-1499.

Munro, R. G., "Effective Medium Theory of the Porosity Dependence of Bulk Moduli", *Communications of American Ceramic Society*, vol. 84, No. 5, 2001, pp. 1190-1192.

Murphy, H. D., "Thermal Stress Cracking and Enhancement of Heat Extraction from Fractured Geothermal Reservoirs", a paper submitted to the Geothermal Resource Council for its 1978 Annual Meeting, Jul. 1978, 7 pages.

Murrell, S. A. F. et al., "The Effect of Temperature on the Strength at High Confining Pressure of Granodiorite Containing Free and Chemically-Bound Water", *Mineralogy and Petrology*, vol. 55, 1976, pp. 317-330.

Muto, Shigeki et al., "Laser cutting for thick concrete by multi-pass technique", *Chinese Optics Letters*, vol. 5 Supplement, 2007, pp. S39-S41.

Myung, I. J., "Tutorial on Maximum Likelihood Estimation", *Journal of Mathematical Psychology*, vol. 47, 2003, pp. 90-100.

Nakano, A. et al., "Visualization for Heat and Mass Transport Phenomena in Supercritical Artificial Air", *Cryogenics*, vol. 45, 2005, pp. 557-565.

Naqavi, I. Z. et al., "Laser heating of multilayer assembly and stress levels: elasto-plastic consideration", *Heat and Mass Transfer*, vol. 40, 2003, pp. 25-32.

Nara, Y. et al., "Study of Subcritical Crack Growth in Andesite Using the Double Torsion Test", *International Journal of Rock Mechanics & Mining Sciences*, vol. 42, 2005, pp. 521-530.

Nara, Y. et al., "Sub-critical crack growth in anisotropic rock", *International Journal of Rock Mechanics and Mining Sciences*, vol. 43, 2006, pp. 437-453.

Nemat-Nasser, S. et al., "Compression-Induced Nonplanar Crack Extension With Application to Splitting, Exfoliation, and Rockburst", *Journal of Geophysical Research*, vol. 87, No. B8, 1982, pp. 6805-6821.

Nicklaus, K. et al., "Optical Isolator for Unpolarized Laser Radiation at Multi-Kilowatt Average Power", *Optical Society of America*, 2005, 3 pages.

Nikles, M. et al., "Brillouin Gain Spectrum Characterization in Single-Mode Optical Fibers", *Journal of Lightwave Technology*, vol. 15, No. 10, Oct. 1997, pp. 1842-1851.

Nilsen, B. et al., "Recent Developments in Site Investigation and Testing for Hard Rock TBM Projects", *1999 RETC Proceedings*, 1999, pp. 715-731.

Nimick, F. B., "Empirical Relationships Between Porosity and the Mechanical Properties of Tuff", *Key Questions in Rock Mechanics*, Cundall et al. (eds), 1988, pp. 741-742.

Nolen-Hoeksema, R., "Fracture Development and Mechnical Stratigraphy of Austin Chalk, Texas: Discussion", a discussion for The American Association of Petroleum Geologists Bulletin, vol. 73, No. 6, Jun. 1989, pp. 792-793.

O'Hare, Jim et al., "Design Index: A Systematic Method of PDC Drill-Bit Selection", *Society of Petroleum Engineers International*, IADC/SPE Drilling Conference, 2000, pp. 1-15.

Oglesby, K. et al., "Advanced Ultra High Speed Motor for Drilling", a project update by Impact Technologies LLC for the Department of Energy, Sep. 12, 2005, 36 pages.

Okon, P. et al., "Laser Welding of Aluminium Alloy 5083", *21st International Congress on Applications of Lasers and Electro-Optics*, 2002, pp. 1-9.

Olsen, F. O., "Fundamental Mechanisms of Cutting Front Formation in Laser Cutting", *SPIE*, vol. 2207, pp. 402-413.

(56) References Cited

OTHER PUBLICATIONS

Ortega, Alfonso et al., "Frictional Heating and Convective Cooling of Polycrystalline Diamond Drag Tools During Rock Cutting", Report No. SAND 82-0675c, *Sandia National Laboratories*, 1982, 23 pgs.

Ortega, Alfonso et al., "Studies of the Frictional Heating of Polycrystalline Diamond Compact Drag Tools During Rock Cutting", *Sandia National Laboratories*, SAND-80-2677, 1982, pp. 1-151.

Ortiz, Blas et al., Improved Bit Stability Reduces Downhole Harmonics (Vibrations), *International Association of Drilling Contractors/Society of Petroleum Engineers Inc.*, 1996, pp. 379-389.

Ouyang, L. B. et al., "General Single Phase Wellbore Flow Model", a report prepared for the COE/PETC, May 2, 1997, 51 pages.

Palashchenko, Yuri A., "Pure Rolling of Bit Cones Doubles Performance", *I & Gas Journal*, vol. 106, 2008, 8 pgs.

Palchaev, D. K. et al., "Thermal Expansion of Silicon Carbide Materials", *Journal of Engineering Physics and Thermophysics*, vol. 66, No. 6, 1994, 3 pages.

Pardoen, T. et al., "An extended model for void growth and Coalescence", *Journal of the Mechanics and Physics of Solids*, vol. 48, 2000, pp. 2467-2512.

Park, Un-Chul et al., "Thermal Analysis of Laser Drilling Processes", *IEEE Journal of Quantum Electronics*, 1972, vol. QK-8, No. 2, 1972, pp. 112-119.

Parker, R. et al., "Drilling Large Diameter Holes in Rocks Using Multiple Laser Beams (504)", while the date of the publication is unknown, it is believed to be prior to Aug. 19, 2009, 6 pages.

Parker, Richard A. et al., "Laser Drilling Effects of Beam Application Methods on Improving Rock Removal", *Society of Petroleum Engineers*, SPE 84353, 2003, pp. 1-7.

Patricio, M. et al., "Crack Propagation Analysis", while the date of the publication is unknown, it is believed to be prior to Aug. 19, 2009, 24 pages.

Pavlina, E. J. et al., "Correlation of Yield Strength and Tensile Strength with Hardness for Steels", *Journals of Materials Engineering and Performance*, vol. 17, No. 6, 2008, pp. 888-893.

Peebler, R. P. et al., "Formation Evaluation with Logs in the Deep Anadarko Basin", *SPE of AIME*, 1972, 15 pages.

Pepper, D. W. et al., "Benchmarking COMSOL Multiphysics 3.5a—CFD Problems", a presentation, Oct. 10, 2009, 54 pages.

Percussion Drilling Manual, by Smith Tools, 2002, 67 pgs.

Pettitt, R. et al., "Evolution of a Hybrid Roller Cone/PDC Core Bit", a paper prepared for Geothermal Resources Council 1980 Annual Meeting, Sep. 1980, 7 pages.

Phani, K. K. et al., "Pororsity Dependence of Ultrasonic Velocity and Elastic Modulin Sintered Uranium Dioxide—a discussion", *Journal of Materials Science Letters*, vol. 5, 1986, pp. 427-430.

Ping, CAO et al., "Testing study of subcritical crack growth rate and fracture toughness in different rocks", *Transactions of NonferroMetals Society of China*, vol. 16, 2006, pp. 709-714.

Plinninger, Dr. Ralf J. et al., "Wear Prediction in Hardrock Excavation Using the CERCHAR Abrasiveness Index (CAI)", *EUROCK 2004 & 53rd Geomechanics Colloquium. Schubert (ed.)*, VGE, 2004, pp. 1-6.

Plinninger, R. J. et al., "Wear Prediction in Hardrock Excavation Using the CERCHAR Abrasiveness Index (CAI)", EUROCK 2004 & 53rd Geomechanics Colloquium, 2004, 6 pages.

Plinninger, Ralf J. et al., "Predicting Tool Wear in Drill and Blast", *Tunnels & Tunneling International Magazine*, 2002, pp. 1-5.

Plumb, R. A. et al., "Influence of Composition and Texture on Compressive Strength Variations in the Travis Peak Formation", a paper prepared for presentation at the 67th Annual Technical Conference and Exhibition of the Society of Petroleum Engineers, Oct. 1992, pp. 985-998.

Polsky, Yarom et al., "Enhanced Geothermal Systems (EGS) Well Construction Technology Evaluation Report", *Sandia National Laboratories*, Sandia Report, SAND2008-7866, 2008, pp. 1-108.

Pooniwala, S. et al., "Lasers: The Next Bit", a paper prepared for the presentation at the 2006 SPE (Society of Petroleum Engineers) Eastern Regional Meeting, Oct. 2006, pp. 1-10.

Pooniwala, Shahvir, "Lasers: the Next Bit", *Society of Petroleum Engineers*, No. SPE 104223, 2006, 10 pgs.

Porter, J. A. et al., "Cutting Thin Sheet Metal with a Water Jet Guided Laser Using VarioCutting Distances, Feed Speeds and Angles of Incidence", *Int. J. Adv. Manuf. Technol.*, vol. 33, 2007, pp. 961-967.

Potyondy, D. O. et al., "A Bonded-particle model for rock", *International Journal of Rock Mechanics and Mining Sciences*, vol. 41, 2004, pp. 1329-1364.

Potyondy, D. O., "Simulating Stress Corrosion with a Bonded-Particle Model for Rock", *International Journal of Rock Mechanics & Mining Sciences*, vol. 44, 2007, pp. 677-691.

Potyondy, D., "Internal Technical Memorandum—Molecular Dynamics with PFC", a Technical Memorandum to PFC Development Files and Itasca Website, *Molecular Dynamics with PFC*, Jan. 6, 2010, 35 pages.

Powell, M. et al., "Optimization of UHP Waterjet Cutting Head, The Orifice", Flow International, while the date of the publication is unknown, it is believed to be prior to Aug. 19, 2009, 19 pages.

Price, R. H. et al., "Analysis of the Elastic and Strength Properties of Yuccs Mountain tuff, Nevada", 26th Symposium on Rock Mechanics, Jun. 1985, pp. 89-96.

Qixian, Luo et al., "Using compression wave ultrasonic transducers to measure the velocity of surface waves and hence determine dynamic modulof elasticity for concrete", *Construction and Building Materials*, vol. 10, No. 4, 1996, pp. 237-242.

Quinn, R. D. et al., "A Method for Calculating Transient Surface Temperatures and Surface Heating Rates for High-Speed Aircraft", NASA, Dec. 2000, 35 pages.

Radkte, Robert, "New High Strength and faster Drilling TSP Diamond Cutters", Report by *Technology International, Inc.*, DOE Award No. DE-FC26-97FT34368, 2006, 97 pgs.

Ramadan, K. et al., "On the Analysis of Short-Pulse Laser Heating of Metals Using the Dual Phase Lag Heat Conduction Model", *Journal of Heat Transfer*, vol. 131, Nov. 2009, pp. 111301-1 to 111301-7.

Rao, M. V. M. S. et al., "A Study of Progressive Failure of Rock Under Cyclic Loading by Ultrasonic and AE Monitoring Techniques", *Rock Mechanics and Rock Engineering*, vol. 25, No. 4, 1992, pp. 237-251.

Rauenzahn, R. M. et al., "Rock Failure Mechanisms of Flame-Jet Thermal Spallation Drilling—Theory and Experimental Testing", *Int. J. Rock Mech. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", a dissertation for the degree of Doctor of Philosophy at Massachusettes Institute of Technology, Sep. 1986, pp. 1-524.

Rauenzahn, R. M. et al., "Rock Failure Mechanisms of Flame-Jet Thermal Spallation Drilling—Theory and Experimental Testing", *Int. J. Rock Merch. Min. Sci. & Geomech. Abstr.*, vol. 26, No. 5, 1989, pp. 381-399.

Rauenzahn, R. M., "Analysis of Rock Mechanics and Gas Dynamics of Flame-Jet Thermal Spallation Drilling", *Massachusetts Institute of Technology*, submitted in partial fulfillment of doctorate degree, 1986 583 pgs.

Ravishankar, M. K., "Some Results on Search Complexity vs Accuracy", DARPA Spoken Systems Technology Workshop, Feb. 1997, 4 pages.

Raymond, David W., "PDC Bit Testing At Sandia Reveals Influence of Chatter in Hard-Rock Drilling", *Geothermal Resources Council Monthly Bulletin*, SAND99-2655J, 1999, 7 pgs.

Ream, S. et al., "Zinc Sulfide Optics for High Power Laser Applications", Paper 1609, while the date of the publication is unknown, it is believed to be prior to Aug. 19, 2009, 7 pages.

Rice, J. R., "On the Stability of Dilatant Hardening for Saturated Rock Masses", *Journal of Geophysical Research*, vol. 80, No. 11, Apr. 10, 1975, pp. 1531-1536.

Richter, D. et al., "Thermal Expansion Behavior of IgneoRocks", *Int. J. Rock Mech. Min. Sci. & Geomech. Abstr.*, vol. 11, 1974, pp. 403-411.

Rietman, N. D. et al., "Comparative Economics of Deep Drilling in Anadarka Basin", a paper presented at the 1979 Society of Petroleum Engineers of AIME Deep Drilling and Production Symposium, Apr. 1979, 5 pages.

(56) References Cited

OTHER PUBLICATIONS

Rijken, P. et al., "Predicting Fracture Attributes in the Travis Peak Formation Using Quantitative Mechanical Modeling and Stractural Diagenesis", Gulf Coast Association of Geological Societies Transactions vol. 52, 2002, pp. 837-847.

Rijken, P. et al., "Role of Shale Thickness on Vertical Connectivity of Fractures: Application of Crack-Bridging Theory to the Austin Chalk, Texas", *Tectonophysics*, vol. 337 ,2001, pp. 117-133.

Rosier, M., "Generalized Hermite Polynomials and the Heat Equation for Dunk! Operators", a paper, while the date of the publication is unknown, it is believed to be prior to Aug. 19, 2009, pp. 1-24.

Rossmanith, H. P. et al., "Fracture Mechanics Applications to Drilling and Blasting", *Fatigue & Fracture Engineering Materials & Structures*, vol. 20, No. 11, 1997, pp. 1617-1636.

Rossmanith, H. P. et al., "Wave Propagation, Damage Evolution, and Dynamic Fracture Extension. Part I. Percussion Drilling", *Materials Science*, vol. 32, No. 3, 1996, pp. 350-358.

Rubin, A. M. et al., "Dynamic Tensile-Failure-Induced Velocity Deficits in Rock", *Geophysical Research Letters*, vol. 18, No. 2, Feb. 1991, pp. 219-222.

Sachpazis, C. I, M. Sc., Ph. D., "Correlating Schmidt Hardness With Compressive Strength and Young's ModulOf Carbonate Rocks", *International Association of Engineering Geology*, Bulletin, No. 42, 1990, pp. 75-83.

Salehi, I. A. et al., "Laser Drilling—Drilling with the Power Light", a final report a contract with DOE with award No. DE-FC26-00NT40917, May 2007, in parts 1-4 totaling 318 pages.

Sandler, I. S. et al., "An Algorithm and a Modular Subroutine for the Cap Model", *International Journal for Numerical and Analytical Methods in Geomechanics*, vol. 3, 1979, pp. 173-186.

Sano, Osam et al., "Acoustic Emission During Slow Crack Growth", *Department Mining and Mineral Engineering*, NII-Electronic Library Service, 1980, pp. 381-388.

Santarelli, F. J. et al., "Formation Evaluation From Logging on Cuttings", *SPE Reservoir Evaluation & Engineering*, Jun. 1998, pp. 238-244.

Sattler, A. R., "Core Analysis in a Low Permeability Sandstone Reservoir: Results from the Multiwell Experiment", a report by Sandia National Laboratories for the Department of Energy, Apr. 1989, 69 pages.

Scaggs, M. et al., "Thermal Lensing Compensation Objective for High Power Lasers", published by Haas Lasers Technologies, Inc., while the date of the publication is unknown, it is believed to be prior to Aug. 19, 2009, 7 pages.

Schaff, D. P. et al., "Waveform Cross-Correlation-Based Differential Travel-Time Measurements at the Northern California Seismic Network", *Bulletin of the Seismological Society of America*, vol. 95, No. 6, Dec. 2005, pp. 2446-2461.

Schaffer, C. B. et al., "Dynamics of Femtosecond Laser-Induced Breakdown in Water from Femtoseconds to Microseconds", *Optics Express*, vol. 10, No. 3, Feb. 11, 2002, pp. 196-203.

Scholz, C. H., "Microfracturing of Rock in Compression", a dissertation for the degree of Doctor of Philosophy at Massachusettes Instutute of Trechnology, Sep. 1967, 177 pages.

Schormair, Nik et al., "The influence of anisotropy on hard rock drilling and cutting", *The Geological Society of London, IAEG*, Paper No. 491, 2006, pp. 1-11.

Schroeder, R. J. et al., "High Pressure and Temperature Sensing for the Oil Industry Using Fiber Bragg Gratings Written onto Side Hole Single Mode Fiber", publisher unknown, while the date of the publication is unknown, it is believed to be prior to Aug. 19, 2009, 4 pages.

Shannon, G. J. et al., "High power laser welding in hyperbaric gas and water environments", *Journal of Laser Applications*, vol. 9, 1997, pp. 129-136.

Shiraki, K. et al., "SBS Threshold of a Fiber with a Brillouin Frequency Shift Distribution", *Journal of Lightwave Technology*, vol. 14, No. 1, Jan. 1996, pp. 50-57.

Shuja, S. Z. et al., "Laser heating of semi-infinite solid with consecutive pulses: Influence of materaial properties on temperature field", *Optics & Laser Technology*, vol. 40, 2008, pp. 472-480.

Simple Drilling Methods, WEDC Loughborough University, United Kingdom, 1995, 4 pgs.

Singh, T. N. et al., "Prediction of Thermal Conductivity of Rock Through Physico-Mechanical Properties", *Building and Environment*, vol. 42, 2007, pp. 146-155.

Sinha, D., "Cantilever Drilling—Ushering a New Genre of Drilling", a paper prepared for presentation at the SPE/IADC Middle East Drilling Technology Conference and Exhibition, Oct. 2003, 6 pages.

Sinor, A. et al., "Drag Bit Wear Model", *SPE Drilling Engineering*, Jun. 1989, pp. 128-136.

Smith, D., "Using Coupling Variables to Solve Compressible Flow, Multiphase Flow and Plasma Processing Problems", COMSOL Users Conference 2006, 38 pages.

Smith, E., "Crack Propagation at a Constant Crack Tip Stress Intensity Factor", *Int. Journal of Fracture*, vol. 16, 1980, pp. R215-R218.

Sneider, RM et al., "Rock Types, Depositional History, and Diangenetic Effects, Ivishak reservoir Prudhoe Bay Field", *SPE Reservoir Engineering*, Feb. 1997, pp. 23-30.

Soeder, D. J. et al., "Pore Geometry in High- and Low-Permeability Sandstones, Travis Peak Formation, East Texas", *SPE Formation Evaluation*, Dec. 1990, pp. 421-430.

Solomon, A. D. et al., "Moving Boundary Problems in Phase Change Models Current Research Questions", *Engineering Physics and Mathematics Division*, ACM Signum Newsletter, vol. 20, Issue 2, 1985, pp. 8-12.

Somerton, W. H. et al., "Thermal Expansion of Fluid Saturated Rocks Under Stress", SPWLA Twenty-Second Annual Logging Symposium, Jun. 1981, pp. 1-8.

Sousa, L. M. O. et al., "Influence of Microfractures and Porosity on the Physico-Mechanical Properties and Weathering of Ornamental Granites", *Engineering Geology*, vol. 77, 2005, pp. 153-168.

Sousa, Luis M. O. et al., "Influence of microfractures and porosity on the physico-mechanical properties and weathering of ornamental granites", *Engineering Geology*, vol. 77, 2005, pp. 153-168.

Stone, Charles M. et al., "Qualification of a Computer Program for Drill String Dynamics", *Sandia National Laboratories*, SAND-85-0633C, 1985, pp. 1-20.

Stowell, J. F. W., "Characterization of Opening-Mode Fracture Systems in the Austin Chalk", *Gulf Coast Association of Geological Societies Transactions*, vol. L1, 2001, pp. 313-320.

Straka, W. A. et al., "Cavitation Inception in Quiescent and Co-Flow Nozzle Jets", 9th International Conference on Hydrodynamics, Oct. 2010, pp. 813-819.

Suarez, M. C. et al., "COMSOL in a New Tensorial Formulation of Non-Isothermal Poroelasticity", publisher unknown, while the date of the publication is unknown, it is believed to be prior to Aug. 19, 2009,2 pages.

Summers, D. A., "Water Jet Cutting Related to Jet & Rock Properties", publisher unknown, while the date of the publication is unknown, it is believed to be prior to Aug. 19, 2009, 13 pages.

Suwarno, et al., "Dielectric Properties of Mixtures Between Mineral Oil and Natural Ester from Palm Oil", *WSEAS Transactions on Power Systems*, vol. 3, Issue 2, Feb. 2008, pp. 37-46.

Takarli, Mokhfi et al., "Damage in granite under heating/cooling cycles and water freeze-thaw condition", *International Journal of Rock Mechanics and Mining Sciences*, vol. 45, 2008, pp. 1164-1175.

Tanaka, K. et al., "The Generalized Relationship Between the Parameters C and m of Paris' Law for Fatigue Crack Growth", *Scripta Metallurgica*, vol. 15, No. 3, 1981, pp. 259-264.

Tang, C. A. et al., "Numerical Studies of the Influence of Microstructure on Rock Failure in Uniaxial Compression—Park I: Effect of Heterogeneity", *International Journal of Rock Mechanics and Mining Sciences*, vol. 37, 2000, pp. 555-569.

Tang, C. A. et al., "Coupled analysis of flow, stress and damage (FSD) in rock failure", *International Journal of Rock Mechanics and Mining Sciences*, vol. 39, 2002, pp. 477-489.

Tao, Q. et al., "A Chemo-Poro-Thermoelastic Model for Stress/Pore Pressure Analysis around a Wellbore in Shale", a paper prepared for presentation at the Symposium on Rock Mechanics (USRMS): *Rock*

(56) References Cited

OTHER PUBLICATIONS

*Mechanics for Energy*, Mineral and Infrastracture Development in the Northern Regions, Jun. 2005, 7 pages.

Terra, O. et al., "Brillouin Amplification in Phase Coherent Transfer of Optical Frequencies over 480 km Fiber", publisher unknown, while the date of the publication is unknown, it is believed to be prior to Aug. 19, 2009, 9 pages.

Terzopoulos, D. et al., "Modeling Inelastic Deformation: Viscoelasticity, Plasticity, Fracture", *SIGGRAPH '88*, Aug. 1988, pp. 269-278.

Thomas, R. P., "Heat Flow Mapping at the Geysers Geothermal Field", published by the California Department of Conservation Division of Oil and Gas, 1986, 56 pages.

Thompson, G. D., "Effects of Formation Compressive Strength on Perforator Performance", a paper presented of the Southern District API Division of Production, Mar. 1962, pp. 191-197.

Thorsteinsson, Hildigunnur et al., "The Impacts of Drilling and Reservoir Technology Advances on EGS Exploitation", *Proceedings, Thirty-Third Workshop on Geothermal Reservoir Engineering, Institute for Sustainable Energy, Environment, and Economy (ISEEE)*, 2008, pp. 1-14.

Tovo, R. et al., "Fatigue Damage Evaluation on Mechanical Components Under Multiaxial Loadings", excerpt from the Proceedings of the COMSOL Conference, 2009, 8 pages.

Tuler, F. R. et al., "A Criterion for the Time Dependence of Dynamic Fracture", *The International Jopurnal of Fracture Mechanics*, vol. 4, No. 4, Dec. 1968, pp. 431-437.

Turner, D. et al., "New DC Motor for Downhole Drilling and Pumping Applications", a paper prepared for presentation at the SPE/ICoTA Coiled Tubing Roundtable, Mar. 2001, pp. 1-7.

Turner, D. R. et al., "The All Electric BHA: Recent Developments Toward an Intelligent Coiled-Tubing Drilling System", a paper prepared for presentation at the 1999 SPE/ICoTA Coiled Tubing Roundtable, May 1999, pp. 1-10.

Tutuncu, A. N. et al., "An Experimental Investigation of Factors Influencing Compressional- and Shear-Wave Velocities and Attenuations in Tight Gas Sandstones", *Geophysics*, vol. 59, No. 1, Jan. 1994, pp. 77-86.

U.S. Dept of Energy, "Chapter 6—Drilling Technology and Costs", from Report for the Future of Geothermal Energy, 2005, 53 pgs.

U.S. Appl. No. 12/840,978, filed Jul. 21, 2009, 61 pgs.

Udd, E. et al., "Fiber Optic Distributed Sensing Systems for Harsh Aerospace Environments", publisher unknown, while the date of the publication is unknown, it is believed to be prior to Aug. 19, 2009, 12 pages.

Valsangkar, A. J. et al., Stress-Strain Relationship for Empirical Equations of Creep in Rocks, *Engineering Geology*, Mar. 29, 1971, 5 pages.

Varnado, S. G. et al., "The Design and Use of Polycrystalline Diamond Compact Drag Bits in the Geothermal Environment", *Society of Petroleum Engineers of AIME*, SPE 8378, 1979, pp. 1-11.

Wagh, A. S. et al., "Dependence of Ceramic Fracture Properties on Porosity", *Journal of Material Sience*, vol. 28, 1993, pp. 3589-3593.

Wagner, F. et al., "The Laser Microjet Technology—10 Years of Development (M401)", publisher unknown, while the date of the publication is unknown, it is believed to be prior to Aug. 19, 2009, 9 pages.

Waldron, K. et al., "The Microstructures of Perthitic Alkali Feldspars Revealed by Hydroflouric Acid Etching", *Contributions to Mineralogy and Petrology*, vol. 116, 1994, pp. 360-364.

Walker, B. H. et al., "Roller-Bit Penetration Rate Response as a Function of Rock Properties and Well Depth", a paper prepared for presentation at the 61st Annual Technical Conference and Exhibition of the Society of Petroleum Engineers, Oct. 1986, 12 pages.

Wandera, C. et al., "Characterization of the Melt Removal Rate in Laser Cutting of Thick-Section Stainless Steel", *Journal of Laser Applications*, vol. 22, No. 2, May 2010, pp. 62-70.

Wandera, C. et al., "Inert Gas Cutting of Thick-Section Stainless Steel and Medium Section Aluminun Using a High Power Fiber Laser", *Journal of Chemical Physics*, vol. 116, No. 4, Jan. 22, 2002, pp. 154-161.

Wandera, C. et al., "Laser Power Requirement for Cutting of Thick-Section Steel and Effects of Processing Parameters on Mild Steel Cut Quality", a paper accepted for publication in the Proceedings IMechE Part B, *Journal of Engineering Manufacture*, vol. 225, 2011, 23 pages.

Wandera, C. et al., "Optimization of Parameters for Fiber Laser Cutting of 10mm Stainless Steel Plate", a paper for publication in the Proceeding IMechE Part B, *Journal of Engineering Manufacture*, vol. 225, 2011, 22 pages.

Wandera, C., "Performance of High Power Fibre Laser Cutting of Thick-Section Steel and Medium-Section Aluminium", a thesis for the degree of Doctor of Science (Technology) at , Lappeenranta University of Technology, Oct. 2010, 74 pages.

Wang, C. H., "Introduction to Fractures Mechanics", published by DSTO Aeronautical and Maritime Research Laboratory, Jul. 1996, 82 pages.

Wang, G. et al., "Particle Modeling Simulation of Thermal Effects on Ore Breakage", *Computational Materials Science*, vol. 43, 2008, pp. 892-901.

Waples, D. W. et al., "A Review and Evaluation of Specific Heat Capacities of Rocks, Minerals, and Subsurface Fluids. Part 1: Minerals and NonporoRocks", *Natural Resources Research*, vol. 13, No. 2, Jun. 2004, pp. 97-122.

Waples, D. W. et al., "A Review and Evaluation of Specific Heat Capacities of Rocks, Minerals, and Subsurface Fluids. Part 2: Fluids and PoroRocks", *Natural Resources Research*, vol. 13 No. 2, Jun. 2004, pp. 123-130.

Warren, T. M. et al., "Laboratory Drilling Performance of PDC Bits", *SPE Drilling Engineering*, Jun. 1988, pp. 125-135.

Wen-gui, CAO et al., "Damage constituitive model for strain-softening rock based on normal distribution and its parameter determination", *J. Cent. South Univ. Technol.*, vol. 14, No. 5, 2007, pp. 719-724.

White, E. J. et al., "Reservoir Rock Characteristics of the Madison Limestone in the Williston Basin", *The Log Analyst*, Sep.-Oct. 1970, pp. 17-25.

White, E. J. et al., "Rock Matrix Properties of the Ratcliffe Interval (Madison Limestone) Flat Lake Field, Montana", *SPE of AIME*, Jun. 1968, 16 pages.

Wiercigroch, M., "Dynamics of ultrasonic percussive drilling of hard rocks", *Journal of Sound and Vibration*, vol. 280, 2005, pp. 739-757.

Wilkinson, M. A. et al., "Experimental Measurement of Surface Temperatures During Flame-Jet Induced Thermal Spallation", *Rock Mechanics and Rock Engineering*, 1993, pp. 29-62.

Williams, R. E. et al., "Experiments in Thermal Spallation of VarioRocks", *Transactions of the ASME*, vol. 118, 1996, pp. 2-8.

Willis, David A. et al., "Heat transfer and phase change during picosecond laser ablation of nickel", *International Journal of Heat and Mass Transfer*, vol. 45, 2002, pp. 3911-3918.

Winters, W. J. et al., "Roller Bit Model with Rock Ductility and Cone Offset", a paper prepared for presentation at 62nd Annual Technical Conference and Exhibition of the Society of Petroleum Engineers, Sep. 1987, 12 pages.

Wippich, M. et al., "Tunable Lasers and Fiber-Bragg-Grating Sensors", Obatined from the at: from the Internet website of the Industrial Physicist at: http://www.aip.org/tip/INPHFA/vol-9/iss-3/p24.html, on May 18, 2010, pp. 1-5.

Wong, Teng-fong et al., "Microcrack statistics, Weibull distribution and micromechanical modeling of compressive failure in rock", *Mechanics of Materials*, vol. 38, 2006, pp. 664-681.

Wood, Tom, "Dual Purpose COTD™ Rigs Establish New Operational Records", *Treme Coil Drilling Corp., Drilling Technology Without Borders*, 2009, pp. 1-18.

Wu, X. Y. et al., "The Effects of Thermal Softening and Heat Conductin on the Dynamic Growth of Voids", *International Journal of Solids and Structures*, vol. 40, 2003, pp. 4461-4478.

Xia, K. et al., "Effects of microstructures on dynamic compression of Barre granite", *International Journal of Rock Mechanics and Mining Sciences*, vol. 45, 2008. pp. 879-887, available at: www.sciencedirect.com.

(56) References Cited

OTHER PUBLICATIONS

Xiao, J. Q. et al., "Inverted S-Shaped Model for Nonlinear Fatigue Damage of Rock", *International Journal of Rock Mechanics & Mining Sciences*, vol. 46, 2009, pp. 643-648.

Xu, Z et al. "Modeling of Laser Spallation Drilling of Rocks fro gas- and Oilwell Drilling", *Society of Petroleum Engineers*, SPE 95746, 2005, pp. 1-6.

Xu, Z. et al., "Application of High Powered Lasers to Perforated Completions", *International Congress on Applications of Laser & Electro-Optics*, Oct. 2003, 6 pages.

Xu, Z. et al., "Laser Rock Drilling by a Super-Pulsed CO2 Laser Beam", a manuscript created for the Department of Energy, while the date of the publication is unknown, it is believed to be prior to Aug. 19, 2009, 9 pages.

Xu, Z. et al., "Laser Spallation of Rocks for Oil Well Drilling", Proceedings of the 23rd International Congress on Applications of Lasers and Electro-Optics, 2004, pp. 1-6.

Xu, Z. et al., "Modeling of Laser Spallation Drilling of Rocks for Gas-and Oilwell Drilling", a paper prepared for the presentation at the 2005 SPE (Society of Petroleum Engineers) Annual Technical Conference and Exhibition, Oct. 2005, 6 pages.

Xu, Z. et al., "Rock Perforation by Pulsed Nd: YAG Laser", Proceedings of the 23rd International Congress on Applications of Lasers and Electro-Optics 2004, 2004, 5 pages.

Xu, Z. et al., "Specific Energy of Pulsed Laser Rock Drilling", *Journal of Laser Applications*, vol. 15, No. 1, Feb. 2003, pp. 25-30.

Xu, Z. et al., "Specific Energy for Laser Removal of Rocks", *Proceedings of the 20th International Congress on Applications of Lasers & Electro-Optics*, 2001, pp. 1-8.

Xu, Z. et al., "Specific energy for pulsed laser rock drilling", *Journal of Laser Applications*, vol. 15, No. 1, 2003, pp. 25-30.

Xu, Zhiyue et al., "Laser Spallation of Rocks for Oil Well Drilling", *Proceedings of the 23rd International Congress on Applications of Lasers and Electro-Optics*, 2004, pp. 1-6.

Yabe, T. et al., "The Constrained Interpolation Profile Method for Multiphase Analysis", *Journal of Computational Physics*, vol. 169, 2001, pp. 556-593.

Yamamoto, K. Y. et al., "Detection of Metals in the Environment Using a Portable Laser—Induced Breakdown Spectroscopy Instrument", *Applied Spectroscopy*, vol. 50, No. 2, 1996, pp. 222-233.

Yamashita, Y. et al., "Underwater Laser Welding by 4kW CW YAG Laser", *Journal of Nuclear Science and Technology*, vol. 38, No. 10, Oct. 2001, pp. 891-895.

Yamshchikov, V. S. et al., "An Evaluation of the Microcrack Density of Rocks by Ultrasonic Velocimetric Method", *Moscow Mining Institute. (Translated from Fiziko-Tekhnicheskie Problemy Razrabotki Poleznykh lskopaemykh)*, 1985, pp. 363-366.

Yasar, E. et al., "Determination of the Thermal Conductivity from Physico-Mechanical Properties", *Bull Eng. Geol. Environ.*, vol. 67, 2008, pp. 219-225.

Yilbas, B. S. et al., "Laser short pulse heating: Influence of pulse intensity on temperature and stress fields", *Applied Surface Science*, vol. 252, 2006, pp. 8428-8437.

Yilbas, B. S. et al., "Laser treatment of aluminum surface: Analysis of thermal stress field in the irradiated región", *Journal of Materials Processing Technology*, vol. 209, 2009, pp. 77-88.

Yilbas, B. S. et al., "Nano-second laser pulse heating and assisting gas jet considerations", *International Journal of Machine Tools & Manufacture*, vol. 40, 2000, pp. 1023-1038.

Yilbas, B. S. et al., "Repetitive laser pulse heating with a convective boundary condition at the surface", *Journal of Physics D: Applied Physics*, vol. 34, 2001, pp. 222-231.

York, J. L. et al., "The Influence of Flashing and Cavitation on Spray Formation", a progress report for UMRI Project 2815 with Delavan Manufacturing Company, Oct. 1959, 27 pages.

Yun, Yingwei et al., "Thermal Stress Distribution in Thick Wall Cylinder Under Thermal Shock", *Journal of Pressure Vessel Technology, Transactions of the ASME*, 2009, vol. 131, pp. 1-6.

Zamora, M. et al., "An Empirical Relationship Between Thermal Conductivity and Elastic Wave Velocities in Sandstone", *Geophysical Research Letters*, vol. 20, No. 16, Aug. 20, 1993, pp. 1679-1682.

Zehnder, A. T., "Lecture Notes on Fracture Mechanics", 2007, 227 pages.

Zeng, Z. W. et al., "Experimental Determination of Geomechanical and Petrophysical Properties of Jackfork Sandstone—A Tight Gas Formation", a paper prepared for the presentation at the 6th North American Rock Mechanics Symposium (NARMS): *Rock Mechanics Across Borders and Disciplines*, Jun. 2004, 9 pages.

Zeuch, D. H. et al., "Rock Breakage Mechanisms With a PDC Cutter", a paper prepared for presentation at the 60th Annual Technical Conference and Exhibition of the Society of Petroleum Engineers, Sep. 1985, 12 pages.

Zeuch, D.H. et al., "Rock Breakage Mechanism Wirt a PDC Cutter", *Society of Petroleum Engineers, 60$^{th}$ Annual Technical Conference*, Las Vegas, Sep. 22-25, 1985, 11 pgs.

Zhai, Yue et al., "Dynamic failure analysis on granite under uniaxial impact compressive load", *Front. Archit. Civ. Eng. China*, vol. 2, No. 3, 2008, pp. 253-260.

Zhang, L. et al., "Energy from Abandoned Oil and Gas Reservoirs", a paper prepared for presentation at the 2008 SPE (Society of Petroleum Engineers) Asia Pacific Oil & Gas Conference and Exhibition, 2008, pp. 1-10.

Zheleznov, D. S. et al., "Faraday Rotators With Short Magneto-Optical Elements for 50-kW Laser Power", *IEEE Journal of Quantum Electronics*, vol. 43, No. 6, Jun. 2007, pp. 451-457.

Zhou, T. et al., "Analysis of Stimulated Brillouin Scattering in Multi-Mode Fiber by Numerical Solution", *Journal of Zhejiang University of Science*, vol. 4 No. 3, May-Jun. 2003, pp. 254-257.

Zhou, X.P., "Microcrack Interaction Brittle Rock Subjected to Uniaxial Tensile Loads", *Theoretical and Applied Fracture Mechanics*, vol. 47, 2007, pp. 68-76.

Zhou, Zehua et al., "A New Thermal-Shock-Resistance Model for Ceramics: Establishment and validation", *Materials Science and Engineering*, A 405, 2005, pp. 272-276.

Zhu, Dongming et al., "Influence of High Cycle Thermal Loads on Thermal Fatigue Behavior of Thick Thermal Barrier Coatings", *National Aeronautics and Space Administration, Army Research Laboratory*, Technical Report ARL-TR-1341, NASA TP-3676, 1997, pp. 1-50.

Zhu, Dongming et al., "Investigation of thermal fatigue behavior of thermal barrier coating systems", *Surface and Coatings Technology*, vol. 94-95, 1997, pp. 94-101.

Zhu, Dongming et al., "Investigation of Thermal High Cycle and Low Cycle Fatigue Mechanisms of Thick Thermal Barrier Coatings", *National Aeronautics and Space Administration, Lewis Research Center*, NASA/TM-1998-206633, 1998, pp. 1-31.

Zhu, Dongming et al., "Thermophysical and Thermomechanical Properties of Thermal Barrier Coating Systems", *National Aeronautics and Space Administration, Glenn Research Center*, NASA/TM-2000-210237, 2000, pp. 1-22.

Zhu, X. et al., "High-Power ZBLAN Glass Fiber Lasers: Review and Prospect", *Advances in OptoElectronics*, vol. 2010, pp. 1-23.

Zietz, J. et al., "Determinants of House Prices: A Quantile Regression Approach", *Department of Economics and Finance Working Paper Series*, May 2007, 27 pages.

Zuckerman, N. et al., "Jet Impingement Heat Transfer: Physics, Correlations, and Numerical Modeling", *Advances in Heat Transfer*, vol. 39, 2006, pp. 565-631.

A Built-for-Purpose Coiled Tubing Rig, by Schulumberger Wells, No. DE-PS26-03NT15474, 2006, 1 pg.

"Chapter I—Laser-Assisted Rock-Cutting Tests", publisher unknown, while the date of the publication is unknown, it is believed to be prior to Aug. 19, 2009, 64 pages.

"Chapter 7: Energy Conversion Systems—Options and Issues", publisher unknown, while the date of the publication is unknown, it is believed to be prior to Aug. 19, 2009, pp. 7-1 to 7-32 and table of contents page.

"Cross Process Innovations", Obtained from the Internat at: http://www.mrl.columbia.edu/ntm/CrossProcess/CrossProcessSect5.htm, on Feb. 2, 2010, 11 pages.

(56) References Cited

OTHER PUBLICATIONS

"Fourier Series, Generalized Functions, Laplace Transform", publisher unknown, while the date of the publication is unknown, it is believed to be prior to Aug. 19, 2009, 6 pages.

"Introduction to Optical Liquids", published by Cargille-Sacher Laboratories Inc., Obtained from the Internet at: http://www.cargille.com/opticalintro.shtml, on Dec. 23, 2008, 5 pages.

"Laser Drilling", Oil & Natural Gas Projects (Exploration & Production Technologies) Technical Paper, Dept. of Energy, Jul. 2007, 3 pages.

"Leaders in Industry Luncheon", IPAA & TIPRO, Jul. 8, 2009, 19 pages.

"Measurement and Control of Abrasive Water-Jet Velocity", publisher unknown, while the date of the publication is unknown, it is believed to be prior to Aug. 19, 2009, 8 pages.

"NonhomogeneoPDE—Heat Equation with a Forcing Term", a lecture, 2010, 6 pages.

"Performance Indicators for Geothermal Power Plants", prepared by International Geothermal Association for World Energy Council Working Group on Performance of Renewable Energy Plants, author unknown, Mar. 2011, 7 pages.

"Rock Mechanics and Rock Engineering", publisher unknown, while the date of the publication is unknown, it is believed to be prior to Aug. 19, 2009, 69 pages.

"Shock Tube", Cosmol MultiPhysics 3.5a, 2008, 5 pages.

"Silicone Fluids: Stable, Inert Media", Gelest, Inc., while the date of the publication is unknown, it is believed to be prior to Aug. 19, 2009, 27 pages.

"Stimulated Brillouin Scattering (SBS) in Optical Fibers", Centro de Pesquisa em Optica e Fotonica, Obtained from the Internet at: http://cepof.ifi.unicamp.br/index.php . . . ), on Jun. 25, 2012, 2 pages.

"Underwater Laser Cutting", TWI Ltd, May/Jun. 2011, 2 pages.

Utility U.S. Appl. No. 13/768,149, filed Feb. 15, 2013, 27 pages.
Utility U.S. Appl. No. 13/777,650, filed Feb. 26, 2013, 73 pages.
Utility U.S. Appl. No. 13/782,869, filed Mar. 1, 2013, 80 pages.
Utility U.S. Appl. No. 13/782,942, filed Mar. 1, 2013, 81 pages.
Utility U.S. Appl. No. 13/800,559, filed Mar. 13, 2013, 73 pages.
Utility U.S. Appl. No. 13/800,820, filed Mar. 13, 2013, 73 pages.
Utility U.S. Appl. No. 13/800,879, filed Mar. 13, 2013, 73 pages.
Utility U.S. Appl. No. 13/800,933, filed Mar. 13, 2013, 73 pages.
Utility U.S. Appl. No. 13/849,831, filed Mar. 25, 2013, 83 pages.

\* cited by examiner ial application Ser. No. 61/493,174, the entire disclosures of each of which are incorporated herein by reference.
HIGH POWER LASER PIPELINE TOOL AND METHODS OF USE This application: (i) claims, under 35 U.S.C. §119(e)(1), the benefit of the filing date of Feb. 7, 2011 of U.S. provisional application Ser. No. 61/439,970; (ii) claims, under 35 U.S.C. §119(e)(1), the benefit of the filing date of Feb. 24, 2011 of U.S. provisional application Ser. No. 61/446,312; (iii) is a continuation-in-part of U.S. patent application Ser. No. 12/706,576 filed Feb. 16, 2010, which is a continuation-in-part of U.S. patent application Ser. No. 12/544,136 filed Aug. 19, 2009, and which claims under 35 U.S.C. §119(e)(1) the benefit of the filing date of Feb. 17, 2009 of U.S. provisional application Ser. No. 61/153,271, and the benefit of the filing date of Jan. 15, 2010 of U.S. provisional application Ser. No. 61/295,562; (iv) is a continuation-in-part of U.S. patent application Ser. No. 12/840,978 filed Jul. 21, 2010; (v) is a continuation-in-part of U.S. patent application Ser. No. 12/543,986 filed Aug. 19, 2009; (vi) is a continuation-in-part of U.S. patent application Ser. No. 12/544,136 filed Aug. 19, 2008, which claims under 35 U.S.C. §119(e)(1) the benefit of the filing date of Oct. 17, 2008 of U.S. provisional application Ser. No. 61/106,472, and the benefit of the filing date of Feb. 17, 2009 of U.S. provisional application Ser. No. 61/153,271; (vii) is a continuation-in-part of U.S. patent application Ser. No. 13/210,581 filed Aug. 16, 2011, which claims under 35 U.S.C. §119(e)(1) the benefit of the filing date of Aug. 17, 2010 of U.S. provisional application Ser. No. 61/374,594; and (viii) claims, under 35 U.S.C. §119(e)(1), the benefit of the filing date of Jun. 3, 2011 of U.S. provisional application Ser. No. 61/493,174, the entire disclosures of each of which are incorporated herein by reference.

BACKGROUND OF THE INVENTION

1. Field of the Invention

The present inventions relate to tools for use in and in conjunction with the assembly, maintenance, management, cleaning and operation of pipelines, which tools utilize high power laser energy. Thus, and in particular, the present inventions relate to novel pipeline tools, such as a laser-pig.

As used herein the term "pipeline" should be given its broadest possible meaning, and includes any structure that contains a channel having a length that is many orders of magnitude greater than its cross-sectional area and which is for, or capable of, transporting a material along at least a portion of the length of the channel. Pipelines may be many miles long and may be many hundreds of miles long. Pipelines may be located below the earth, above the earth, under water, within a structure, or combinations of these and other locations. Pipelines may be made from metal, steel, plastics, ceramics, composite materials, or other materials and compositions know to the pipeline arts and may have external and internal coatings, known to the pipeline arts. In general, pipelines may have internal diameters that range from about 2 to about 60 inches although larger and smaller diameters may be utilized. In general natural gas pipelines may have internal diameters ranging from about 2 to 60 inches and oil pipelines have internal diameters ranging from about 4 to 48 inches. Pipelines may be used to transmit numerous types of materials, in the form of a liquid, gas, fluidized solid, slurry or combinations thereof. Thus, for example pipelines may carry hydrocarbons; chemicals; oil; petroleum products; gasoline; ethanol; biofuels; water; drinking water; irrigation water; cooling water; water for hydroelectric power generation; water, or other fluids for geothermal power generation; natural gas; paints; slurries, such as mineral slurries, coal slurries, pulp slurries; and ore slurries; gases, such as nitrogen and hydrogen; cosmetics; pharmaceuticals; and food products, such as beer.

Pipelines may be, in part, characterized as gathering pipelines, transportation pipelines and distribution pipelines, although these characterizations may be blurred and may not cover all potential types of pipelines. Gathering pipelines are a number of smaller interconnected pipelines that form a network of pipelines for bringing together a number of sources, such as for example bringing together hydrocarbons being produced from a number of wells. Transportation pipelines are what can be considered as a traditional pipeline for moving products over longer distances for example between two cities, two countries, and a production location and a shipping, storage or distribution location. The Alaskan oil pipeline is an example of a transportation pipeline. Distribution pipelines can be small pipelines that are made up of several interconnected pipelines and are used for the distribution to for example an end user, of the material that is being delivered by the pipeline, such as for example the feeder lines used to provide natural gas to individual homes. As used herein the term pipeline includes all of these and other characterizations of pipelines that are known to or used in the pipeline arts.

As used herein the term "pig" is to be given its broadest possible meaning and includes all devices that are known as or referred to in the pipeline arts as a "pig" and would include any device that is inserted into and moved along at least a portion of the length of a pipeline to perform activities such as inspecting, cleaning, measuring, analyzing, maintaining, welding, assembling, or other activities known to the pipeline arts. In general, pigs are devices that may be unitary devices, as simple as a foam or metal ball, or a complex multi-component device such as a magnetic flux leakage pig. In general, pigs are devices that when inserted in the pipeline travel along its length and are moved through the pipeline by the flow of the material within the pipe. Pigs may generally be characterized as utility and in-line inspection pigs, although these characterizations may be blurred and may not cover all potential types of pigs. Utility pigs perform such functions as for example cleaning, separation of products and removal of water. In-line inspection pigs, would include gauge pigs, as well as, more complex pigs, which may also be referred to by those of skill in the art as instrument pigs, intelligent pigs or smart pigs. Smart pigs perform such functions, as for example, supplying information on the condition of the pipeline, as well as, on the extent and location of any problems with the pipeline. Pigs are used both during the construction and during the operational life of the pipelines. Pigs may also be used in the decommissioning of a pipeline and its removal.

As used herein the term "earth" should be given its broadest possible meaning, and includes, the ground, all natural materials, such as rocks, and artificial materials, such as concrete, that are or may be found in the ground, including without limitation rock layer formations, such as, granite, basalt, sandstone, dolomite, sand, salt, limestone, rhyolite, quartzite and shale rock.

As used herein the term "borehole" should be given it broadest possible meaning and includes any opening that is created in the earth, in a structure (e.g., building, protected military installation, nuclear plant, or ship), or in a structure in the ground, (e.g., foundation, roadway, airstrip, cave or subterranean structure) that is substantially longer than it is wide, such as a well, a well bore, a well hole, a micro hole, slimhole and other terms commonly used or known in the arts to define these types of narrow long passages. Although boreholes are generally oriented substantially vertically, they may also be oriented on an angle from vertical, to and including horizontal. Thus, using a vertical line, based upon a level as a reference point, a borehole can have orientations ranging from 0° i.e., vertical, to 90°,i.e., horizontal and greater than 90° e.g., such as a heel and toe. Boreholes may further have segments or sections that have different orientations, they may have straight sections and arcuate sections and combinations thereof; and for example may be of the shapes commonly found when directional drilling is employed. Thus, as used herein unless expressly provided otherwise, the "bottom" of a borehole, the "bottom surface" of the borehole and similar terms refer to the end of the borehole, i.e., that portion of the borehole farthest along the path of the borehole from the borehole's opening, the surface of the earth, or the borehole's beginning. A pipeline may be positioned within a borehole. Similarly, a borehole may be used as a pipeline or portion of a pipeline.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

2. Discussion of Related Art

Pigging Activities

In general, pigs may be used in pipeline activities to perform various operations on a pipeline, including inspecting, cleaning and assembling. The pigs may be moved through the pipeline by the force of a material that is being pumped or otherwise moved through the pipeline. Pigging operations, i.e., the use of a pig, can be done without stopping the flow of the product in the pipeline, by substituting the flow of the product with the flow of another fluid, such as nitrogen to move the pig through the pipeline, or by having no flow of material through the pipeline and having the pig have an independent motive means for movement through the pipeline.

In general, pigging is accomplished by inserting the pig into a pig launcher or launching station, which may generally be a valved off-shoot section of the pipeline that enables the pig to be placed into the launcher, sealed, and then have the flow of the pipeline material move the pig from the launcher into the pipeline itself. The pig is removed from the pipeline at a pig catcher or receiving station that in most embodiments is similarly, in general, a valved off-shoot to enable removal of the pig from the pipeline.

In general, pigs require a mechanism or structure to drive them through, or along, the interior of the pipeline. Such devices are well known to the pipeline arts and would include things ranging from a simple sphere or ball, that by its own shape and size is pushed through the pipeline by the force of the pipeline fluid to the use of a drive cup and combinations of drive cups, which are sections of the pig that are specifically designed to catch the flow of the fluid in the pipeline and be driven forward by that force of that fluid flow. For example, scraper pigs, brush pigs, and more complex pigs may typically have a cup or set of cups at the front of the pig that are pushed by the material moving through the pipeline. These cups in turn pull the rest of the pig through the pipeline. Thus, differential pressure acting between the front and back of the drive cups provides a force along the pipe axis. This force propels the drive cups, which in turn pulls the rest of the pig.

The driving force from the cups, in general, should overcome the friction between the pig and the internal surfaces of the pipeline. The pressure differential required to move for example a 24-inch pig may be between about 6.9 psi and 10.4 psi. Although, greater pressure differentials may in general be needed to start a non-moving pig, push a pig through an uphill section of pipeline or a dislodge pig that has become stuck. These pressure differentials, to move the pig, are relatively small compared to the typical pipeline pressure during in-line inspection of about 300 to 600 psi. Operation pressures in some lines may be as great as 800 to 1,000 psi, however, greater and smaller pressures may also be seen in various pipeline operations. In general, drive cups are typically at the front of the pig. Additional cups can be used to center portions of a pig in the pipeline. To prevent fluid pressure from pushing a trailing portion of a pig into a leading portion, the fluid can be vented through holes in trailing cups or through a bypass on the pig components. Wheeled assemblies may also be employed to provide centering support for trailing pig portions. Multiple drive cups may be use to assist the pig in moving past pipeline connections. At tee connections and at valves, the differential pressure across a cup can drop if gas bypasses around the cup. Thus, an additional set of drive cups may overcome this loss of motive pressure, by spacing the cups far enough apart so that one cup is always away from the area of the connection or valve.

Pipeline Corrosion and Damage

In general, one of the important roles for pigs and pigging operations is to detect damage to pipelines before that damage can cause a failure of the pipeline and a potentially serious pipeline accident. Pipeline accidents and failures can be caused by many sources, including for example: external damage from excavators and nature; material deficiencies; stress cracking; weld, grout or joint deficiencies; corrosion; and combinations of these and other events.

Corrosion has been related to several recent natural gas transmission pipelines accidents and, by some estimates, corrosion damage and abatement costs the pipeline industry more than $5 billion annually. A major cause of corrosion and of corrosion related failures in pipelines is microbiologically influenced corrosion ("MIC") MIC occurs when bacteria, or other microbes, grow on the inner surface of a pipeline. In general, sulphate reducing bacteria ("SRB") are one of the major types of bacteria that cause MIC. These bacteria release byproducts that break down the metal that forms the pipeline walls, and in particular carbon steel pipelines. By some estimates as much as $1.5 billion annually is spent on chemicals to inhibit the growth of such bacteria. It was reported in a 2009 Current Science Article (B. Anandkumar, *Effect of thermophilic sulphate-reducing bacteria (Desulfotomaculum geothermicum) isolated from Indian petroleum refinery on the corrosion of mild steel*, p. 142 (Current Science, Vol. 97, No. 3, Aug. 10, 2009)) that SRBs have been estimated to have been responsible for over 75% of corrosion in oil wells, and for over 50% of the failures in buried pipelines and cables.

Typically, such bacterial growth is found in the form of a biofilm. These biofilms may be very complex and are formed when the colonizing bacteria, or other microbes, become encapsulated in a slimy, exopolymeric substances composed for example from secreted compounds, such as polysaccharides, proteins, and nucleic acids. These biofilms may have a high level of adherence to the inner surface of the pipeline and may further protect the underlying microbes from biocides, or other treatment chemicals, that are flowed through the pipeline.

SUMMARY

There has been a long standing need for a tool that can inspect pipelines for damage and detect, correct, mitigate or combinations thereof, such damage before an accident or failure to the pipeline occurs. There has also been a long standing need for tools that can assist in the assembly of pipelines. The present inventions, among other things, solve these and other needs by providing the articles of manufacture, devices and processes taught herein.

Thus, there is provided a high power laser pipeline tool for performing laser operations on a pipeline, the tool having a laser-pig having a body and a means for moving within the pipeline; the laser-pig body having a high power laser tool; a high power laser cable; and, the high power laser cable in optical association with the high power laser tool and capable of being optically associated with a high power laser source.

Yet additionally, there is provided a high power laser hot tap assembly having: a top section, a bottom section and a laser delivery assembly; the top section having a high power optical cable, a feed through assembly, wherein the high power optical cable passes through the feed through assembly and is in optical communication with the laser delivery assembly, and an assembly for moving the laser delivery assembly relative to an outer surface of a pipeline; the bottom section having a body defining a cavity, a flange for engaging the outer surface of the pipeline, and wherein the lowering assembly is configured to permit the movement of the laser delivery assembly in the cavity relative to the outer surface of the pipeline.

Further, there is provided a high power laser pipeline pig system having: a laser pig associated with a pig holder section; a launching section; a feed through section; and, an optical capable section.

Moreover there is provided a system for performing high power laser hot-tapping operations on a pipeline, the system having: a high power laser; the high power laser in optical association with a laser hot-tapping assembly, having: a first and a second section; a first and a second valve; a high power laser delivery assembly, having at least one laser cutter; wherein the high power laser cutters are movable between a first position in the first section and a second position in the second section, and; a means for attaching the hot-tapping assembly to the outer surface of an active pipeline.

Still further there is provided a method of treating the interior of a pipeline having: positioning a high power laser outside of the pipeline for providing high power laser energy; positioning a laser-pig adjacent to the pipeline and in optical communication with the high power laser; moving the laser-pig into the pipeline; while maintaining the laser-pig in optical communication with the high power laser; and, delivering the high power laser energy from the laser-pig to the interior of the pipeline.

Additionally, there are provided the forgoing embodiments which may further be such that the tool, method or system may employ or utilize the following: a high power laser cable having a length of greater than about 1 mile and having a high power optical fiber having a core having a diameter of greater than about 300 µm; a second high power laser tool, wherein the first or second high power laser tool is selected from at least one of a laser cutter, a laser illuminator, and a laser monitor; a laser source having a power of at least about 15 kW and a wavelength in the range of from about 800 nm to about 1600 nm; and, a mobile system.

Still, additionally, there are provided the forgoing embodiments which may further be such that the tool, method or system may employ or utilize the following: the laser pig having a high power laser tool; the launching section having a valve in fluid communication with the holder section; the feed through section having a packer; and, the optical capable section having a high power optical cable having a length of greater than about 1 mile, a means for winding and unwinding the optical cable, and a high power optical fiber having a core having a diameter of at least about 200 µm; a laser source having a power of at least about 10 kW; the launching section having a valve in fluid communication with the holder section; the feed through section having a means for managing pressure between the launching section and the optical cable section; and, the optical capable section having a high power optical cable having a length of greater than about 1 mile and a high power optical fiber having a core having a diameter of at least about 500 µm.

Yet, additionally, there are provided the forgoing embodiments which may further be such that the tool, method or system may employ or utilize the following: a laser source having a power of at least about 5 kW, wherein the laser source is in optical communication with the high power optical cable; a first and a second valve in fluid communication with the bottom section; the top and bottom sections having respective engaging flanges; the top and bottom sections are integral; a laser delivery assembly having two high power laser cutters; a first and a second valve in fluid communication with the bottom section; the top and bottom sections comprise respective engaging flanges; the top and bottom sections are integral.

Yet additionally, there is provided a high power laser hot tap assembly wherein the laser delivery assembly has two high power laser cutters; a laser source having a power of at least about 10 kW, at least about 20 kW and at least about 40 kW; and, the laser source is in optical communication with the high power optical cable.

Still further there are provided the forgoing embodiments, which may further be such that the tool, method or system may employ or utilize the following: a delivered laser energy greater than 2 kW, greater than about 2 kW, greater than about 5 kW, greater than about 10 kW or greater than about 20 kW, and the laser-pig is moved through the pipeline while maintaining optical communication with the laser for at least about 0.5 miles, at least about 1 mile, at least about 2 miles, at least about 3 miles, or at least about 5 miles; the delivered laser energy is characterized by having the ability to kill a microbe associated within the interior of the pipeline; the delivered laser energy is characterized by having the ability to eradicate a biofilm associated within the interior of the pipeline; the delivered laser energy is characterized by having the ability to remove a substantial portion of a biofilm associated within the interior of the pipeline; the delivered laser energy is characterized by having the ability to clean the interior of the pipeline; the delivered laser energy is characterized by having the ability to selectively remove a material from the interior of the pipeline, without damaging a wall of the pipeline; the delivered laser energy is directed toward a grouting material to connect pipeline sections; the delivered laser energy is directed to a pipeline joint connecting two abutting section of pipeline to weld the two abutting section together; and, the delivered laser energy is directed to secure an attachment between two sections of pipeline.

DESCRIPTION OF THE PREFERRED EMBODIMENTS

Figure 1:
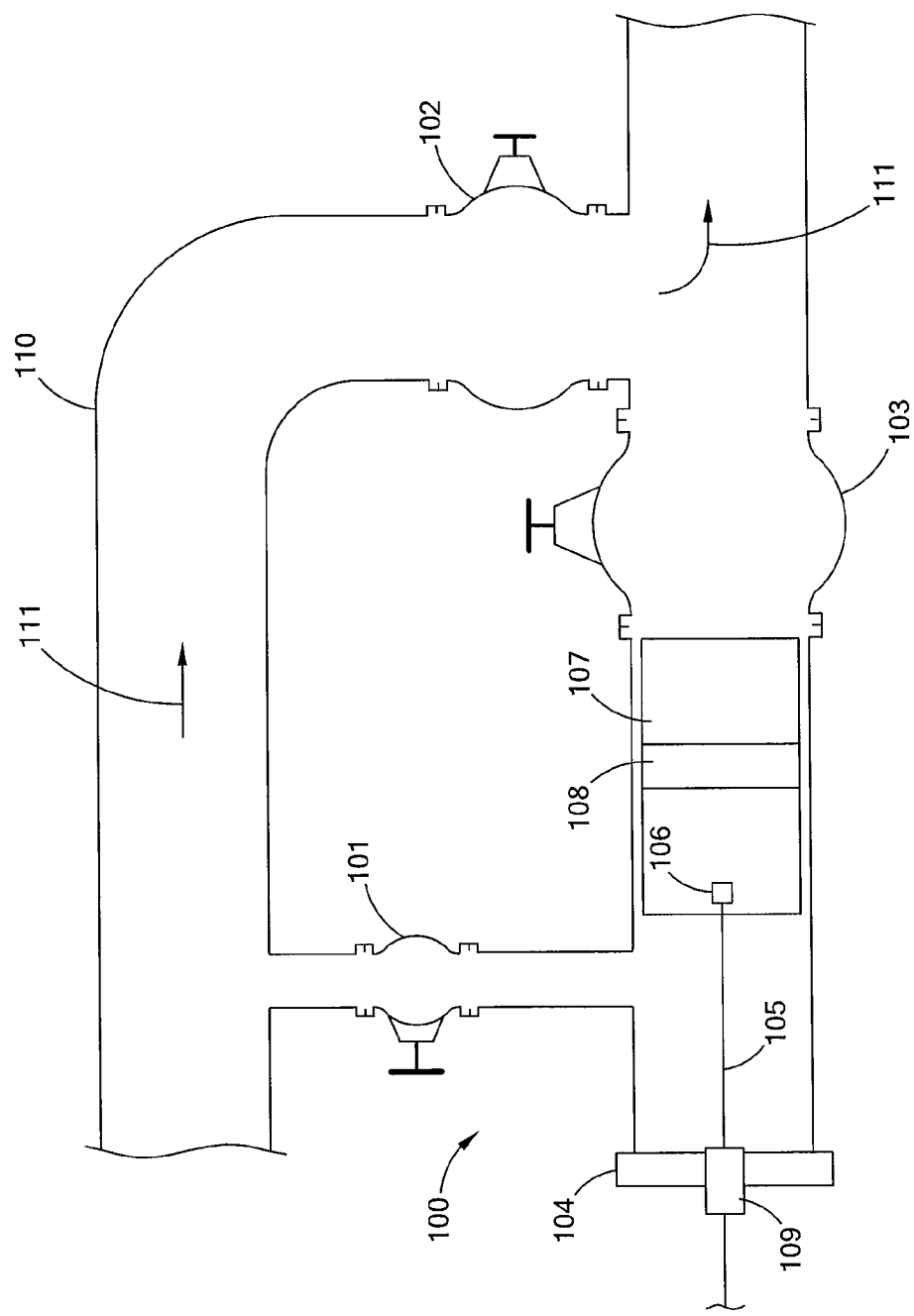
FIG. 1 is a schematic view of an embodiment of a laser-pig launcher in accordance with the present invention.

In general, the present inventions relate to high power laser pipeline tools that can be used for pipeline activities, such as for example inspecting, cleaning, measuring, analyzing, maintaining, welding, assembling, or other activities known to the pipeline arts, or that may be recognized in the future based upon the present inventions and teachings of this specification. By way of general illustration there is provided a pipeline tool that has as a laser tool for performing pipeline activities, e.g., a laser-pig. The laser-pig utilizes a high power laser tool, which is in optical communication, by way of a high power optical fiber cable, with a high power laser that is located outside of the pipeline. The laser-pig may also have cups or other structures, which use the movement of the fluid through the pipeline as a motive means for the laser-pig. The laser-pig may also have braking devices, or similar devices as part of the cups or otherwise, that regulate and/or control the speed at which the laser-pig moves through the pipeline. The laser-pig may also contain additional non-laser components or sections that would be found in a conventional smart pig, such as magnetic and acoustical sensors.

The laser-pig may also have a tractor device as a motive means for moving the laser-pig through the pipeline. The tractor device may be employed with other motive means, e.g., devices using the pipeline material flow as the source of motive power. In general, the tractor device may also have centralizers, which center, or otherwise hold the laser-pig in a predetermined location within the pipeline, relative to a wall or the pipeline. The tractor would provide for the laser-pig to move through dry pipelines, empty pipeline, and active pipelines, e.g., having flow and pressure therein. Regarding active pipe lines, the tractor device would provide for the laser-pig to move with the flow, at rates equal to, greater than, or less then the flow; and would also provide for the ability to move the pig against the flow, e.g., the ability to back the pig off from an obstruction.

The high power optical fiber cable and the systems and components for delivering high power laser energy over great distances from the laser to the laser-pig's laser tool are disclosed and set forth in detail in pending US patent application publications 2010/0044106, 2010/0044103, 2010/0215326, and 2010/0020631, and in pending U.S. patent application Ser. No. 13/210,581 and Ser. No. 61/493,174, the entire disclosures of each of which are incorporated herein by reference. One or more high power optical fibers, as well as, lower power optical fibers may be used or contained in a single cable that connects the laser pig to the outside of the pipeline, this connecting cable could also be referred to herein as a tether, an umbilical, or a pig-tail. The optical fibers may be very thin on the order of hundreds of $\mu m$ (microns). Further, the optical fibers in the optical cable may have a core and at least one cladding. For fibers having a circular core, the core diameter may be from about 100 $\mu m$ to about 1000 $\mu m$ and greater, preferably the core diameter is greater than about 300 $\mu m$, greater than about 400 $\mu m$ and more preferable the core diameter is from about 500 $\mu m$ to about 800 $\mu m$. These high power optical fibers have the capability to transmit high power laser energy having many kW of power (5 kW, 10 kW, 20 kW, 50 kW or more) over many thousands of feet. The high power optical fiber further provides the ability, in a single fiber, although multiple fibers may also be employed, to convey high power laser energy to the laser-pig, convey control signals to the laser-pig, and convey back from the laser-pig control information and data (including video data). In this manner the high power optical fiber has the ability to perform, in a single very thin, less than for example 1000 $\mu m$ diameter fiber, the functions of transmitting high power laser energy for pipeline activities to the laser-pig, transmitting and receiving control information with the laser-pig and transmitting from the laser-pig data and other information (data could also be transmitted down the optical cable to the laser-pig). As used herein the term "control information" is to be given its broadest meaning possible and would include all types of communication to and from the laser-pig.

By way of general illustration, the laser tool in a laser-pig may be incorporated into an existing pig, such as a smart pig, or it may be incorporated into a separate pig, or the laser tool may be a section of a pig, which section can be incorporated with other sections, such as cups, and combinations thereof. The laser tool can be specifically designed for a specific pipeline activity.

Thus, for example, the laser tool may be a laser monitoring tool for illuminating the inner surface of a pipeline wall to detect surface anomalies, cracks, corrosion, etc. In this type of laser monitoring tool, the laser beam may be scanned as a spot, or other shape, along the inner surface of the pipeline, in a pattern, or it may be directed to the pipeline inner surface in a continuous line that impacts some or all of the inner circumference of the inner wall of the pipeline. The light reflect by and/or absorbed by the pipeline wall would then be analyzed to determine if any anomalies were present, identify their location and potentially characterize them. A laser radar type of system may be used for this application, a laser topographic system may be used for this application, as well as, other known laser scanning, measuring and analyzing techniques. Thus, as the laser-pig moves through the pipeline the laser beam will contact the inner surfaces of the pipeline along the length of the pipeline.

The laser tool may be a laser cutter, such as the cutters discussed herein, that is used to remove unwanted material from within the pipeline inner wall, cut a hole through, or otherwise remove a section of the pipeline wall, or weld a joint between two sections of pipeline, or repair a grout line between two section of pipeline by for example activating a heat activated grout material.

The laser tool may be a laser illumination tool that provides sufficient high power laser energy to an area of the surface of the interior of the pipeline to kill or remove a biofilm. This type of laser illumination tool may also be used to clear and remove other materials, such as waxes, from the interior surface of the pipeline.

In general, when dealing with cleaning activities, and by way of example, the power of the laser energy that is directed to the interior surface of the pipeline should preferably be such that the foreign substance, e.g., a biofilm, wax, etc., is removed or sterilized, by heating, spalling, cutting, melting, vaporizing, ablating etc., as a result of the laser beam impinging upon the foreign substance, but the pipeline wall is not damaged or adversely affected by the laser beam. In determining this power, the power of the laser beam, the surface area of the pipeline that the laser beam illuminates, and the time that the laser beam is illuminating that surface area are factors to be balanced.

Combinations of laser tools, e.g., a cutter, an illuminator, a measurement tool, and non-laser tools, may be utilized in a single assembly that is then run through the pipeline, or they may be used in separate assemblies that are run through the pipe in different orders, as is best suited for a particular task or activity.

Thus, for example, a laser-pig could utilize high power laser energy to locate and destroy a biofilm, it could utilize high power laser energy to identify cracks, dents or deformations in a pipeline, or among other things it could identify the inner diameter of the pipeline wall, and thus provide information to determine the current wall thickness. Further, low power (less than 1 kW) laser energy could be used for the measuring and/or analysis activity, e.g., information gathering and high power laser energy could be used to address or remedy potential causes for failure that were identified by the low power laser. This activity of identification and remediation can occur with a single laser-pig, with two types of laser tools, or a single laser tool having both capabilities, and during a single pass through the pipeline, or it could occur with multiple laser pigs during a single sequential pass, or multiple passes through the pipeline.

Turning to FIG. 1 there is illustrated an embodiment of a laser-pig positioned in a pig launcher. Pipeline 110 has a pipeline flow in the direction of arrows 111. The pipeline 110 has valves 102, 103 and 101 associated with it. As shown in the figure, the laser-pig 107, having a laser tool 108 is positioned in the pig launcher 100. The laser-pig 107 has a high power laser cable 105 in optical communication with the laser-pig's laser tool 108 by way of coupler 106. Preferably coupler 106 is releasable, and more preferably automatically releasable, so that when the run of the laser-pig is completed, or near to completion, the cable 105 can be automatically released from the pig. In this way the catching of the laser-pig, e.g., pig retrieval, can be done without any special equipment or procedures and the high power laser cable 105 can be retrieved back through the launcher, by winding for example on a spool, creel or other winding apparatus.

If a detachable cable coupler for the cable is not used, the laser-pig can still be caught for example, by cutting or breaking the cable with an existing valve in the pig catcher, by adding an adjustable ram or packer type device that could seal around the cable in the catcher, permitting the removal of the pig from the end of the catcher without losing pressure or fluid from the pipeline flow. Further, such a packer assembly at the catcher could be employed with a releasable coupler at or near the spool, creel, or launcher. In this way the cable could be disconnected from the laser, released from the spool, or even cut or broken at or near the launcher and retrieved at the catcher by winding the cable up at the catcher.

In FIG. 1 the high power laser cable 105 would be connected to a high power laser (not shown in this figure). The high power laser cable 105 passes through cap 104, which a pressure feed through 109. The pressure feed through permits the cable to be pulled through the cap, and follow along behind the laser-pig as it moves through the pipeline, while maintaining pressure so that the contents of the pipeline do not escape in to the environment. In operation, the laser-pig 107 would be launched into the pipeline by opening and closing valves 101, 102 and 103 to have fluid flow behind the pig to move it forward from the launcher 100 into the pipeline 110.

Figure 4A:
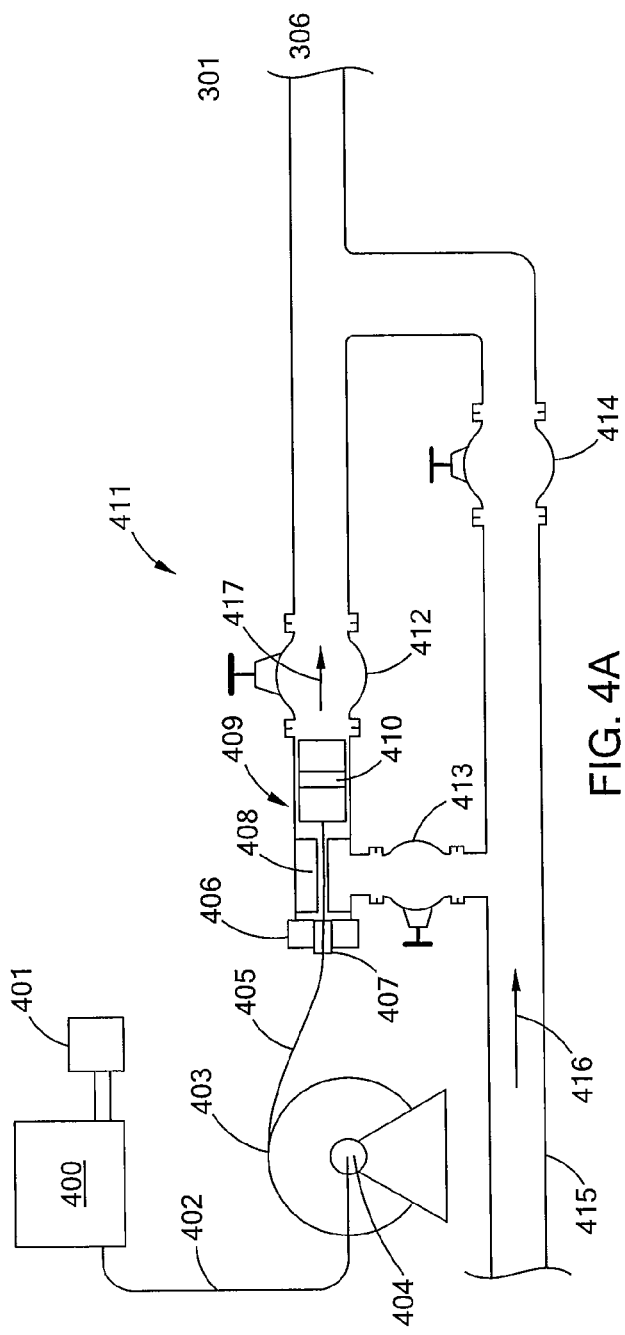
FIGS. 4A and 4B are schematic views of an embodiment of a laser-pig launcher and a laser-pig catcher, respectively in accordance with the present invention.
Figure 4B:
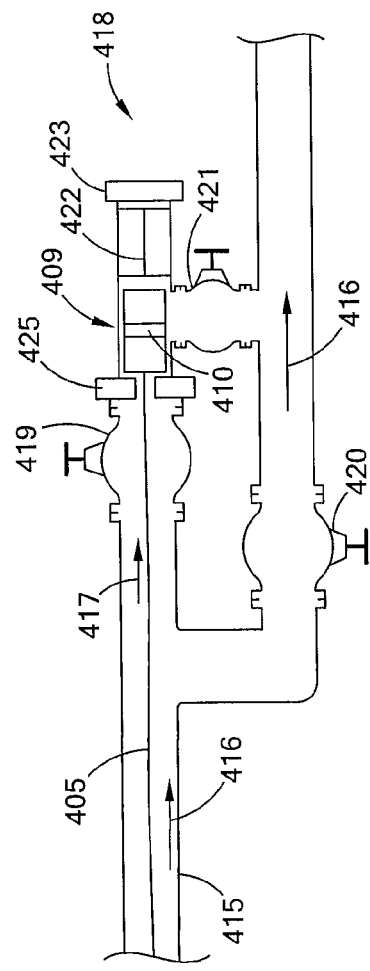

Turning to FIGS. 4A and 4B there is illustrated an embodiment of a laser-pig system and a laser-pig launcher and receiver associated with a pipeline. Thus, the system has a high power laser 400 that has a chiller 401. The laser would also have control systems, electrical support and other support equipment not shown in the figure. A high power laser fiber 402 optically connects the laser 400 to an optical slip ring 404 located in a spool 403. The spool 403 contains a high power optical cable 405 that is optically and mechanically connected to the laser-pig 409 and the laser tool 410. The spool may be located outside the pipeline as shown, or it may be located inside the pipeline. When positioning the spool inside the pipeline it is preferred to avoid unnecessary bending looses to the fiber, as taught by US patent application publication 2010/0020631. The laser spool, the laser and other support equipment could preferably be located on a support truck or vehicle.

When the spool is located within the pipeline, it would be located and contained within the laser-pig, within a separate pig that is optically associated with the laser-pig, or as a sub-unit or sub-section of these pigs. The spool in this embodiment would preferably be a non-rotating spool, such as a creel, which would contain the high power optical cable wound up within the creel. Thus, as the laser-pig is deployed into a pipeline, one end of the optical cable is associated with the high power laser, and is fixed at or near the launch point, for example, e.g., at the cap 104, while the other end is fixed within the pig. Thus, as the pig moves through the pipe line the optical cable plays out, i.e., unwinds from the coil contained within the pig, as the pig movers away from the cap 104. When the pig is recovered, the optical cable may be disconnected as one end and wound up at the other.

The laser-pig 409 has a laser tool 410, which could be a high power laser illuminator, microbe killer, cutter, or monitoring tool. For simplicity a single high power laser tool is shown, however, it should be understood that multiple laser tools, as well as other types of tools may be contained in a laser-pig. As shown in FIG. 4A the laser-pig 409 is positioned in a pig launcher 411. The pig launcher 411 has an end cap 406 that is removable for loading of the laser-pig 409 into the pig launcher 411. The end cap should be capable of withstanding the pressures found in the pipeline 415. The end cap 406 also has a pressure feed-through assembly 407, which could be a pressurized packer, or other type of assembly that permits the high power optical cable 405 to be fed from the spool into the launcher 411 and into the pipeline 415 as it is pulled by the pig 409. Assemblies known to those of skill in the drilling arts, as well as, the pipeline arts for feeding lines into pressurized wells, well heads, and/or pipelines, while maintaining pressure in the well or pipeline, may be employed. A snubber 408 is also provided, which as a channel for permitting the cable 405 to pass through it. The pig 409 is moved through the pipeline 415 by the flow of the pipeline fluid. Arrow 416 shows the direction of flow of pipeline fluid. Arrows 417 show the direction of movement of the pig 409 as it leaves the launcher 411 and enters the pipeline 415.

In operation, valves 413 and 412 would be closed as the pig 409 is positioned within the launcher 411 and the end cap 406 sealed. Once sealed, valves 413 and 412 would be opened while valve 414 is partially or fully closed. In this manner the flow of the pipeline fluid is diverted into the launcher 411 and moves the pig 409 from the launcher into the pipeline. Once the pig has been launched valve 414 may be opened while valve 413 is closed.

FIG. 4B illustrates a pig receiver 418, in which laser pig 409 has been caught. There is provided valves 419, 420, and 421. These valves would be opened and closed to divert the flow of the pipeline fluid to direct the laser-pig 409 into the receiver 418. The receiver has a snubber 422 and an end cap 423.

Thus, in operation the laser-pig would be launched from a position as show in FIG. 4A and travel along the length of a pipeline, performing its intended laser assisted operations, and then be captured by the pig receiver 418. Once the laser pig is captured the cable 405, which could be greater than 1 mile, 2 miles, 5 miles or longer, is positioned between the launcher 411, and the associated spool 403, and the receiver 418. To recover the cable 405 and the laser-pig 409, a pressure seal should be maintained around the cable 405 at both the launcher 411 and the catcher 418. In the catcher the pressure seal may be maintained by for example an adjustable ram packer system 425, which in this figure is shown as being engaged with the cable 405 after having let the laser-pig 409 pass by. In this manner the laser-pig can be removed from the system, through cap 423, the cable disconnected and then recovered by the spool, or the cable could also be disconnected at the spool and then pulled through the pipeline to be recovered. In this latter situation a pressure feed through should also be associated with cap 423. Although less preferable, valve 419, could simply sever the cable, in a manner that did not capture the end of the cable and then the cable could be wound in by the spool 403.

Figure 2:
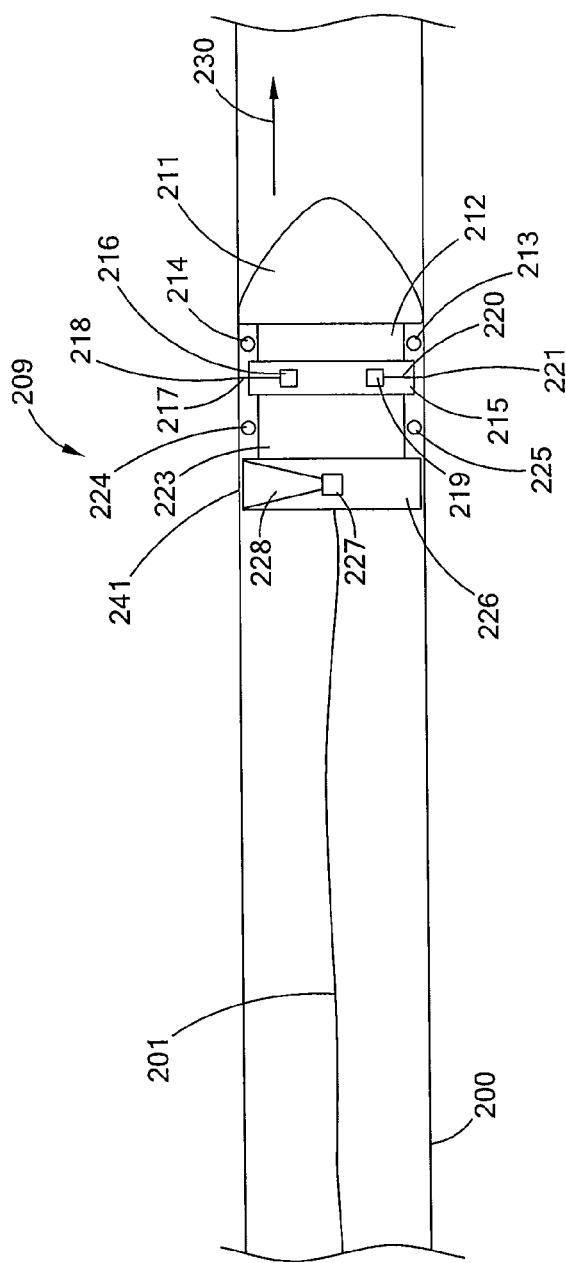
FIG. 2 is a schematic view of an embodiment of a laser-pig in accordance with the present invention.

In FIG. 2 there is provided an embodiment of a laser-pig in a pipeline. The laser-pig 209 is shown in a pipeline 200 have a fluid flow as shown by arrow 230. The laser-pig 209 has an optical cable 201 that is attached to it and in optical communication with a high power laser (not shown in this figure) and the laser tools 226, 215. The laser-pig 209 has a cup 211, that is connected to or otherwise associated with a first centralizer section 212 that has centralizers 213, 214, which may by way of example be rollers or wheels. The first centralizer section 212 is connected to or otherwise associated with a first or lead, laser tool section 215, which in this embodiment may preferably be a laser monitoring tool. The laser monitoring section 215 has laser delivery devices 216, 219 that deliver laser beams, along beam paths 217, 220, to illumination areas 218, 221 on the inner wall of the pipeline, respectively. The interaction of the laser beams with the laser illumination areas are then observed by sensors and/or receivers, in the laser-pig 209, which may preferably be located in the monitoring section 215, but could also be located in the adjacent sections of the laser-pig. In this manner the laser monitoring section is capable of obtaining information about the pipeline, its inner wall, the presence of biofilms, etc.

A second centralizer section 223, having centralizers 224, 225, is connected to, or otherwise associated with the monitoring section 215 and a second laser tool section 226. In this embodiment the second laser tool section 226 is preferably a remedial laser tool, having a laser delivery device 227 that deliver laser beams, along beam path 228 to illumination and perform the desired laser operation on target area 241. By way of example, the target area could be an area of biofilm that was identified by the monitoring tool 215. An on board control system in the laser-pig may also be used to coordinate these activities, which could be at any level of sophistication, from a simple on/off if biofilms are detected to a complex targeting system. Control and targeting information could also be transmitted along the cable 201 to a controller located outside of the pipeline.

It is believed that one, among many, advantages of the present inventions is the ability to eliminate or reduce the amount of costly pipeline treatment and maintenance chemicals that are used in pipeline operation, as well as, in other situations address problems that were not treatable with chemicals or other mechanical means, or that such treatment if effective is very time consuming and expensive. There are envisioned, however, situations where chemical and/or mechanical means may be used in conjunction with and obtain an additive benefit from the use of the high power laser energy.

Figure 3A:
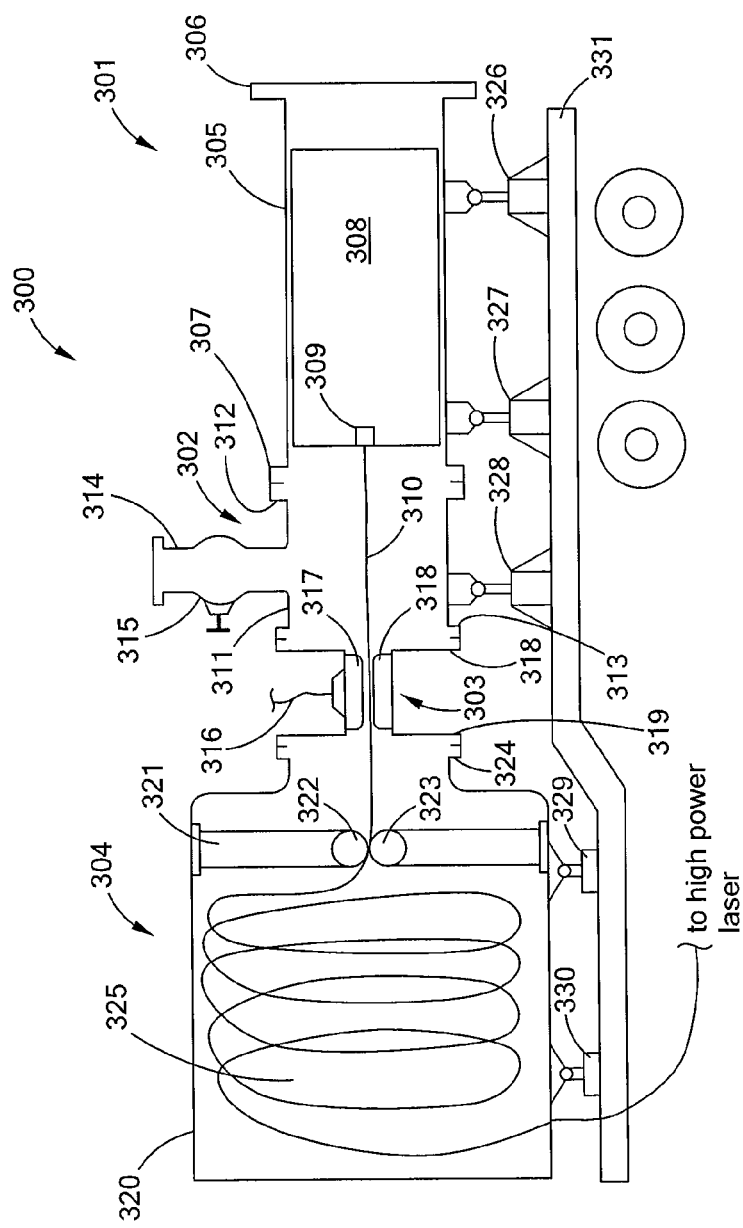
FIG. 3A is a schematic view of an embodiment of a portable laser-pig launcher in accordance with the present invention.

FIG. 3A provides an embodiment of a portable laser-pig launcher that is also mobile. Portable laser-pig launcher 300 may have four sections, a pig holder section 301, a launch section 302, a feed through section 303, and an optical cable section 320. The high power laser (not shown in this figure) could also be located on the truck bed 331, or it could be contained in a separate portable unit, that could also be mobile, e.g., on a truck bed. In the preferred embodiment these section are releasably attached to each other for example by flanges. They may also be unitary, welled or attached my other means. In this manner an inventory of different sections can be maintained and the portable laser-pig can be readily reconfigured for a particular application or task. For example if different size pigs were needed a different holder and pig could be attached. Similarly if more, less, or different, e.g., multiple optical fibers vs. a single optical fiber, cables were needed the section containing the desired cable type could be attached. The section also could be integral, welled or unitary with adjacent sections.

In this embodiment the portable laser pig launcher 300 is also mobile, in that it is mounted on a truck trailer bed 331. Adjustment cells 326, 327, 328, 329 and 330 are positioned between the bed 331 and the portable laser pig 300 so that different diameters of the sections of the launcher 300 can be accommodated and supported; also the entire launcher can be raised and lowered so the height of the launcher can be adjusted for connection to the pipeline into which the laser-pig is intended to be launched.

Pig holder section 301 has a housing 305 having a first flange 306 on one end and a second flange 307 on its other end. Section 301 contains laser-pig 308, which has a coupler 309 that optically connects high power optical cable 310 to the laser-pig 308. Flange 306 is intended to be connected to a pipeline pig launcher flange. Flange 307 is attached to flange 312 of launch section 302.

Launch section 302, has a housing 311 that has two flanges 312, 313. Launch section 302 has a stem 314 that has a valve 315. A motive force is applied by launch section 302 to move the laser pig into the pipeline. As shown in the figure, the motive force could be provided by connecting stem 314 to a pressure source, including the flow of the pipeline itself. Valve 315 is provided in stem 314 and could be used to control pressure, or seal the section. Other means of providing motive force, may also be used, or could be employed by changing the launch section 302 in the portable launcher 300, such as hydraulic and mechanical means. Flange 313 of launch section 302 is connected to flange 318 of the feed through section 303.

Feed through section 303 has flanges 318, 319. Feed through section 303 should be configured to permit the cable 310 to pass through it, while maintaining pressure in the launch section, as well as, maintaining pressure and containing pipeline fluids during laser-pigging operation. In the embodiment of FIG. 3A, an adjustable packer 317 is employed. The adjustable packer 317 is controlled and inflated by way of line 316. Flange 319 of the feed through section 303 is connected to flange 324 of the optical cable section 304.

Optical cable section 304 has a housing 320 and a flange 324. Optical cable section 304 has an assembly 321 for winding and unwinding the high power optical cable 310. The assembly 321 has roller 322, 323. In this embodiment the cable is stored in a helix 325 that can be unwound and rewound as the laser-pig is deployed.

Figure 3B:
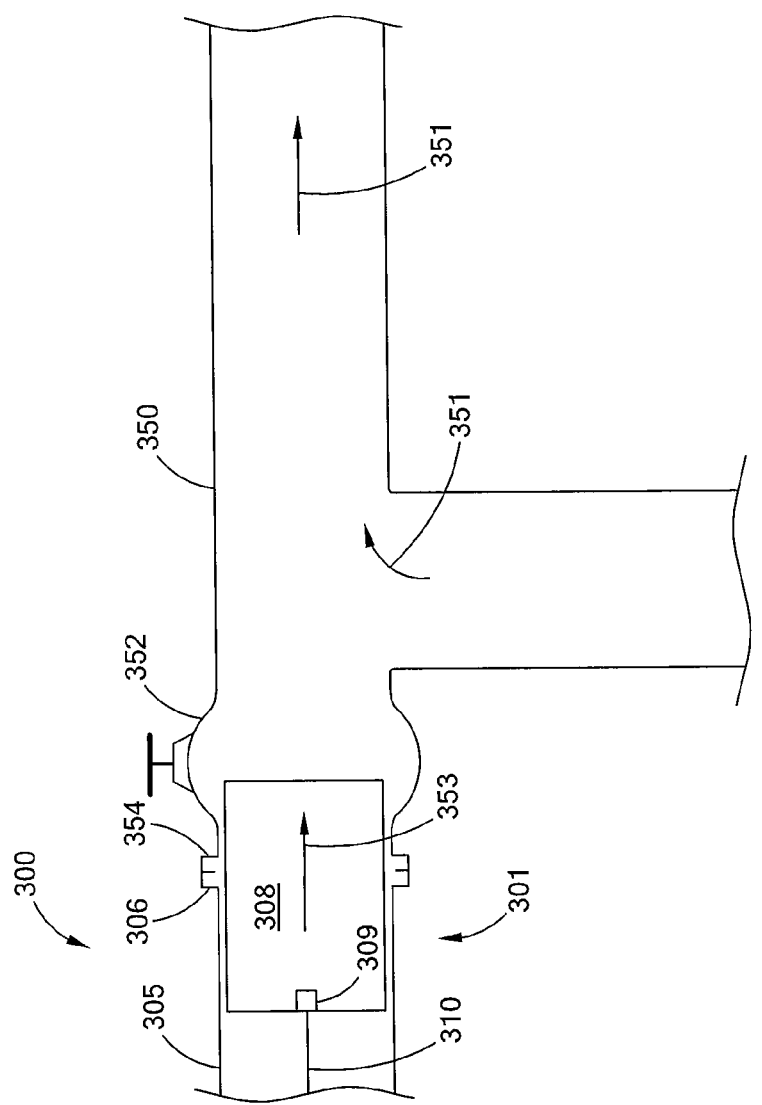
FIG. 3B is a schematic view of the portable laser-pig launcher of FIG. 3A connected to a pipeline in accordance with the present invention.

Turning to FIG. 3B there is shown an illustration of the portable laser pig launcher launching a laser-pig into a pipeline. Thus, flange 306 of the pig holding section 301 is connected to a flange 354 of a pipeline 350. The flange 354 also has associated with it valve 352. The direction of movement of the laser-pig 308 as it is being launched into the pipeline 350 is shown by arrow 353. The direction of the flow of material in the pipeline 350 is shown by arrows 351.

Figure 5:
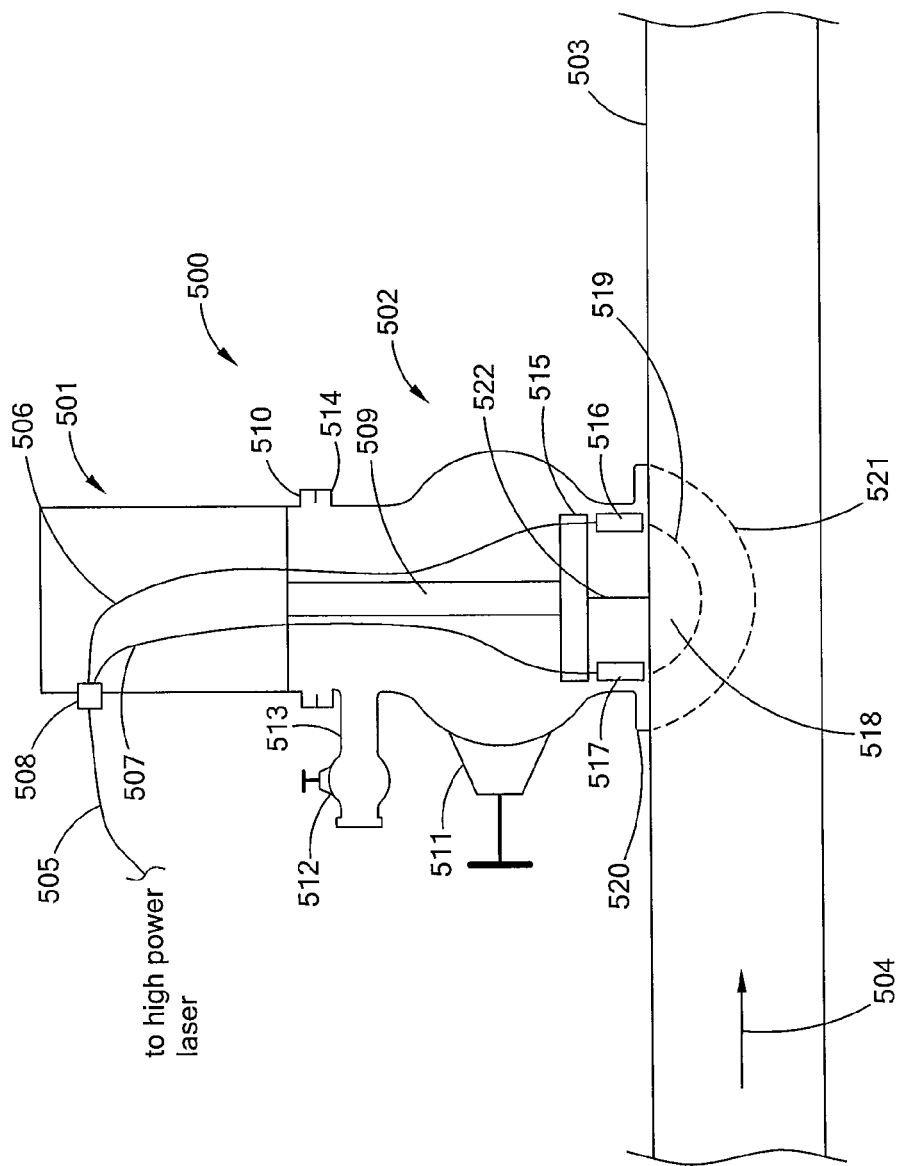
FIG. 5 is a schematic view of an embodiment of a laser-hot tap assembly in accordance with the present invention.

In FIG. 5 there is provided an embodiment of a laser hot-tap assembly 500 that uses a high power laser delivery assembly 515. The laser hot tap assembly 500 has a top section 501 and a lower section 502. The upper section 501 has a feed through assembly 508 that receives a high power optical cable 505 that is capable of being put in optical communication with a high power laser (not shown in this figure). In this embodiment the optical cable 505 has two high power laser optical fibers 506, 507. The top section 501 has an assembly 509 that lowers and raises the laser delivery assembly 515. The top section 501 has flange 510 that is connected to flange 514 of lower section 502. Lower section 502 has flange 514 and flange or bonnet 520. Lower section 502 has valve 511, stem 513, which has valve 512.

In operation the laser hot-tap 500 is positioned on pipeline 503, having material flowing in it, in the direction of arrow 504. Once positioned on the pipeline 503 the laser delivery assembly 515 is lowered into position adjacent the pipeline. The flange 520 is then sealed to the outer surface of the pipeline, by of for example a weld, shown as the dashed line 521. The laser cutters 516, 517 could also be configured to make this weld.

Laser cutters 516, 517 are then fired, e.g., a laser beam is shot from the cutter and delivered to the pipeline surface. The laser beams from the cutters cut out a coupon 518, as shown by dashed line 519, from the pipeline. As shown in the embodiment of FIG. 5, the two laser cutters 516, 517 are rotated a half-rotation to cut out the coupon 518. More or less laser cutters could be employed. A single or multiple laser cutters could also be used to direct the laser beam in for example a raster scan pattern to create an opening, eliminating the coupon all together. A coupon management assembly 522 is then used to handle and remove the coupon 518. During operation stem 513 can be connected to a pressure source and valve 512, or the pressure source, can be used to control and regulate the pressure in the lower section 502, during the laser cutting of the coupon 518. Thus, greater pressure, than found or anticipated in pipeline, can be maintained in section 502 to prevent the pipeline fluid from entering into section 502 and obstructing the laser beam. Coupon management device 515 can be used to prevent, e.g., hold or holdback, the coupon 518 from becoming entrained in the pipeline flow, including in situations when high pressure is put in to the section 502.

Once the coupon has been cut or eliminated, the laser delivery assembly 515 (and the coupon if being held by coupon management device 522) are moved up and out of section 502. Valve 511, which preferable is a ball valve, is then closed. Upper section 501 can then be removed, and another section of pipeline or other equipment attached.

Figure 6:
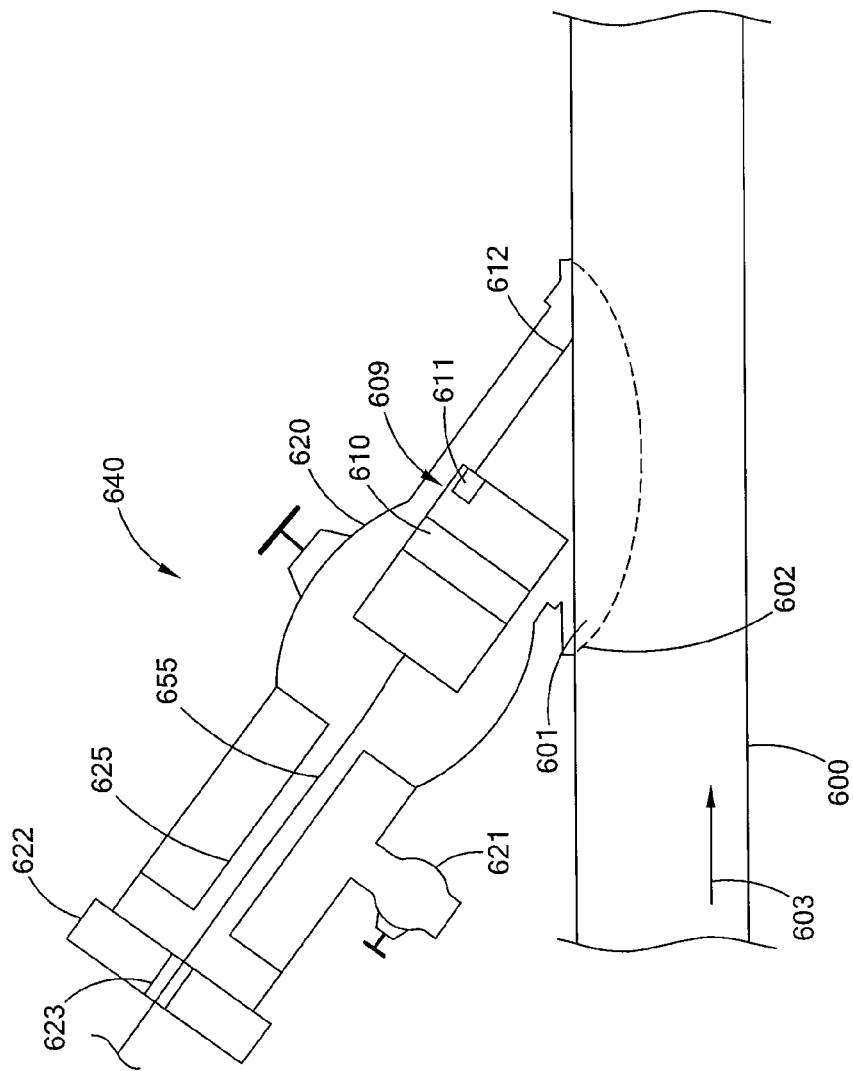
FIG. 6 is a schematic view of an embodiment of a laser-hot tap pig assembly in accordance with the present invention.

FIG. 6 provides an embodiment of a laser hot tap assembly. This hot tap assembly 640 permits the launching of a laser-pig 609 or conventional pig into a pipeline 600 at locations where there are no pig launchers, or other points of access to the interior of the pipeline. This hot-tap pig launcher may further be useful in accessing small and very small pipelines, for example in factories, such as chemical processing plants, or other facilities or installations, where pig placement and/or pigging would otherwise be impossible or at a minimum very difficult. It further provides the ability to tap and place a pig in a pipeline with substantially less noise and vibration than would occur with a conventional mechanical drilling type hot tap procedure. The hot tap assembly 640 further permits the launching of the laser-pig or conventional pig without, or with minimal, disruption of flow in the pipeline 600. The hot tap assembly 640 further permits the connection of two or more pipelines while one or more pipelines are in operation. The direction of flow in pipeline 600 is shown by arrow 603. The hot tap assembly 640 has a flange 601 that is positioned on the outside of the pipeline 600. The flange 601 is then secured to the pipeline by way of for example a weld 602. The securement means extend around the entire flange and should form a fluid and pressure tight seal to the pipeline.

The hot tap assembly 640 has a first valve 620, a second valve 621, an end cap 622, which has a feed through assembly 623. As shown in the figure, the laser cutter 609 is positioned within the assembly 640, the high power optical cable 655 is attached to the laser cutter and optically associated with the laser section 610, a laser tap cutter 611, and a high power laser, not shown in the figure. As provide herein, the laser cable can have a one, two, three or more high power laser optical fibers contained within a protective covering. There is also present a snubber 625 having a passage way for permitting the cable 615 to pass through. Prior to operation, pressure is supplied through valve 621 until the differential pressure across the wall to be cut is zero or near zero. In operation, once the assembly flange 601 has been attached to and sealed to the pipeline 600, the laser tap cutter 611 is fired, delivering (e.g., propagating) a laser beam along beam path 612 to the pipeline 600. The laser tap cutter, and or the beam path, is then moved or directed in a manner to cut an opening in the pipeline to permit a passage into the pipeline. When making the opening care should be taken to avoid having the cut section (coupon) of the pipeline become entrained in the flow within the pipeline. This may be accomplished by way of example by completely cutting, in for example a raster like scan pattern, away the opening. A mechanical means of retaining the coupon may also be used. Also, a hinge, or flap opening may also be cut, however, in if this is done, a further means to open and eventual close the flap should be utilized, to prevent the presence of the flap from interfering with the flow in the pipeline, or to cause damage to the laser pig as it moves by the flap into the pipeline. Once the opening has been made to launch the laser-pig 609, valve 621 is opened and a pressurized fluid is forced into the assembly to drive the laser-pig into the flow of the pipeline.

The laser systems of the present invention may utilize a single high power laser, or they may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 10 kW, 20 kW, 50 kW or more power and, which emit laser beams with wavelengths preferably in about the 1550 nm (nanometer), or 1083 nm ranges.

High powered optical cables, spools of cables and reels of cables of the type shown and disclosed in US patent application publications 2010/0044104 and 2010/0215326, 2101/0044106, 2010/0044103, and 2012/0020631 and in pending U.S. patent application Ser. No. 13/211,729 may be preferably used as high power laser cables, e.g., a tether or pig-tail. Thus, the laser cable may be: a single high power optical fiber; it may be a single high power optical fiber that has shielding;

it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have other optical or metal fibers for the transmission of data and control information and signals; and it may be any of the combinations set forth in the forgoing patent applications and combinations thereof.

A single high power laser may be utilized in the system, or the system may have two or three high power lasers, or more. High power solid-state lasers, specifically semiconductor lasers and fiber lasers are preferred, because of their short start up time and essentially instant-on capabilities. The high power lasers for example may be fiber lasers or semiconductor lasers having 5 kW, 10 kW, 20 kW, 50 kW or more power and, which emit laser beams with wavelengths in the range from about 455 nm (nanometers) to about 2100 nm, preferably in the range about 800 nm to about 1600 nm, about 1060 nm to 1080 nm, 1530 nm to 1600 nm, 1800 nm to 2100 nm, and more preferably about 1064 nm, about 1070-1080 nm, about 1360 nm, about 1455 nm, 1490 nm, or about 1550 nm, or about 1900 nm (wavelengths in the range of 1900 nm may be provided by Thulium lasers).

For example a preferred type of fiber laser would be one that includes 20 modules or more. The gain bandwidth of a fiber laser is on the order of 20 nm, the linewidth of the free oscillator is 3 nm, Full Width Half Maximum (FWHM) and may range from 3 nm to 5 nm (although higher linewidths including 10 nm are envisioned and contemplated). Each module's wavelength is slightly different. The modules further each create a multi-mode beam. Thus, the cumulative effect of combining the beams from the modules is to maintain the Raman gain and the Brillouin gain at a lower value corresponding to the wavelengths and linewidths of the individual modules, and thus, consequently reducing the SBS and SRS phenomenon in a fiber when the combined beams are transmitted through the fiber. An example of this general type of fiber laser is the IPG YLS-20000 (YB). The detailed properties of which are disclosed in US patent application Publication Numbers 2010/0044106 and 2010/0044103.

In some embodiments, a fiber laser emitted light at wavelengths comprised of 1060 nm to 1080 nm, 1530 nm to 1600 nm, 1800 nm to 2100 nm, diode lasers from 400 nm to 1600 nm, $CO_2$ Laser at 10,600 nm (however, $CO_2$ laser do not couple into conventional fused silica optical fibers, and thus, a solid fiber capable of transmitting these wavelengths, or hollow light pipe or later developed optical means may be utilized to transmit this laser beam), or Nd:YAG Laser emitting at 1064 nm can couple to the optical fibers. In some embodiments, the fiber can have a low water content. Preferably, the water content of the fiber should be as low as is possible.

Examples of lasers, and in particular solid-state lasers, such as fibers lasers, are set forth in US Patent Application Publication Numbers 2010/0044106, 2010/0044105, 2010/0044104, 2010/0215326, and 2012/0020631, and in pending U.S. patent application Ser. No. 13/210,581 and Ser. No. 61/493,174; the entire disclosures of each of which are incorporated herein by reference. Further diode lasers, and for example, such lasers having a wavelength of from about 0.9 microns to 2 microns may be utilized.

The laser cutters and laser cleaners and laser delivery assemblies used for a laser tool with a laser-pig, may be any suitable device for the delivery of high power laser energy. Thus, any configuration of optical elements for culminating and focusing the laser beam can be employed. A further consideration, however, is the management of the optical effects of pipeline fluids that may be located within the beam path between the laser tool and the inner wall of the pipeline.

It is advantageous to minimize the detrimental effects of such fluids and to substantially ensure, or ensure, that such fluids do not interfere with the transmission of the laser beam, or that sufficient laser power is used to overcome any losses that may occur from transmitting the laser beam through such fluids, as well as to protect the laser beam delivery components that may be in the proximity or potentially adjacent the fluids, such as e.g., a window. To this end, mechanical, pressure and jet type systems may be utilized to reduce, minimize or substantially eliminate the effect of these fluids on the laser beam and related delivery components.

For example, mechanical devices may be used to isolate the area where the laser operation is to be performed and the fluid removed from this area of isolation, by way of example, through the insertion of an inert gas, or an optically transmissive fluid, such as an oil or diesel fuel. The use of a fluid in this configuration has the added advantage that it is essentially incompressible. Moreover, a mechanical snorkel like device, or tube, which is filled with an optically transmissive fluid (gas or liquid) may be extended between or otherwise placed in the area between the laser tool and the inner surface of the pipeline.

A jet of high-pressure gas may be used with the laser beam. The high-pressure gas jet may be used to clear a path, or partial path for the laser beam. The gas may be inert, or it may be air, oxygen, or other type of gas that accelerates the laser cutting.

The use of oxygen, air, or the use of high power laser beams, e.g., greater than about 1 kW, could create and maintain a plasma bubble or a gas bubble in the laser illumination area, which could partially or completely displace the fluid in the path of the laser beam.

A high-pressure laser liquid jet, having a single liquid stream, may be used with the laser beam. The liquid used for the jet should be transmissive, or at least substantially transmissive, to the laser beam. In this type of jet laser beam combination the laser beam may be coaxial with the jet. This configuration, however, has the disadvantage and problem that the fluid jet does not act as a wave-guide. A further disadvantage and problem with this single jet configuration is that the jet must provide both the force to keep the drilling fluid away from the laser beam and be the medium for transmitting the beam.

A compound fluid laser jet may be used as a laser tool. The compound fluid jet has an inner core jet that is surrounded by an annular outer jet. The laser beam is directed by optics into the core jet and transmitted by the core jet, which functions as a waveguide. A single annular jet can surround the core, or a plurality of nested annular jets can be employed. As such, the compound fluid jet has a core jet. This core jet is surrounded by a first annular jet. This first annular jet can also be surrounded by a second annular jet; and the second annular jet can be surrounded by a third annular jet, which can be surrounded by additional annular jets. The outer annular jets function to protect the inner core jet from the drill fluid present in the annulus between the laser cutter and the structure to be cut. The core jet and the first annular jet should be made from fluids that have different indices of refraction. Further details, descriptions, and examples of such compound fluid laser jets, and other high power laser cutting devices, assemblies and procedures that may be utilized with the laser-pig are contained in U.S. patent application Ser. Nos.

13/211,729 and 13/222,931, the entire disclosure of each of which is incorporated herein by reference.

The angle at which the laser beam contacts the inner surface of the pipeline may be determined by the optics within the laser tool or it may be determined by mechanical or other types of positioning means. The laser tools have a discharge end from which the laser beam is propagated. The laser tools also have a beam path. The beam path is defined by the path that the laser beam is intended to take, and extends from the discharge end of the laser tool to the material or area to be illuminated by the laser, e.g., the inner surface of the pipeline.

The laser tethers, e.g., the laser-pig-tail, for the laser tools transmits or conveys the laser energy and other materials that are needed to perform the laser pipeline operations. Although shown as a single cable multiple cables could be used. Thus, for example, in the case of a laser tool employing a compound fluid laser jet the tether could include a high power optical fiber, a first line for the core jet fluid and a second line for the annular jet fluid. These lines could be combined into a single cable or they may be kept separate. Additionally, for example, if a laser cutter employing an oxygen jet is utilized, the cutter would need a high power optical fiber and an oxygen line. These lines could be combined into a single tether or they may be kept separate as multiple tethers. The lines and optical fibers should be covered in flexible protective coverings or outer sheaths to protect them from fluids, the pipeline environment, and the movement of the laser-pig through the pipeline structures, including the pig launcher, while at the same time remaining flexible enough to accommodate turns, bends, or other structures and configurations of the pipeline.

The systems and methods of the present inventions are, in part, directed to the cleaning, resurfacing, removal, and clearing away of unwanted materials, e.g., build-ups, deposits, corrosion, or substances, in, on, or around a pipeline, and related pipeline pumping, transferring and metering equipment. Such unwanted materials would include by way of example rust, corrosion, corrosion by products, degraded or old paint, degraded or old coatings, paint, coatings, waxes, hydrates, microbes, residual materials, biofilms, tars, sludges, and slimes. The present inventions provide the ability to have laser energy of sufficient power and characteristics to be transported over great lengths and delivered to remote and difficult to access locations. Thus, although pipeline related applications are the preferred application for the present inventions, they would also find many applications and uses in the related field of "flow assurance," (a broad term that has been recently used in the oil and natural gas industries to cover the assurance that hydrocarbons can be brought out of the earth and delivered to a customer, or end user). Moreover, the present inventions would have uses and applications beyond pipelines, and flow assurance, and would be applicable to the cleaning, resurfacing, removal and clearing away of unwanted materials in any location that is far removed from a laser source, or difficult to access by conventional existing technology.

The high power laser energy that is delivered to a surface of the pipeline may be selected and delivered in such a manner as to specifically target an insulating material, which is other than steel. The high power laser energy may be selected and delivered to target a conducting material, which may include steel. Thus, for example, the laser energy could be modulated to specifically target an insulating material or a conducting material. Additionally, the bandwidth of the optical fiber may be used to transmit laser beams of wavelengths other then the high power laser beam for performing operations on the pipeline, e.g., 1.1 or 1.5 μm (microns), and in this manner communicate information along the optical fiber to other components or locations, or assist in the performance of other optical functions.

The parameters of the laser energy delivered to a substrate, e.g., the interior of a pipeline, having an unwanted material should be selected to provide for the efficient removal, or degradation of the unwanted material, while minimizing any harm to the substrate. The laser delivery parameters will vary based upon, for example, such factors as: the desired duty cycle; the surface area of the substrate to be cleaned; the composition of the substrate; the thickness of the substrate; the opacity of the unwanted material; the composition of the unwanted material; the absorptivity and/or reflectivity of the unwanted material for a particular laser wavelength; the removal speed (linear or area); as well as, other factors that may be relevant to a particular application. Although continuous wave and pulsed delivery lasers may be useful in addressing the issue of unwanted materials in or on pipelines, or in or on other substrates, pulsed laser have been shown to be particularly beneficial in some applications and situations. Without limitation to the present teachings and inventions set forth in this specification, the following US patents set forth parameters and methods for the delivery of laser energy to a substrate to remove unwanted materials from the substrate: U.S. Pat. No. 5,986,234; RE33,777, U.S. Pat. Nos. 4,756,765, 4,368,080, 4,063,063, 5,637,245, 5,643,472, 4,737,628, the entire disclosures of which are incorporated herein by reference.

The invention may be embodied in other forms than those specifically disclosed herein without departing from its spirit or essential characteristics. The described embodiments are to be considered in all respects only as illustrative and not restrictive.

What is claimed:

1. A launcher system for a high power laser pipeline pig system, comprising a laser source having a power of at least about 15 kW and a wavelength in the range of from about 800 nm to about 1600 nm, comprising:
   a. a pig holder section containing a laser pig;
   b. a launch section;
   c. a feed through section comprising a packer; and,
   d. an optical capable section comprising a high power optical cable having a length of greater than about 1 mile, a means for winding and unwinding the optical cable, and a high power optical fiber having a core having a diameter of at least about 200 μm;
   wherein the launch section comprises a valve and is in fluid communication with the holder section.

2. A launcher system for a high power laser pipeline pig system, comprising a laser source having a power of at least about 10 kW, comprising:
   a. a pig holder section containing a laser pig;
   b. a launch section;
   c. a feed through section comprising a means for managing pressure between the launching section and the optical cable section; and,
   d. an optical capable section comprising a high power optical cable having a length of greater than about 1 mile and a high power optical fiber having a core having a diameter of at least about 500 μm;
   wherein the launch section comprises a valve and is in fluid communication with the holder section.

3. A high power laser hot tap assembly comprising: a top section, a bottom section, a laser delivery assembly, and a first and a second valve in fluid communication with the bottom section; the top section comprising a high power optical cable, a feed through assembly, wherein the high power optical cable passes through the feed through assembly and is in optical communication with the laser delivery assembly, and an assembly for moving the laser delivery assembly relative to an outer surface of a pipeline; the bottom section comprising a body defining a cavity, a flange for engaging the outer surface of the pipeline.

4. The high power laser hot tap assembly of claim 3, comprising a laser source having a power of at least about 5 kW, wherein the laser source is in optical communication with the high power optical cable.

5. The high power laser hot tap assembly of claim 3, comprising an assembly that is configured to permit the movement of the laser delivery assembly in the cavity relative to the outer surface of the pipeline.

6. The high power laser hot tap assembly of claim 3, wherein the top and bottom sections comprise respective engaging flanges.

7. The high power laser hot tap assembly of claim 3, wherein the top and bottom sections are integral.

8. The high power laser hot tap assembly of claim 3, wherein the laser delivery assembly comprises two high power laser cutters.

9. The high power laser hot tap assembly of claim 4, comprising an assembly that is configured to permit the movement of the laser delivery assembly in the cavity relative to the outer surface of the pipeline.

10. The high power laser hot tap assembly of claim 4, wherein the top and bottom sections comprise respective engaging flanges.

11. The high power laser hot tap assembly of claim 4, wherein the top and bottom sections are integral.

12. The high power laser hot tap assembly of claim 4, wherein the laser delivery assembly comprises two high power laser cutters.

13. The high power laser hot tap assembly of claim 3, comprising a laser source having a power of at least about 10 kW, wherein the laser source is in optical communication with the high power optical cable.

14. The high power laser hot tap assembly of claim 3, comprising a laser source having a power of at least about 20 kW, wherein the laser source is in optical communication with the high power optical cable.

15. A system for performing high power laser hot-tapping operations on a pipeline, the system comprising:
  a. a high power laser;
  b. the high power laser in optical association with a laser hot-tapping assembly, comprising:
    i. a first and a second section;
    ii. a first and a second valve;
    iii. a high power laser delivery assembly, having at least one laser cutter;
    iv. wherein the high power laser cutters are movable between a first position in the first section and a second position in the second section, and;
  c. a means for attaching the hot-tapping assembly to the outer surface of an active pipeline.

* * * * *